US 6,627,053 B2

(12) United States Patent
Hirota et al.

(10) Patent No.: US 6,627,053 B2
(45) Date of Patent: Sep. 30, 2003

(54) WATER TREATMENT DEVICE

(75) Inventors: Tatsuya Hirota, Kyoto (JP); Yoshihiro Inamoto, Otsu (JP); Kiyokazu Fujikawa, Inukami-gun (JP); Yozo Kawamura, Kouka-gun (JP); Minoru Nakanishi, Otsu (JP); Minoru Kishi, Kusatsu (JP); Takaaki Yonezawa, Kusatsu (JP); Tamotsu Kawamura, Yokaichi (JP); Kazuhiro Yamamoto, Kasai (JP); Yasuhiko Shimizu, Ora-machi (JP); Yasuhito Kondo, Oizumi-machi (JP)

(73) Assignee: Sanyo Electric Co., Ltd., Osaka (JP)

( * ) Notice: Subject to any disclaimer, the term of this patent is extended or adjusted under 35 U.S.C. 154(b) by 223 days.

(21) Appl. No.: 09/734,001

(22) Filed: Dec. 12, 2000

(65) Prior Publication Data

US 2001/0004962 A1 Jun. 28, 2001

(30) Foreign Application Priority Data

| Dec. 14, 1999 | (JP) | ............................................ 11-354875 |
| Dec. 17, 1999 | (JP) | ............................................ 11-359356 |
| Feb. 21, 2000 | (JP) | ...................................... 2000-043437 |
| Feb. 8, 2000 | (JP) | ...................................... 2000-030902 |
| Apr. 17, 2000 | (JP) | ...................................... 2000-115332 |

(51) Int. Cl.$^7$ .............................................. C02F 1/461
(52) U.S. Cl. ................................ 204/228.1; 204/228.6; 204/230.2; 204/275.1
(58) Field of Search .......................... 204/228.1, 228.6, 204/230.2, 275.1

(56) References Cited

U.S. PATENT DOCUMENTS

| 4,085,028 A | | 4/1978 | McCallum |
| 4,767,511 A | * | 8/1988 | Aragon ..................... 204/228.6 |
| 5,314,589 A | | 5/1994 | Hawley |
| 5,389,214 A | * | 2/1995 | Erickson et al. ............. 204/742 |
| 6,125,481 A | * | 10/2000 | Sicilano ......................... 4/509 |
| 6,126,810 A | * | 10/2000 | Fricker et al. ........... 204/228.6 |

FOREIGN PATENT DOCUMENTS

| EP | 0 133 920 A | 3/1985 |
| EP | 0 343 092 A1 | 11/1989 |
| EP | 0 538 474 A | 4/1993 |
| FR | 2 704 872 | 11/1994 |
| WO | WO 99 25455 A | 5/1999 |

* cited by examiner

Primary Examiner—Arun S. Phasge
(74) Attorney, Agent, or Firm—Rabin & Berdo, P.C.

(57) ABSTRACT

The present invention is directed to a new water treatment device comprising an electrolytic tank to put water in, an electrode provided in the electrolytic tank, a water treating path for pouring water in a pool and returning to the pool the water in the electrolytic tank, a residual chlorine sensor for measuring the residual chlorine concentration of water, and control means for controlling the energization of the electrode on the basis of the measured value by the residual chlorine sensor, and capable of simply and efficiently sterilizing water stored in pools of various sizes from a swimming pool to a home bathtub.

23 Claims, 36 Drawing Sheets

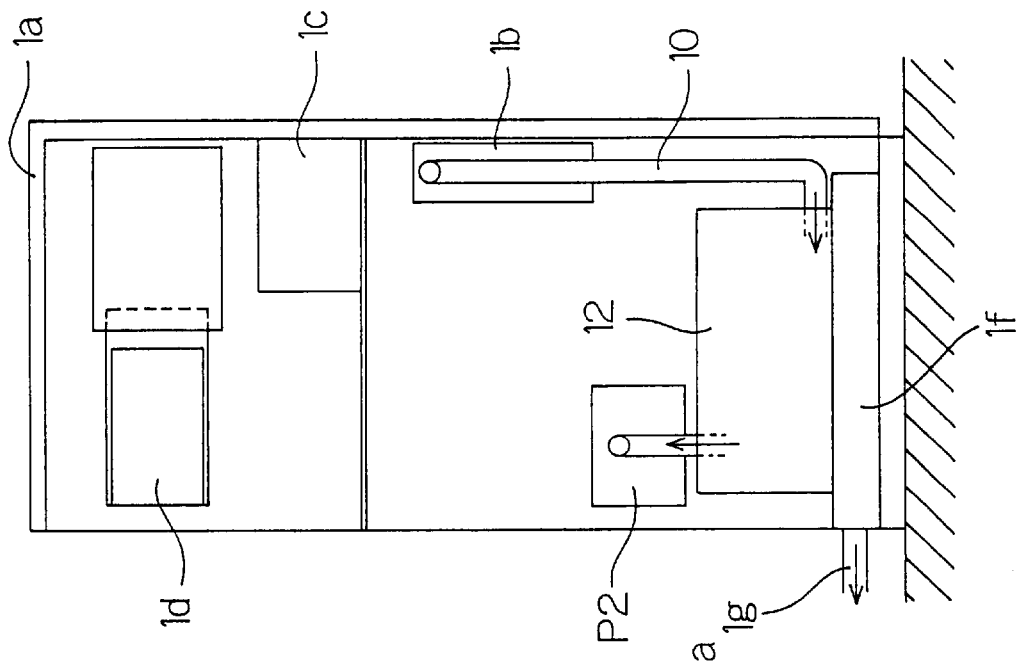
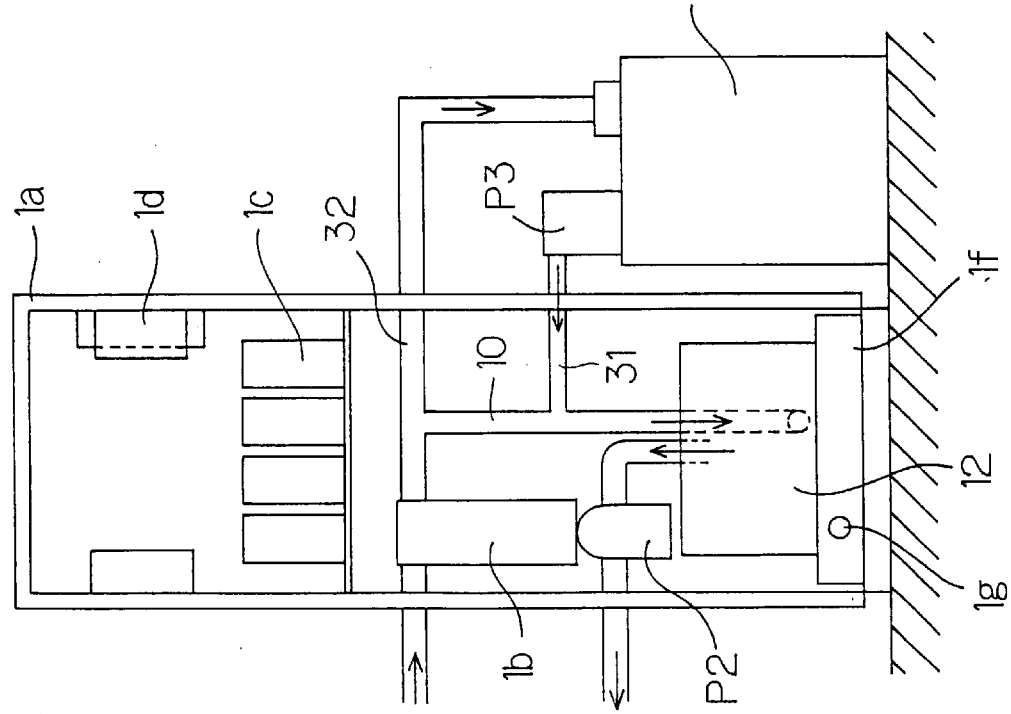

WATER TREATMENT DEVICE

BACKGROUND OF THE INVENTION

The present invention relates to a new water treatment device capable of sterilizing water stored in various types of pools from large-sized pools such as a swimming pool and a bathtub of a public bath to small-sized pools such as a water supply tank disposed on the roof of a building or the like and a home bathtub.

The swimming pool which is installed indoors or outdoors, or the bathtub of the public bath, for example, must be subjected to sterilization by periodically introducing chlorinated lime, sodium hypochlorite (NaClO), or the like into the water in order to maintain the quality of the water.

However, it has been conventionally necessary for employees in facilities, for example, to perform the work by hand outside the business hours (early in the morning, at midnight, etc.), and moreover, the operation had to be done with great caution since the chlorinated lime or sodium hypochlorite are irritant.

Chlorinated lime is generally in the shape of powder or a shape of a tablet obtained by solidifying the powder. Accordingly, it takes a long time until the chlorinated lime is dissolved to make the concentration thereof uniform after it is introduced into the pool. During the time, the pool cannot be used.

In the case of the water supply tank disposed on the roof of the building or the home bathtub, it depends on only a sterilizing force of chlorine contained in tap water. Particularly in the case of the water supply tank, algae reproduces inside thereof, resulting in degraded water quality.

In the case of the home bathtub, the water is generally exchanged every one or two days, so that it tends to be considered that there is no problem in terms of the water quality. However, the inside of a boiler connected to the bathtub cannot be frequently cleaned. Therefore, various types of germs, mold, and so forth are liable to reproduce. Accordingly, it is feared that the water quality is degraded.

When the water stored in each of the above-mentioned pools is sterilized, the residual chlorine concentration of the water must be in a predetermined range depending on the applications of the pool and the water.

The residual chlorine concentration can be measured using a residual chlorine sensor. In the case of the large-sized pool such as the swimming pool or the public bath, a time lag occurs between the average residual chlorine concentration in the pool and the concentration measured by the residual chlorine sensor.

Specifically, it takes a long time until the residual chlorine concentration in the pool is averaged after chlorinated lime or sodium hypochlorite is introduced into the pool. Even if the residual chlorine concentration is measured by the residual chlorine sensor in a particular place, therefore, a correct measured value cannot be obtained. Accordingly, it takes a long time until the correct measured value can be obtained.

SUMMARY OF THE INVENTION

A first object of the present invention is to provide a new water treatment device capable of simply and efficiently sterilizing water stored in various types of pools, described above.

A second object of the present invention is to provide a water treatment device capable of satisfactorily measuring the residual chlorine concentration of water and automatically maintaining the concentration in a desired range with a good response.

The invention as set forth in the claim 1 is directed to a water treatment device comprising electrolyzing and sterilizing means, comprising an electrolytic tank to put water in and an electrode provided in the electrolytic tank in order to electrolyze the water, for pouring water into the electrolytic tank to energize the electrode, and electrolyzing the water, to sterilize the water; a water treating path connected to a pool storing water for pouring the water in the pool into the electrolytic tank and returning to the pool the water in the electrolytic tank; a residual chlorine sensor for measuring the residual chlorine concentration of water; and control means for controlling the energization of the electrode on the basis of the measured value by the residual chlorine sensor.

In the construction as set forth in the claim 1, the electrode arranged in the electrolytic tank is energized in a state where an electrolyte containing chlorine such as sodium chloride (NaCl), calcium chloride ($CaCl_2$), or hydrochloric acid (HCl) is added to the water which has been poured into the electrolytic tank through the water treating path from the pool or a state where no electrolyte is added when the water previously contains an electrolyte for sterilization.

Consequently, the water is sterilized by a chlorine compound such as hypochlorous acid (HClO), its ion (ClO$^-$), or chlorine gas ($Cl_2$) which is generated by electrolytic reaction, described below, active oxygen ($O_2^-$) generated for a very short time in the reaction process, or the like, and is then returned to the pool through the water treating path.

(Anode)

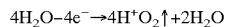
$$4H_2O - 4e^- \rightarrow 4H^+ O_2\uparrow + 2H_2O$$

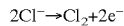
$$2Cl^- \rightarrow Cl_2 + 2e^-$$

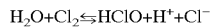
$$H_2O + Cl_2 \leftrightarrows HClO + H^+ + Cl^-$$

(Cathode)

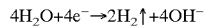
$$4H_2O + 4e^- \rightarrow 2H_2\uparrow + 4OH^-$$

(Anode+Cathode)

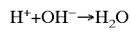
$$H^+ + OH^- \rightarrow H_2O$$

The above-mentioned series of operations is performed only by a worker operating a pump for circulating the water through the water treating path and energizing the electrode without almost passing through human hands or without the worker directly touching the water. If the operation of the pump, the energization of the electrode, or the like is automated utilizing a timer or a residual chlorine sensor, the water treatment can be completely automated.

Therefore, in the construction as set forth in the claim 1, the water stored in the pool can be simply and efficiently sterilized.

Moreover, the water returned to the pool upon being sterilized by the water treatment device contains only ions having a significantly low concentration. Accordingly, the above-mentioned treatment can be performed periodically even during the business hours of the swimming pool, the public bath, or the like or arbitrarily in accordance with the quality of the water which varies depending on the number of visitors, the weather, the temperature, or the like.

In the swimming pool, the public bath, or the like, therefore, work for introducing chlorinated lime, sodium hypochlorite, or the like to sterilize the water can be entirely omitted, or the number of times of the work can be significantly reduced. Accordingly, the water quality can be kept good while significantly easing the burden on the worker.

In the water supply tank disposed on the roof of the building, for example, the series of work is manually or automatically performed for each predetermined volume of used water, for example, or for each predetermined time period irrespective of the volume of used water, it is possible to prevent the water quality from being degraded by restraining the reproduction of algae.

Furthermore, in the home bathtub or the like, the series of work is manually or automatically performed at the time point where daily bathing is terminated, for example, and prior to draining bath water, it is possible to prevent the water quality from being degraded by restraining the reproduction of germs, mold, or the like in a boiler connected to the bathtub.

In the construction as set forth in the claim 1, the correlation of the amount of free residual chlorine generated by electrolysis with the amount of applied current (the amount of charge) is utilized, to find a difference between the residual chlorine concentration measured by the residual chlorine sensor and the required residual chlorine concentration previously determined, and find an insufficient amount of residual chlorine from the difference and the quantity of water stored in the pool. Current in an amount required to produce the insufficient amount of chlorine by the electrolysis is supplied to the electrode, thereby making it possible to control the residual chlorine concentration not uselessly.

Therefore, in the construction as set forth in the claim 1, the energization is automatically controlled on the basis of the measured value by the residual chlorine sensor, thereby making it possible to maintain the residual chlorine concentration of the water in a predetermined range with high precision.

The invention as set forth in the claim 2 is the water treatment device as set forth in the claim 1, further comprising setting means for setting the residual chlorine concentration of the water, the control means controlling the energization of the electrode such that the measured value by the residual chlorine sensor is equal to the residual chlorine concentration set by the setting means.

In the construction as set forth in the claim 2, when a user sets the residual chlorine concentration by the setting means, the energization of the electrode is automatically controlled such that the residual chlorine concentration of the water is equal to the set concentration.

Therefore, in accordance with the water quality of the water which varies depending on the number of visitors of the pool such as the swimming pool or the public bath, the weather, the temperature, or the like, the residual chlorine concentration of the water in the pool can be arbitrarily controlled. The residual chlorine concentration of the water can be set to a desired concentration depending on the type, that is, the applications of the pool to which the water treatment device is applied, thereby making it possible to make the water treatment device applicable to various types of pools.

The invention as set forth in the claim 3 is the water treatment device as set forth in the claim 1, further comprising temperature sensing means for measuring the temperature of the water in the electrolytic tank, the control means controlling the energization of the electrode on the basis of an output of the temperature sensing means.

In the construction as set forth in the claim 3, it is possible to safely and most suitably sterilize the water in the ranges of the heat-resistant temperatures of the electrolytic tank and the water treating path.

In supplying current to the electrode in the electrolyzing and sterilizing means to sterilize the water, when the supplied current is abnormally increased or the quantity of the water poured into the electrolytic tank is abnormally decreased, the temperature of the water in the electrolytic tank may be abnormally raised. Particularly when the electrolytic tank and the water treating path are formed of a resin material such as polyvinyl chloride, the heat-resistant temperatures are not high. Therefore, measures must be taken.

In the construction as set forth in the claim 3, the temperature is always sensed by the temperature sensing means. When the temperature is increased, the energization of the electrode is reduced or stopped, thereby making it possible to sterilize the water in the safe temperature range.

The invention as set forth in the claim 4 is the water treatment device as set forth in the claim 3, wherein the control means controls the pouring of the water into the electrolytic tank on the basis of the output of the temperature sensing means.

In the construction as set forth in the claim 4, when the temperature sensed by the temperature sensing means rises, the quantity of the water poured into the electrolytic tank is increased, to shorten a time period during which the water stays in the electrolytic tank, thereby making it possible to prevent the temperature of the water in the electrolytic tank from rising.

The invention as set forth in the claim 5 is the water treatment device as set forth in the claim 1, further comprising gas/liquid separating means for separating from the water gas generated by the electrolysis in the electrolyzing and sterilizing means, and gas separation sensing means for sensing circumstances where the gas is separated in the gas/liquid separating means, the control means controlling the energization of the electrode on the basis of an output of the gas separation sensing means.

In the construction as set forth in the claim 5, it is possible to safely remove gas containing combustible hydrogen which is generated by the above-mentioned electrolytic reaction and included into the water and is separated by the gas/liquid separating means.

As a specific example of the gas separation sensing means, the construction as set forth in the claim 6 or 7 is employed.

The invention as set forth in the claim 6 is the water treatment device as set forth in the claim 5, wherein the gas separation sensing means senses the concentration of hydrogen contained in the separated gas.

In the construction as set forth in the claim 6, gas is prevented from being further generated by restraining or stopping the energization of the electrode when the concentration of hydrogen in the gas separated by the gas/liquid separating means is increased by any abnormality, thereby making it possible to prevent hydrogen gas from being ignited.

The invention as set forth in the claim 7 is the water treatment device as set forth in the claim 5, further comprising exhausting means for exhausting the gas separated from the water in the gas/liquid separating means, the gas separation sensing means being exhaust sensing means for sensing circumstances where the gas is exhausted by the exhausting means.

In the construction as set forth in the claim 7, gas is prevented from being further generated by stopping the energization of the electrode in cases such as a case where the exhausting means develops a fault, thereby making it possible to prevent hydrogen gas from being ignited.

The invention as set forth in the claim 8 is the water treatment device as set forth in the claim 1, wherein two or more pairs of electrodes are provided in the electrolytic tank such that the energization can be performed independently for each of the pairs of electrodes, and the control means controls the energization by changing the number of pairs of electrodes to be simultaneously energized.

In the construction as set forth in the claim 8, the sterilizing capability of the water treatment device can be arbitrarily adjusted in accordance with the water quality of the water in the pool which varies depending on the number of visitors, the weather, the temperature, or the like.

When the number of visitors is rapidly increased during the business hours of the swimming pool or the public bath, the number of pairs of electrodes to be simultaneously energized is increased to enhance the sterilizing capability, thereby making it possible to keep the water quality approximately constant. On the other hand, when the number of visitors is small, the number of pairs of electrodes to be simultaneously energized is decreased, thereby making it possible to restrain power to be consumed.

Furthermore, the pairs of electrodes are alternately rested, thereby making it possible to prevent the electrodes from being deteriorated. That is, a scale mainly composed of calcium, magnesium, its oxide or hydroxide produced by electrolytic reaction from a calcium ion ($Ca^{2+}$) or a magnesium ion ($Mg^{2+}$) contained in water, is gradually deposited on a surface of the electrode that is a cathode. On the other hand, a surface of the electrode that is an anode is gradually eroded by sodium hypochlorite or active oxygen.

When a plurality of pairs of electrodes are alternately employed without continuously employing only one pair of electrodes, that is, one of the pairs of electrodes is employed, during which the other pairs of electrodes are rested, the electrode can be kept for a long time by preventing the deterioration thereof.

The invention as set forth in the claim 9 is the water treatment device as set forth in the claim 1, wherein a pair of electrodes is provided in the electrolytic tank, and the control means reverses the polarity of a voltage to be supplied to the pair of electrodes for each predetermined time period.

The scale is deposited, as described above, on the surface of the electrode that is the cathode in the pair of electrodes, so that the electrolyzing capability is gradually lowered. As a result, the sterilization efficiency tends to be gradually decreased.

Contrary to this, in the construction as set forth in the claim 9, the polarity of the voltage to be supplied to the pair of electrodes is periodically reversed, so that the deposited scale can be removed from the surface of the electrode by being ionized again and dissolved. Accordingly, the sterilization efficiency can be always kept approximately constant by making the most use of the electrolyzing capability of the pair of electrodes.

The invention as set forth in the claim 10 is the water treatment device as set forth in the claim 9, further comprising setting means for setting the hardness of the water, the control means controlling the length of a time period during which the polarity of a voltage is reversed depending on the hardness of the water set by the setting means.

In the invention as set forth in the claim 10, the length of the time period elapsed until the polarity is reversed can be controlled depending on the hardness of the water for defining the concentration of a calcium ion or a magnesium ion which causes the scale. That is, when the hardness of the water is high, the time period elapsed until the polarity is reversed can be set to a short time period. Accordingly, the scale is efficiently removed irrespective of the hardness of the water, the difference between areas, or the like, thereby making it possible to always stably perform the sterilization.

The invention as set forth in the claim 11 is the water treatment device as set forth in the claim 1, wherein a first plate-shaped electrode and a second plate-shaped electrode are arranged parallel to each other in the electrolytic tank, one or more plate-shaped electrodes are arranged parallel to both the first and second electrodes between the electrodes, and wiring for energization is connected to the first and second electrodes.

In the construction as set forth in the claim 11, the wiring for energization is connected to only the first and second electrodes at both ends out of the plurality of plate-shaped electrodes. Accordingly, the wiring structure can be simplified, and the number of portions, pulled out of the electrolytic tank, of the wiring can be reduced. Therefore, the water-tightness of the wiring is improved, thereby making it difficult for the water to leak.

In this case, a voltage is applied to the electrodes at both ends, so that both two surfaces of the middle electrode are polarized. Accordingly, a potential difference corresponding to the voltage applied between the two electrodes at both ends divided by the number of clearances among the electrodes occurs between the middle electrode and the adjacent electrode. Therefore, the middle electrode can sufficiently function as an electrode for sterilizing the water by the above-mentioned electrolytic reaction as a so-called bipolar type electrode.

The invention as set forth in the claim 12 is the water treatment device as set forth in the claim 11, wherein three or more plate-shaped electrodes are arranged parallel to both the first and second electrodes between the electrodes, and wiring for energization is connected to the first and second electrodes and the electrodes located at intervals of a predetermined number of electrodes between the first and second electrodes.

In the construction as set forth in the claim 12, the wiring for energization is also connected to the electrodes located at intervals of a predetermined number of electrodes between the first and second electrodes at both ends in addition to the function as set forth in the claim 11. Particularly when the number of electrodes is large, the voltage drop in the bipolar type electrode to which the wiring is not connected between the electrodes to which the wiring is connected is restrained, thereby making it possible to efficiently sterilize the water.

The invention as set forth in the claim 13 is the water treatment device as set forth in the claim 11, wherein the first and second electrodes are arranged such that they respectively contact to an inner wall surface of the electrolytic tank.

In the construction as set forth in the claim 13, respective outer surfaces of the first and second electrodes at both ends on which the scale is most easily deposited are concealed with the surfaces contact to the inner wall surface of the electrolytic tank such that they are not brought into contact with the water in addition to the function as set forth in the claim 11, thereby making it possible to lengthen the life of the electrode.

Specifically, the respective inner surfaces of the first and second electrodes or both the two surfaces of the electrode between both the electrodes make it possible to ionize, dissolve, and remove the scale deposited on the surface again to some extent by reversing the polarity of an applied voltage. However, the respective outer surfaces of both the electrodes at both ends hardly relate to the electrolytic reaction. Moreover, even if the polarity is reversed, the scale cannot be effectively removed. Accordingly, it is most effective in preventing the scale from being deposited to conceal the outer surfaces of the first and second electrodes at both ends with the surfaces contacting to the inner wall surface of the electrolytic tank such that they are not brought into contact with the water.

The invention as set forth in the claim 14 is the water treatment device as set forth in the claim 1, further comprising sterilizing solution producing means, comprising a second electrolytic tank to put in an electrolytic solution containing a chlorine ion and a second electrode provided in the second electrolytic tank in order to electrolyze the electrolytic solution, for pouring the electrolytic solution into the second electrolytic tank to energize the second electrode, and electrolyzing the electrolytic solution to produce a sterilizing solution, and a supplying path for supplying to a water treating path the sterilizing solution produced by the sterilizing solution producing means.

In the construction as set forth in the claim 14, the sterilizing solution having a sterilizing function containing a chlorine compound such as hypochlorous acid, its ion, or chlorine gas which is generated by energizing the second electrode to electrolyze the electrolytic solution containing the chlorine ion in a state where the electrolytic solution is poured into the second electrolytic tank in the sterilizing solution producing means can be supplied to the water treating path through the supplying path.

Therefore, the chlorine ion concentration of the water poured into the electrolytic tank in the electrolyzing and sterilizing means is increased, thereby making it possible to improve the efficiency of the electrolytic reaction by the electrode in the electrolyzing and sterilizing means. Moreover, the sterilizing solution which is previously produced by energizing the second electrode and stored in the electrolytic tank in the sterilizing solution producing means is supplied to the water treating path on demand, thereby making it possible to arbitrarily adjust the processing capability of the device in accordance with the water quality of water which varies depending on the number of visitors, the weather, the temperature, or the like.

For example, even if the number of visitors is rapidly increased during the business hours of the swimming pool, the public bath, or the like, the water quality can be kept approximately constant.

The electrode in the electrolyzing and sterilizing means is rested when the number of visitors is small, thereby making it possible to prevent the electrode from being deteriorated.

The invention as set forth in the claim 15 is the water treatment device as set forth in the claim 14, wherein the control means energizes the second electrode in a time zone in which water is not sterilized by the electrolyzing and sterilizing means, to produce the sterilizing solution, stores the produced sterilizing solution in the second electrolytic tank, and supplies the sterilizing solution stored in the second electrolytic tank to the water treating path on demand through the supplying path in a time zone in which water is sterilized by the electrolyzing and sterilizing means.

In the construction as set forth in the claim 15, the sterilizing solution is produced by the sterilizing solution producing means by making use of a break time zone of the device, for example, nighttime hours, is stored in the second electrolytic tank, and is supplied to the water treating path on demand as the number of visitors increases, for example, during the business hours of the swimming pool, the public bath, or the like, thereby making it possible to assist in sterilizing the water by the electrolyzing and sterilizing means.

Therefore, the power consumption in a time zone such as daytime hours in the summer where power conditions are liable to be tight because there are the largest number of visitors particularly in the swimming pool, and the amount of electric power consumed by air conditioners or the like is increased is prevented from being increased, thereby making it possible to contribute to the stable utilization of power.

Moreover, cheap power at night is utilized, thereby making it possible to also reduce the running cost of the device.

The invention as set forth in the claim 16 is the water treatment device as set forth in the claim 1, wherein the control means pours the electrolytic solution containing a chlorine ion into the electrolytic tank in the electrolyzing and sterilizing means to energize the electrode in a time zone in which water is not sterilized by the electrolyzing and sterilizing means, and electrolyzes the electrolytic solution to produce the sterilizing solution.

In the construction as set forth in the claim 16, it is possible to produce the sterilizing solution by the electrolyzing and sterilizing means by making use of a break time zone of the device, for example, nighttime hours.

The water poured into the electrolytic tank through the water treating path while supplying the produced sterilizing solution to the pool through the water treating path is sterilized by energizing the electrode, thereby making it possible to more reliably and quickly perform the sterilization particularly at the time of starting the business hours of the swimming pool, the public bath, or the like.

In this case, the chlorine ion concentration of the water poured into the electrolytic tank is increased, thereby making it possible to also improve the efficiency of the electrolytic reaction by the electrode in the electrolyzing and sterilizing means.

The invention as set forth in the claim 17 is the water treatment device as set forth in the claim 16, comprising a sterilizing solution tank to put in the sterilizing solution produced by the electrolyzing and sterilizing means, a first supplying path for supplying the sterilizing solution to the sterilizing solution tank from the electrolytic tank, and a second supplying path for supplying the sterilizing solution to the water treating path from the sterilizing solution tank, the control means pouring the sterilizing solution produced in the electrolyzing and sterilizing means into the sterilizing solution tank through the first supplying path in a time zone in which water is not sterilized by the electrolyzing and sterilizing means, and the sterilizing solution stored in the sterilizing solution tank being supplied to the water treating path on demand through the second supplying path in a time period during which water is sterilized by the electrolyzing and sterilizing means.

In the construction as set forth in the claim 17, the sterilizing solution produced at night, for example, is stored in the sterilizing solution tank, and is supplied to the water treating path on demand as the number of visitors increases, for example, during the business hours of the swimming pool, the public bath, or the like in addition to the function as set forth in the claim 16, thereby making it possible to assist in sterilizing the water by the electrolyzing and sterilizing means.

As in the claim 15, the power consumption in a time zone such as daytime hours in the summer where power conditions are liable to be tight because there are the largest number of visitors particularly in the swimming pool, and the amount of electric power consumed by air conditioners or the like is increased is prevented from being increased, thereby making it possible to contribute to the stable utilization of power. Further, cheap power at night is utilized, thereby making it possible to reduce the driving cost of the device.

As the electrolytic solution used in the construction as set forth in the claims 14 to 17, a solution of common salt (sodium chloride) which is easily obtained and handled and is cheap is suitable.

The invention as set forth in the claim 18 is the water treatment device as set forth in the claim 1, further comprising a solution tank to put in an electrolytic solution containing a chlorine ion having a sterilizing function, and a supplying path for supplying the electrolytic solution poured into the solution tank to the electrolytic tank in the electrolyzing and sterilizing means, the control means supplying the electrolytic solution stored in the solution tank to the electrolytic tank on demand through the supplying path while sterilizing the water by the electrolyzing and sterilizing means.

In the construction as set forth in the claim 18, the electrolytic solution itself also functioning as the sterilizing solution can be supplied to the electrolytic tank on demand through the supplying path during the business hours of the swimming pool, the public path, or the like. Also in this case, the chlorine ion concentration in the electrolytic tank is increased, thereby making it possible to increase the efficiency of the electrolytic reaction by the electrode or arbitrarily adjust the processing capability of the device in accordance with the water quality of the water which varies depending on the number of visitors, the weather, the temperature, or the like.

Even if the number of visitors is rapidly increased during the business hours of the pool, for example, therefore, the water quality can be kept approximately constant. Moreover, the pair of electrodes is rested, when the number of visitors is small, thereby making it possible to also prevent the electrodes constituting the pair of electrodes from being deteriorated.

Furthermore, the power consumption in a time zone in which power conditions are liable to be tight is prevented from being increased, thereby making it possible to also contribute to stable utilization of power.

An example of the electrolytic solution used in the construction as set forth in the claim 18 is a solution of hypochlorite such as sodium hypochlorite.

The invention as set forth in the claim 19 is the water treatment device as set forth in the claim 1, further comprising pH sensing means for measuring the pH of water, an adjusting solution tank to put in a pH adjusting solution for adjusting the pH of water, and a supplying path for supplying to the water treating path the pH adjusting solution poured into the adjusting solution tank, the control means supplying the pH adjusting solution to the water treating path from the adjusting solution tank on demand through the supplying path to adjust the pH of the water on the basis of an output of the pH sensing means.

In the construction as set forth in the claim 19, the pH of the water can be adjusted by the pH adjusting solution supplied from the adjusting solution tank in a predetermined range (generally around 4.5) which is suitable for the electrolytic reaction, that is, in which the electrolytic reaction easily progresses when the electrode is energized, thereby making it possible to always maintain the efficiency of the sterilization at a high level irrespective of the water quality of the water.

In the public bath, for example, the pH of the water can be also adjusted to the range of the pH which has characteristics, for example, an acid bath or an alkaline bath.

The invention as set forth in the claim 20 is the water treatment device as set forth in the claim 19, comprising a first adjusting solution tank to put in an alkaline pH adjusting solution, a first supplying path for supplying to the water treating path the pH adjusting solution poured into the first adjusting solution tank, a second adjusting solution tank to put in an acid pH adjusting solution, and a second supplying path for supplying to the water treating path the pH adjusting solution poured into the second adjusting solution tank, the control means supplying the alkali and/or acid pH adjusting solution to the water treating path from the first or second adjusting solution tank on demand through the first or second supplying path on the basis of an output of the pH sensing means, to adjust the pH of the water. For example, when the water is acid water, and the target pH is neutral or alkaline, only the first adjusting solution tank and the first supplying path for the alkaline pH adjusting solution may be provided. When the water is alkaline water, and the target pH is neutral or acid, only the second adjusting solution tank and the second supplying path for the acid pH adjusting solution may be provided. In the construction as set forth in the claim 20 comprising both the tank and the supplying path, the pH of the water in the pool can be strictly maintained by the target value irrespective of the pH of raw material water and the target pH.

The invention as set forth in the claim 21 is the water treatment device as set forth in the claim 1, wherein the electrolytic tank comprises an inlet for pouring an acid serving as a cleaning solution, and an outlet for discharging a solution in the electrolytic tank.

In the construction as set forth in the claim 21, after an inorganic acid and/or an organic acid serving as a cleaning solution is poured from the inlet provided in the electrolytic tank as maintenance outside the business hours and on the closed days of the swimming pool, the public bath, or the like, to dissolve or strip the scale deposited mainly on the surface of the electrode in the electrolytic tank, the scale, together with the cleaning solution, can be discharged and removed from the outlet, thereby making it possible to lengthen the life of the whole system.

As described in the foregoing, the scale deposited on the surface of the electrode can be removed to some extent by reversing the polarity of the voltage applied to the electrode. However, the larger the number of times of the reverse of the polarity is, the shorter the life of the electrode tends to be made.

Contrary to this, the step of maintenance for removing the scale by the cleaning solution is interposed, thereby making it possible to reduce the number of times of the reverse of the polarity and lengthen the life of the electrode.

Particularly a hydroxide of calcium or magnesium is easily deposited as a scale in portions other than the electrode because the solubility in water is decreased by the rise in the temperature or the rise in the pH. The scale deposited in the portions cannot be removed even if the polarity of the electrode is reversed, and causes piping or the like to be clogged. If the cleaning solution is used, however, the scales can be simply removed.

The invention as set forth in the claim 22 is directed to a water treatment device comprising electrolyzing and sterilizing means, comprising an electrolytic tank to put water in and an electrode provided in the electrolytic tank in order to electrolyze the water, for pouring water into the electrolytic tank, energizing the electrode, and electrolyzing the water, to sterilize the water; a water treating path connected to a pool storing water for pouring the water in the pool into the electrolytic tank and returning to the pool the water in the electrolytic tank; current sensing means for measuring the value of current flowing through the electrode; conductivity measuring means for measuring the electrical conductivity of water; and scale adhesion judging means for judging how a scale adheres to the electrode on the basis of outputs of the current sensing means and the conductivity measuring means.

The invention as set forth in the claim 23 is the water treatment device as set forth in the claim 22, further comprising life judging means for judging the life of the electrode on the basis of the outputs of the current sensing means and the conductivity measuring means.

In the construction as set forth in the claims 22 and 23, it is possible to accurately judge the amount of the scale adhering to the electrode and the life of the electrode. The reason for this is that when a predetermined DC voltage is generally applied between the electrodes, the value of current flowing between the electrodes is proportional to the conductivity $\sigma$ of the solution supplied to the electrolytic tank. Consequently, the relationship of $I=K\sigma$ holds between the conductivity $\sigma$ and current $I$ flowing between the electrodes, where K is a proportional constant.

The proportional constant K always assumes the same value if the electrode does not vary. Actually when the current is caused to flow through the electrode to continue electrochemical reaction, however, the surface of the electrode is covered with the scale or the like, the electrode corrodes, or a surface catalyst of the electrode is exhausted. Accordingly, the value of K is gradually decreased. Therefore, the value of K is always found by an operation, thereby making it possible to judge how the scale adheres to the electrode and judge the life of the electrode.

The invention as set forth in the claims 22 and 23 is for judging how the scale adheres to the electrode and/or the life of the electrode on the basis of such a principle.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 4A and 4B are a front view and a side view of a unit in which the water treatment device according to the one embodiment of the present invention is arranged in a cabinet, which illustrate a state where panels on a front surface and a side surface of the cabinet are removed such that the internal structure can be seen;

DESCRIPTION OF PREFERRED EMBODIMENTS

Figure 1:
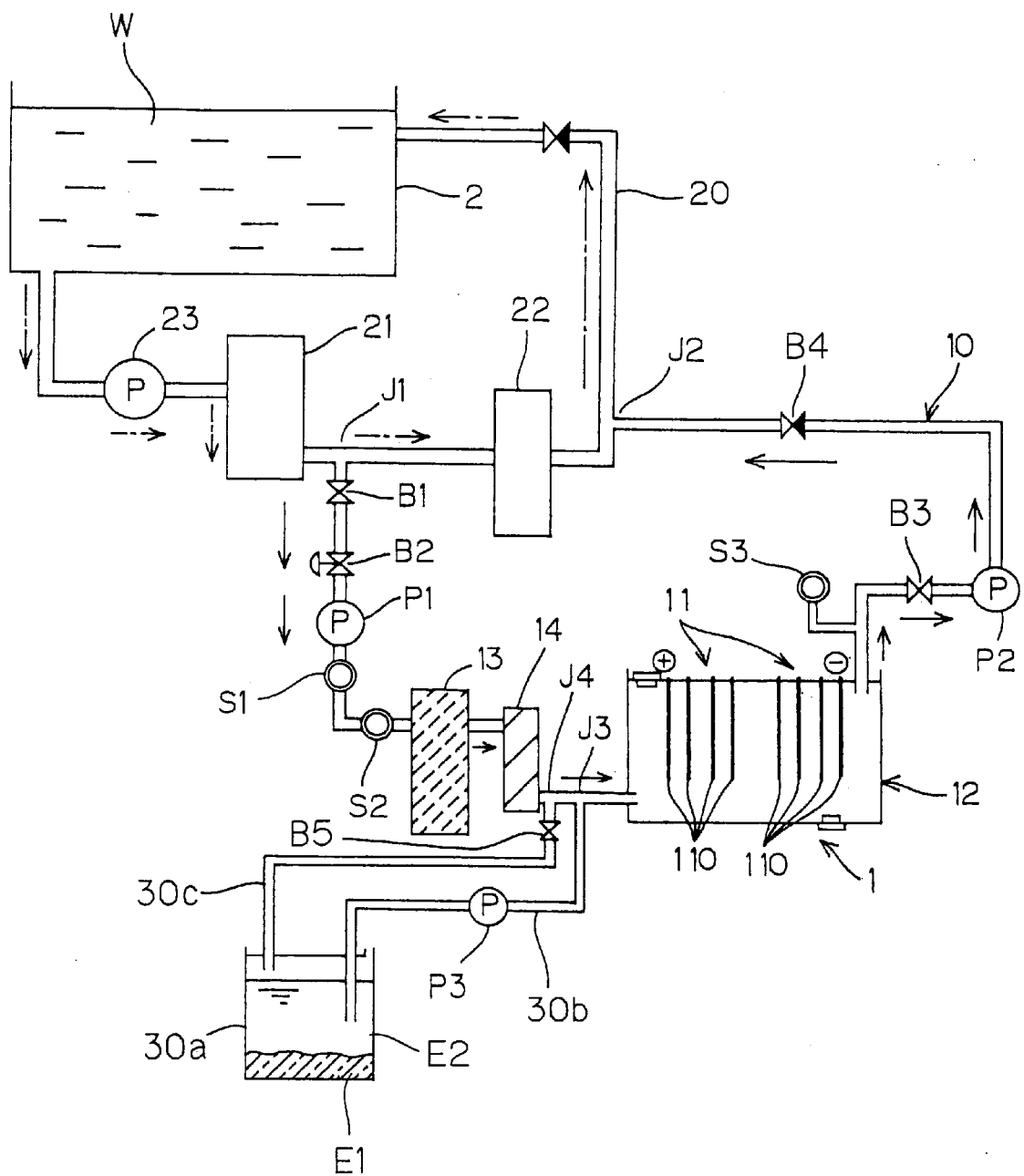
FIG. 1 is a diagram schematically showing a structure in which a water treatment device according to an embodiment of the present invention is incorporated into a large-sized pool such as a swimming pool or a bathtub of a public bath.

FIG. 1 is a diagram schematically showing a structure in which a water treatment device 1 according to an embodiment of the present invention is incorporated into a large-sized pool 2 such as a swimming pool or a bathtub of a public bath.

The pool 2 comprises a main circulating path 20 for circulating water W stored therein. A circulating pump 23, a filter 21 for filtration, and a heat exchanger 22 for heating the water W are arranged in the main circulating path 20. The water W in the pool 2 is circulated in the main circulating path 20, as indicated by an arrow with a one-dot and dash line.

The water treatment device 1 has a water treating path which is branched from a branching point J1, on the downstream side of the filter 21, on the main circulating path 20 to take up water and is merged at a branching point J2, on the downstream side of the heat exchanger 22, on the main circulating path 20 to return the water.

An adjusting valve B1 for adjusting the flow rate, a pressure reducing valve B2 for reducing pressure, a circulating pump P1, a conductivity sensor S1 for measuring the total concentration of ions in the water, a residual chlorine sensor S2 for measuring the concentration of residual chlorine in the water, a filter 13 for filtration, an ion exchange resin 14, an electrolytic tank 12 in electrolyzing and sterilizing means, a valve B3, a circulating pump P2, and a check valve B4 for preventing back flow are arranged on the water treating path 10.

A part, between the ion exchange resin 14 and the electrolytic tank 12, of the water treating path 10 is provided with a path for adding an electrolytic solution.

Specifically, an introducing path 30c is branched from a branching point J4. A valve B5 is interposed halfway on the introducing path 30c. The water is supplied to a solution tank 30a through the introducing path 30c by opening the valve B5. An electrolyte E1 such as sodium chloride is contained in the solution tank 30a. The water is supplied to the solution tank 30a, so that an electrolytic solution E2 having a saturation concentration is produced and stored in the solution tank 30a. The electrolytic solution E2 is sucked up through a supplying path 30b by a fixed delivery pump P3, is merged into the water treating path 10 at a branching point J3, and is supplied to the electrolytic tank 12.

As the electrolytic solution E2 supplied from the solution tank 30a, a solution of sodium chloride, described above, may be replaced with a solution of calcium chloride, hydrochloric acid, or the like, provided that it contributes to electrolytic reaction of the water.

The electrolyte may be supplied to the solution tank 30a every time the valve B5 is opened to take up water from the water treating path 10. However, an electrolyte in a large amount corresponding to several times to dozens of times of supply can be previously supplied to the solution tank 30a as a solid electrolyte such as sodium chloride. Accordingly, it is possible to save time and labor in supplying the electrolyte. That is, when water corresponding to one time of supply is poured into the solution tank 30a, an electrolyte in an amount corresponding to the amount of the poured water, that is, enough to be saturated is dissolved in the water, but is not further dissolved after it is saturated to remain as a solid content. Accordingly, the electrolyte corresponding to several times to dozens of times of supply can be previously supplied to the solution tank 30a, as described above, thereby making it possible to reduce the number of times of supply. The electrolytic solution produced by dissolving the electrolyte does not require an operation for adjusting the amount of the electrolyte to make the concentration thereof constant because the concentration thereof becomes an approximately constant saturation concentration irrespective of a slight difference by the temperature, as described above. Accordingly, it is possible to save time and labor in supplying the electrolyte.

The electrolytic tank 12 comprises a plurality of pairs of electrodes 11. Each of the pairs of electrodes 11 has a plurality of plate-shaped electrodes 110. An example of the electrode 110 is preferably one obtained by coating the whole surface of a board made of titanium (Ti) with a thin film of a noble metal such as gold (Au), platinum (Pt), palladium (Pd), or platinum-iridium (Pt-Ir) by plating or sintering.

A water path on the side of an outlet of the electrolytic tank 12 comprises a pressure gauge S3 for measuring the pressure of the water flowing out of the electrolytic tank 12.

The function of the water treatment device 1 is as follows.

The water in the pool 2 is drawn by the circulating pump 23, and sand is removed by the filter 21. The water is divided into water returned to the pool 2 through the heat exchanger 22 and water flowing into the water treating path 10 at the branching point J1. The water flowing into the water treating path is circulated by the circulating pump P1 after the flow rate and the water pressure thereof are respectively adjusted by the adjusting valve B1 and the pressure reducing valve B2. The water to be circulated is supplied via the conductivity sensor S1 and the residual chlorine sensor S2 to the filter 13, where the organic matter is removed from the water. The water, from which the organic matter has been removed, is supplied to the electrolytic tank 12 after ions such as $Ca^{2+}$ and $Mg^{2+}$ are removed by the ion exchange resin 14. An example of the filter 13 is a non woven fabric made of a polypropylene fiber.

The electrolytic solution E2 is fed into the electrolytic tank 12 by the fixed delivery pump P3 on demand from the solution tank 30a. Consequently, the solution in the electrolytic tank 12 enters a state where it can be electrolyzed.

In the electrolytic tank 12, DC current is caused to flow through the pairs of electrodes 11, so that electrolysis based on the above-mentioned reaction formula is performed. The water is sterilized by a chlorine compound such as hypochlorous acid (HClO), its ion (ClO$^-$), or chlorine gas (Cl$_2$) which is generated by the reaction, active oxygen (O$_2^-$) generated for a very short time in the reaction process, or the like.

The water which has passed through the electrolytic tank 12 is circulated by the circulating pump P2 via the valve B3 after the pressure thereof is measured by the pressure gauge S3. The water to be circulated is merged into the water in the main circulating path at the branching point J2 via the check valve B4 and is returned to the pool 2. In this case, the amount of reduced pressure by the pressure reducing valve B2 is adjusted according to the water pressure measured by the pressure gauge S3 in order to prevent pressure inside the electrolytic tank 12 from being extraordinarily increased.

Figure 2:
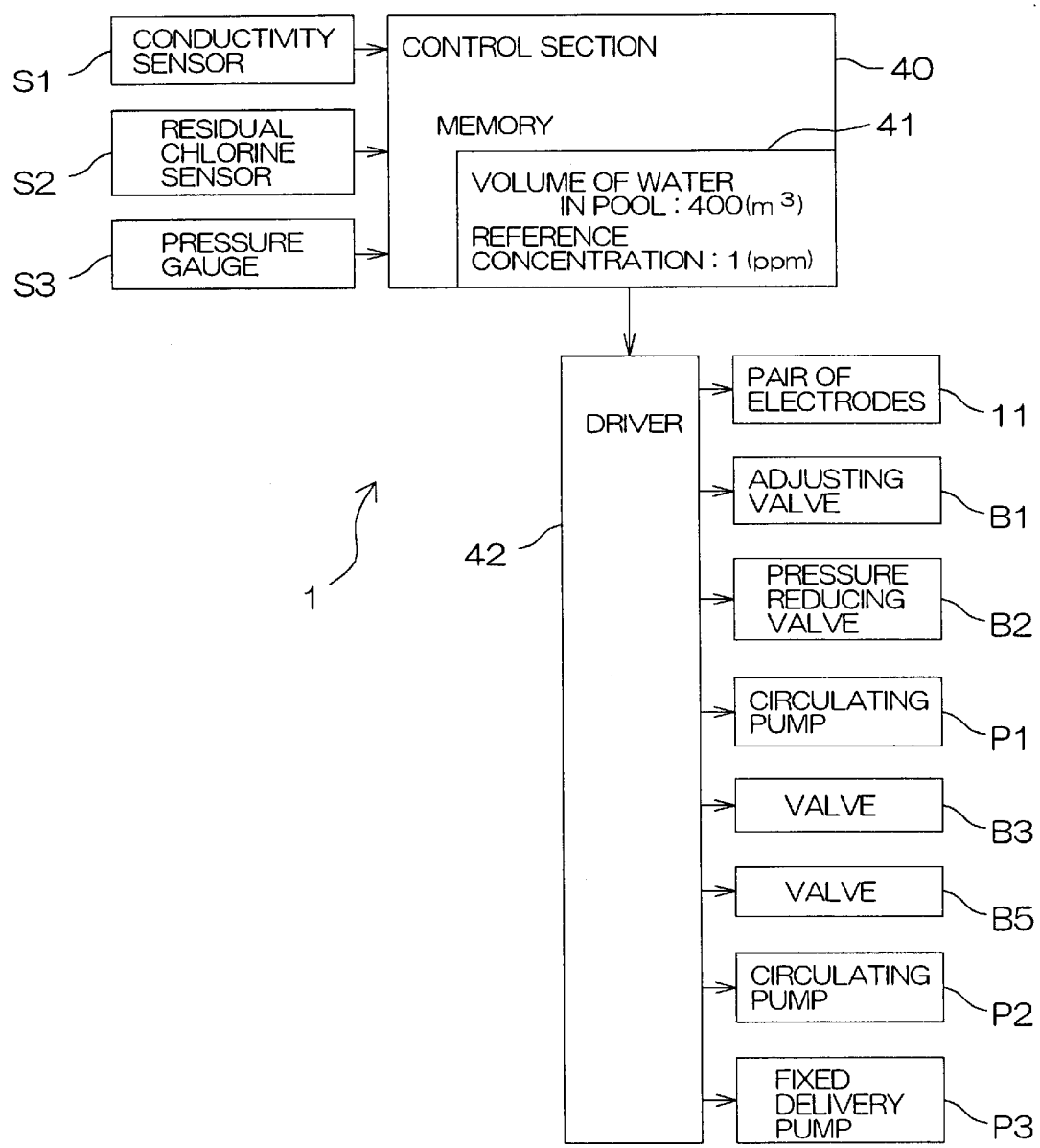
FIG. 2 is a block diagram showing the electrical configuration of the water treatment device according to the one embodiment of the present invention.

FIG. 2 is a block diagram showing the electrical configuration of the water treatment device 1 shown in FIG. 1.

The water treatment device 1 comprises a control section 40 composed of a microcomputer or the like. Outputs of the conductivity sensor S1, the residual chlorine sensor S2, and the pressure gauge S3 are fed to the control section 40. The control section 40 comprises a memory 41. The volume of water stored in the pool 2 (for example, 400 [m$^3$]) and the reference residual chlorine concentration in the pool 2 (for example, 1 [ppm]) are registered in the memory 41.

The control section 40 performs an operation, described later, on the basis of the outputs of the conductivity sensor S1, the residual chlorine sensor S2, and the pressure gauge S3, and feeds a control signal to a driver 42 on the basis of the operation. The driver 42 controls electric current flowing through the pair of electrodes 11 and a time period during which the pair of electrodes 11 is energized, and the adjusting valve B1, the pressure reducing valve B2, the circulating pump P1, the valves B3 and B5, the circulating pump P2, and the fixed delivery pump P3.

Figure 3:
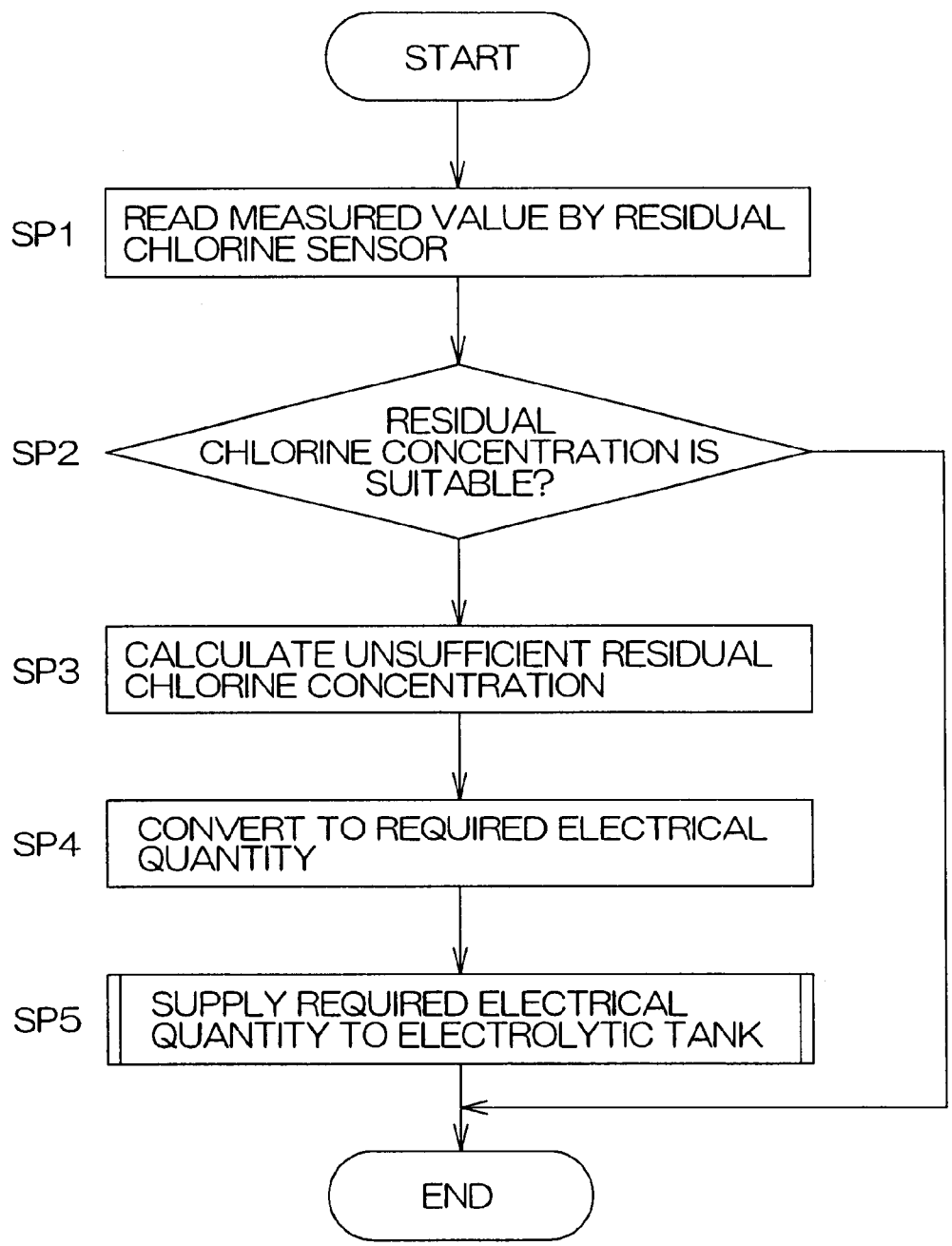
FIG. 3 is a flow chart showing the contents of control carried out by a control section.

FIG. 3 is a flow chart showing the contents of control carried out by the control section 40. Description is made of a control operation performed by the control section 40 in accordance with the flow of the flow chart.

When a person in charge turns on the power of the water treatment device 1 first in the morning, for example, the control section 40 requests the residual chlorine sensor S2 to transmit the measured residual chlorine concentration. Correspondingly, the residual chlorine sensor S2 transmits the residual chlorine concentration X which is being currently measured. Consequently, the current residual chlorine concentration X is read in the control section 40 (step SP1).

The read residual chlorine concentration x is compared with a reference concentration: 1 [ppm] registered in the memory 41 (step SP2). If it is the read residual chlorine concentration X=1 [ppm], processing at this time point is terminated.

On the other hand, when the read residual chlorine concentration X is X=0.9 [ppm], for example, the control section 40 calculates an insufficient residual chlorine concentration (step SP3). The following equation (1) is used for the calculation:

$$(1-X) \times 400 = (1-0.9) \times 400 = 40 [g] \tag{1}$$

The control section 40 converts the insufficient residual chlorine concentration to a required electrical quantity (step SP4).

A state where residual chlorine (HClO, ClO$^-$, Cl$_2$) normally exists is determined by the pH of water. For example, the hydrogen ion concentration as a sanitary basis of the swimming pool, for example, is pH=5.8 to 8.6. At pH=7.2 which is a middle value, the residual chlorine is HClO≈65% and ClO$^-$≈35%. The required electrical quantity is as follows when it is calculated, assuming that the pH of water in the pool 2 is pH≈7.2:

$$\frac{40}{(52.5 \times 0.65 + 51.5 \times 0.35)} \times 6.022 \times 1.602 \times 10^4 = \tag{2}$$

$$40/52.15 \times 6.022 \times 1.602 \times 10^4 \approx 74 \times 10^3 [C]$$

In the above-mentioned equation (2), 52.5 is the molecular weight of HClO, 51.5 is the molecular weight of ClO$^-$, 6.022×10$^{23}$ is the Avogadro's number, 1.602×10$^{-19}$ [C] is the amount of electric charge of an electron and a proton.

When the efficiency of chlorine generated according to the quality of supplied electricity is taken as η[%], an electrical quantity actually required is as follows by calculation:

$$74 \times 10^3 \times (100/\eta) \tag{3}$$

The efficiency η is a constant determined by the material of the electrode and the NaCl concentration of the electrolytic solution, which is generally approximately 15 [%]. When 15 is substituted in η, therefore, the following equation is given:

$$74 \times 10^3 \times (100/15) \approx 493 \times 10^3 [C] \tag{4}$$

If current at which electricity is delivered in this quantity is caused to flow, the average of the residual chlorine concentration in the pool 2 is 1 [ppm].

In the electrolytic tank 12, the concentration of the residual chlorine generated by electrolysis is determined by the concentration of an electrolyte contained in water in the electrolytic tank 12, the flow rate of the water, and the quantity of electricity supplied to the pair of electrodes 11. Accordingly, the control section 40 feeds a required control signal to the driver 42, and the driver 42 controls the amount of energization of the pair of electrodes 11. Further, the adjusting valve B1, the pressure reducing valve B2, the circulating pumps P1 and P2, and the valve B3 are suitably adjusted, to adjust the flow rate of the water flowing through the electrolytic tank 12. Further, the control section 40 controls the valve B5 and the fixed delivery pump P3 through the driver 42, to adjust the concentration of the electrolyte contained in the water in the electrolytic tank 12. By taking each of the valves as an electromagnetic valve, the degree of opening or closing thereof can be easily controlled by the driver 42.

If it is assumed that a suitable amount of energization of the pair of electrodes 11 is 252[A], the following equation is required in order to cause current at which electricity is delivered in the quantity found in the foregoing equation (4) to flow:

$$493 \times 10^3 / 252 \approx 1956 [s] \tag{5}$$

Specifically, the current is caused to flow for approximately 32 minutes, so that the residual chlorine concentration is raised by the electrolysis, thereby making it possible to take the residual chlorine concentration in the pool 2 as 1 [ppm] which is the reference concentration (step SP5).

FIGS. 4A and 4B are diagrams showing the appearance of the water treatment device 1 which is formed as a unit in a cabinet 1a. The unit is located in facilities such as the swimming pool.

A filter unit 1b containing the filter 13 and the ion exchange resin 14, the electrolytic tank 12, and the circulating pump P2, a power source 1c for supplying power for operating the respective members of the device, as described above, and a microcomputer (a sequencer) 1d constituting the control section 40 for operating the members in accordance with a predetermined procedure are arranged in the cabinet 1a. Further, the solution tank 30a and the fixed delivery pump P3 are arranged adjacent to the cabinet 1a and outside thereof. The members are connected to one another by the water treating path 10, the supplying path 30b, and the introducing path 30c.

A pan if receiving water drained from the water treatment device 1 is provided under the electrolytic tank 12, and the drained water received by the pan If is discharged from a total discharge port 1g.

Figure 5:
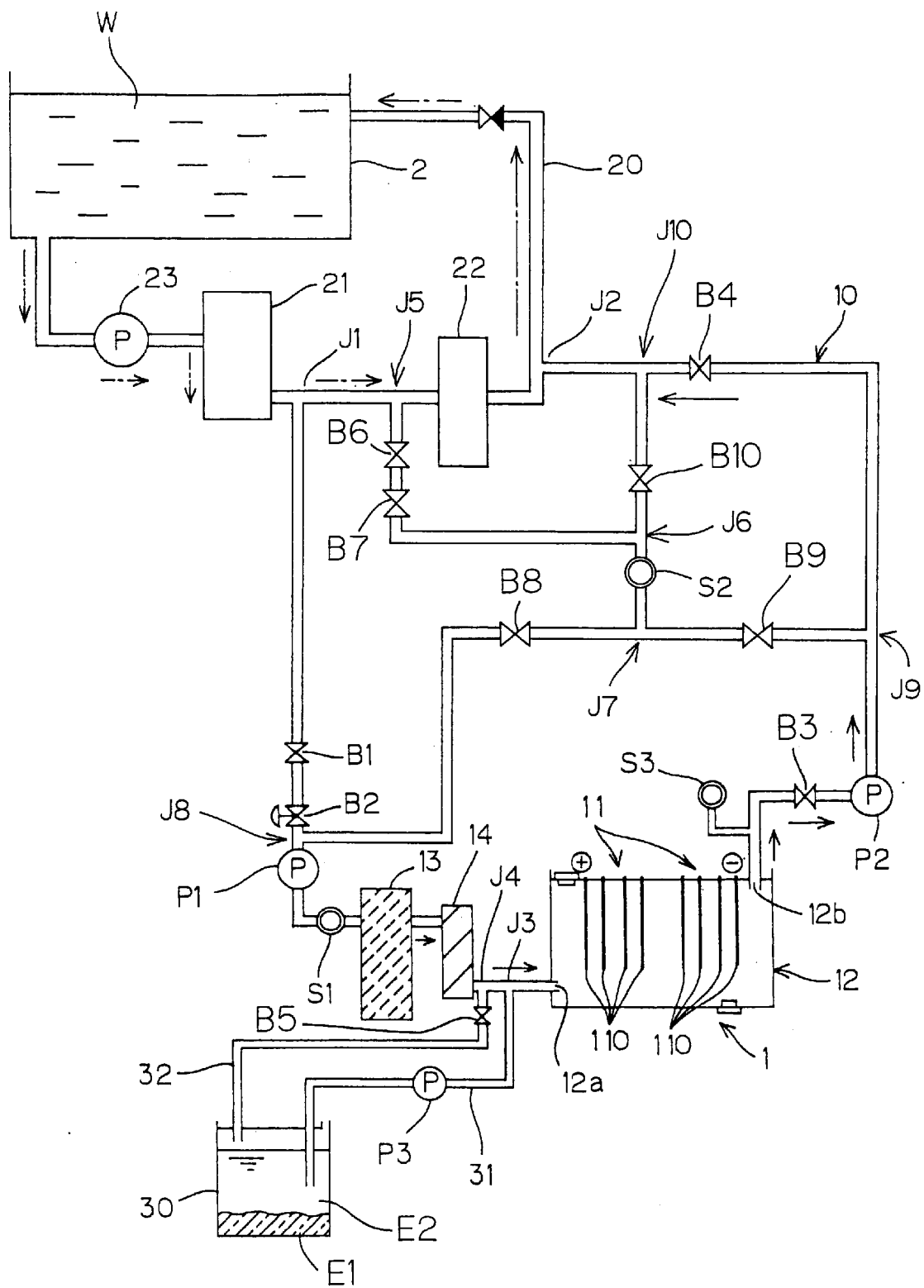
FIG. 5 is a diagram showing the construction of a water treatment device for a large-sized pool according to another embodiment of the present invention.

FIG. 5 is a diagram showing the construction of a water treatment device 1 for a large-sized pool 2 according to another embodiment of the present invention. The construction shown in FIG. 5 differs from the construction shown in FIG. 1 in piping in the water treatment device 1. The same members as those shown in FIG. 1 are assigned the same reference characters. B6, B8, B9, and Bare valves individually opened or closed by an electric signal from a control section, B7 is an adjusting valve for adjusting the flow rate, and J5 to J10 are branching points in the piping.

In the construction shown in FIG. 5, a state where water which has not been treated by an electrolytic tank 12 flows and a state where water which has been treated by the electrolytic tank 12 flows are switched by opening or closing each of the valves with respect to a residual chlorine sensor S2. The residual chlorine concentration of the water which has not been treated yet and the residual chlorine concentration of the water which has been treated can be measured by the one residual chlorine sensor S2.

The valves B6 and B8 are opened, and the valves B9 and Bare closed. Consequently, the water flows through a branching point J1, the branching point J8, the electrolytic tank 12, the branching point J9, the branching point J10, and a branching point J2 in this order, and also flows through the branching point J5, the branching point J6, the branching point J7, and the branching point J8, and the electrolytic tank 12 which constitute a path provided with the sensor S2 in this order. Accordingly, the water which has not been treated by the electrolytic tank 12 flows through the residual chlorine sensor S2.

On the other hand, the valves B9 and Bare opened, and the valves B6 and B8 are closed. Consequently, the water flows through the branching point J1, the branching point J8, the electrolytic tank 12, the branching point J9, the branching point J10, and the branching point J2 in this order, and also flows through the branching point J9, the branching point J7, the branching point J6, and the branching point J10 which constitute a path provided with the sensor S2 in this order. Accordingly, the water which has been treated by the electrolytic tank 12 flows through the residual chlorine sensor S2.

Hypochlorous acid in residual chlorine generated by the electrolytic tank 12 has high corrosion property. When the concentration of the generated hypochlorous acid is too high, therefore, the possibility that a stainless pipe or a steel pipe on the water treating path 10 are corroded is increased. Consequently, the residual chlorine concentration of the water, which has been treated, discharged from the electrolytic tank 12 must, in some cases, be measured to carry out control such that the concentration is not more than a certain value.

Therefore, the piping is constructed, as shown in FIG. 5, to switch the path of water flowing through the residual chlorine sensor S2 using the valves. As a result, when the residual chlorine concentration of water W in the pool 2 is measured, the valves are opened or closed in the above-mentioned former combination, as described above. On the other hand, when the residual chlorine concentration of the water which has been treated by the electrolytic tank 12 is measured, the-valves are opened or closed in the above-mentioned latter combination.

The amount of energization, through the pair of electrodes 11 is controlled on the basis of the residual chlorine concentration of the water which has not been treated and the residual chlorine concentration of the water which has been treated, which are measured by the residual chlorine sensor S2.

Specifically, through the pair of electrodes 11, control is carried out such that current in an electrical quantity in coulombs expressed by the foregoing equation (4) is caused to flow and the residual chlorine concentration of the water which has been treated falls within a predetermined value.

The control can be also carried out by controlling not only the amount of energization but also the amount of an electrolytic solution E2 to be added, or adjusting the flow rate of water to be introduced into the electrolytic tank 12.

Figure 6:
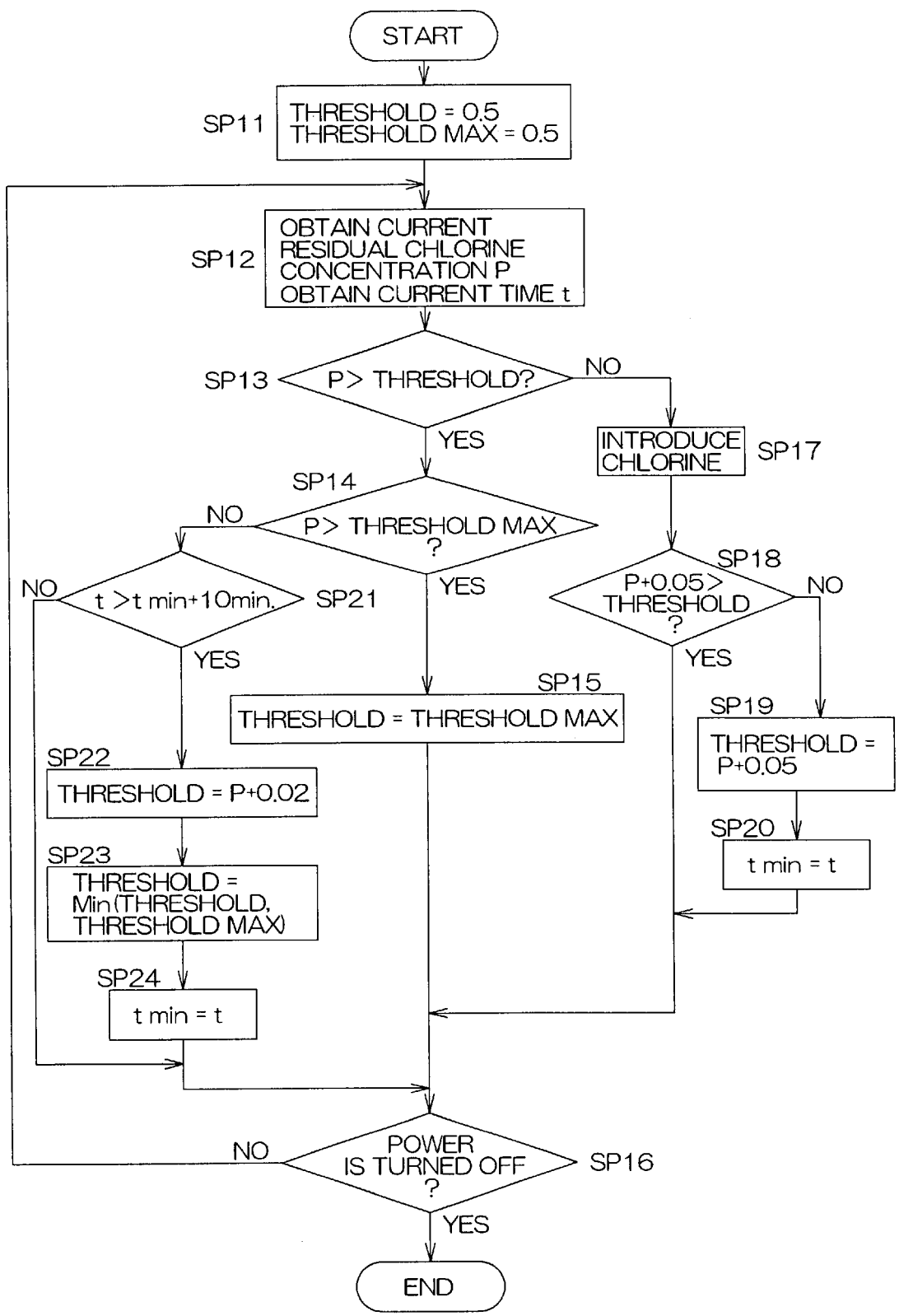
FIG. 6 is a flow chart showing processing for preventing overshoot from occurring in a case where the measured residual chlorine concentration is compared with a threshold.

FIG. 6 is a flow chart showing processing for preventing such that such overshoot that the residual chlorine concentration is too high by introducing chlorine from occurring in a case where the control section compares a measured value read from the residual chlorine sensor S2 with a threshold.

"The introduction of chlorine" includes processing for directly introducing chlorinated lime, sodium hypochlorite, or the like, into the pool 2, the water treating path 10, or the like in addition to processing for generating free residual chlorine by electrolytic reaction in the electrolytic tank 12, previously described.

In the control section, a threshold=0.5 [ppm] and a threshold MAX=0.5 [ppm] are first set (step SP11). The current residual chlorine concentration P measured by the residual chlorine sensor S2 is obtained. The time t when the concentration P is obtained is obtained (step SP12).

It is judged whether or not the concentration P is more than the threshold=0.5 (step SP13). If the concentration P is more than the threshold, it is further judged whether or not the concentration P is more than the threshold MAX=0.5 (step SP14). If the concentration P is more than the threshold MAX, the threshold is set to the threshold MAX (step SP15). It is judged at the step SP16 whether or not the power is turned off. If power is not turned off, the program is returned to the step SP12.

On the other hand, if the concentration P is not more than the threshold at the step SP13, the program proceeds to the step SP17. At the step SP17, chlorine is introduced. A value obtained by adding 0.05 [ppm] to the concentration P is compared with the threshold (step SP18).

If the measured concentration P is only made slightly lower than the threshold, the answer is in the affirmative at the step SP18. Therefore, the program proceeds to the step S16.

On the other hand, if the measured concentration P is made extremely lower than the threshold, the answer is in the negative at the step SP18. In this case, the threshold is changed to a value relating to the measured concentration P. That is, the threshold is changed to P+0.05 (step PS19). The current time t is set to tmin (step SP20).

The program is then returned from the step SP16 to the step SP12. At the step SP12, the measured concentration P by the residual chlorine sensor S2 and the current time t are read again (step SP12). The read concentration P is compared with the threshold (step SP13). Even when chlorine is introduced at the step SP17 last time, the results of the introduction of chlorine are not immediately reflected on the measured value by the residual chlorine sensor S2. There is some time lag. Generally, the program proceeds to the step SP17 several times from the step SP13. At the step SP17, the introduction of chlorine is repeated several times.

Before long, the measured concentration P exceeds the threshold at the step SP13. Consequently, the measured concentration P is compared with the threshold MAX at the step SP14. If the measured concentration P is not more than the threshold MAX, the program proceeds to the step SP21.

At the step SP21, it is judged whether or not ten minutes have elapsed from the present time t set at the step SP20. Every time ten minutes have elapsed, the threshold is increased by 0.02 [ppm], for example (step SP22). That is, at the step SP22, when the measured concentration P is made extremely lower than the threshold, the threshold is changed to a value relating to the measured concentration P. Since the threshold cannot be kept at a low value, the threshold is gradually increased, as described above, every minutes at the step SP22.

At the step SP23, the threshold and the threshold MAX are then compared, and the smaller threshold is set again as a threshold. It is possible to illustrate, as a case where the threshold is more than the threshold MAX, a case where the threshold is 0.49, for example, when it is further increased every ten minutes, and the threshold is further increased by 0.02. The processing at the step SP23 is provided such that the threshold is not made higher than the threshold MAX.

The time when the threshold is set is set as tmin (step SP24).

Thereafter, the processing at the step SP12 and the subsequent steps is repeated.

In the flow chart shown in FIG. 6, description was made of an example in which the threshold which is a comparative value of the residual chlorine concentration P is lowered when the measured residual chlorine concentration P is extremely low. Even if such control is replaced with control carried out by determining the upper limit amount of chlorine introduced by the chlorine introducing means such that chlorine in an amount which is not less than the upper limit amount is not introduced within a predetermined time period, it is also possible to prevent such overshoot that the residual chlorine concentration is too high.

Figure 7:
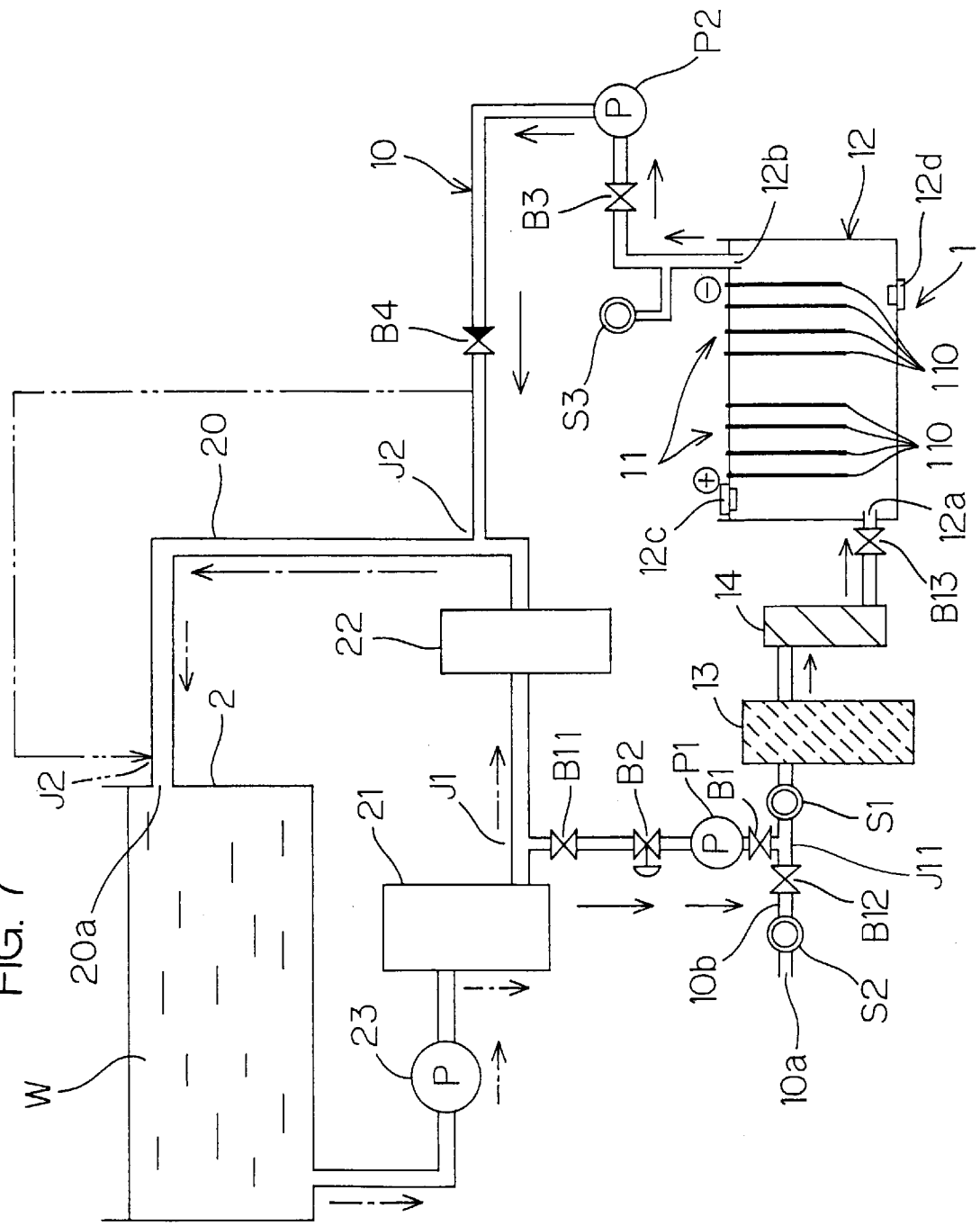
FIG. 7 is a diagram showing the construction of a water treatment device for a large-sized pool according to another embodiment of the present invention.

FIG. 7 is a diagram showing the construction of a water treatment device 1 for a large-sized pool 2 according to another embodiment of the present invention. The construction shown in FIG. 7 differs from the construction shown in FIG. 1 in that the solution tank 30a for supplying an electrolytic solution, is omitted and in piping in a residual chlorine sensor S2. The same members as those shown in FIG. 1 are assigned the same reference characters. Reference character B11 denotes a valve for cutting off a water treating path 10 from a main circulating path 20, together with a check valve B4. An electrolyte is supplied by hand on the basis of the total concentration of ions measured by a conductivity sensor S1 or the residual chlorine concentration measured by the residual chlorine sensor S2.

The residual chlorine sensor S2 is arranged on a branching path 10b branched at a branching point J11 between the conductivity sensor S1 and an adjusting valve B1 on the water treating path 10 and leading to a drain port 10a through an adjusting valve B12 for flow rate adjustment. The residual chlorine sensor S2 is preferably arranged as described above because a very small quantity of water which is smaller than the quantity of water flowing through the water treating path must be always caused to continuously flow in terms of its construction.

An inlet 12c for pouring a cleaning solution or the like is provided on an upper portion of the electrolytic tank 12. An outlet 12d for discharging a solution in an electrolytic tank, for example, the cleaning solution after cleaning is provided on a lower portion of the electrolytic tank 12. In the case of maintenance, valves B13 and B3 arranged ahead of and behind the electrolytic tank 12 are closed, to pour the cleaning solution from the inlet 12c in a state where the electrolytic tank 12 is cut off from the water treating path 10, thereby removing scales adhering to an inner surface of the electrolytic tank 12, surfaces of electrodes 110, and the like.

It is preferable that the above-mentioned work is automatically performed periodically or as required while observing circumstances where the scale adheres to the surface. For this purpose, valves may be respectively connected to the inlet 12c and the outlet 12d, as shown in an embodiment shown in FIG. 30, described later, and a supply tank (a hopper) of a cleaning solution is connected to the inlet 12c through the above-mentioned valves, to operate the above-mentioned members using control carried out by a timer or the like. Suitably used as the cleaning solution are an inorganic acid such as hydrochloric acid or sulfuric acid and an organic acid such as acetic acid.

A branching point J2 at which water discharged from the electrolytic tank 12 and circulated by a circulating pump P2 is merged into the main circulating path 20 is preferably at a position as shown in order to prevent the water from being muddy by inclusion of gas generated by electrolytic reaction. On the other hand, in order to miniaturize a circulating pump P1 and the circulating pump P2, the branching point J2 is preferably provided at a position which is as close to a final end 20a of the main circulating path 20 as possible, as indicated by an arrow with a two-dot and dash line.

Description is now made of the specific arrangement of the pairs of electrodes 11 provided inside the electrolytic tank 12.

Figure 8:
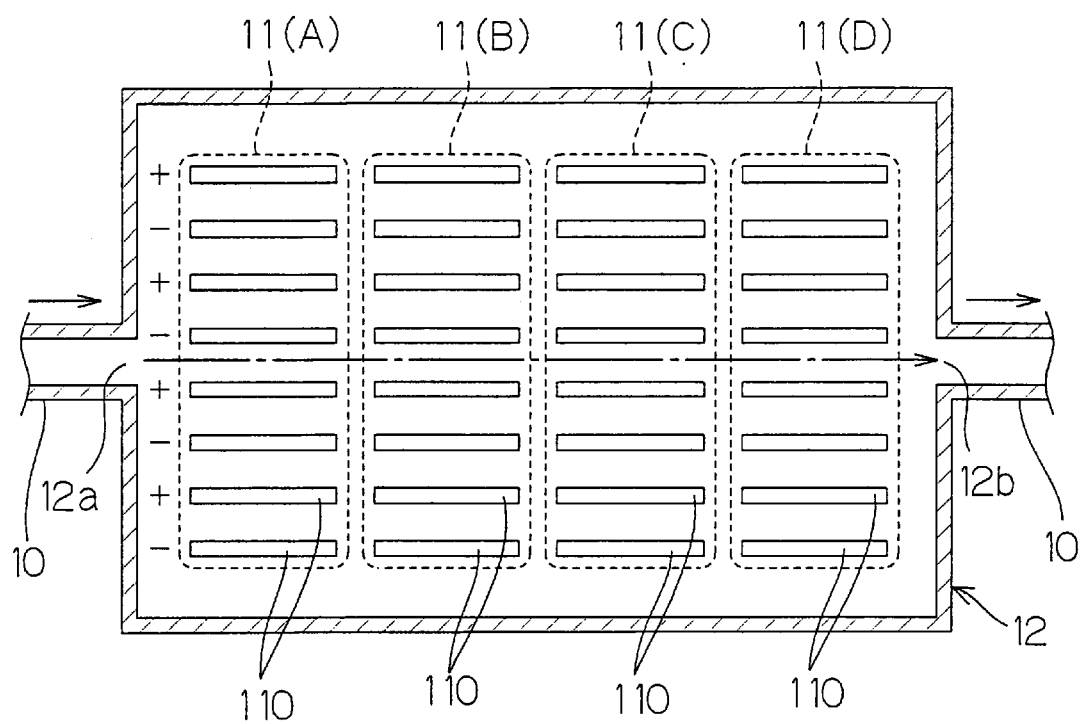
FIG. 8 is a cross-sectional view along a horizontal plane showing an example of the arrangement of electrodes in an electrolytic tank.

FIG. 8 is a cross-sectional view along a horizontal plane of the electrolytic tank 12, which illustrates an example of the specific arrangement of the pairs of electrodes 11. In the example as shown, all the plurality of pairs of electrodes 11 are arranged on a main flow path where the flow of water does not stay in the electrolytic tank 12, that is, on a flow path (indicated by an arrow with a one-dot and dash line) leading to a water outlet 12b from a water inlet 12a of the electrolytic tank 12. Consequently, the water is more efficiently sterilized.

It is preferable that the control section 40 shown in FIG. 2 has the function of changing the number of pairs of electrodes 11 which are simultaneously energized on the basis of the results of the measurement of the residual chlorine concentration of water by the residual chlorine sensor S2, as previously described.

A swimming pool, for example, is taken as an example. When the number of visitors is large or is rapidly increased, the weather is clear or conversely rainy, or the temperature is high, the residual chlorine concentration of water tends to be rapidly decreased. Therefore, two or more pairs of electrodes 11 are energized depending on the value of the concentration, to rapidly restore the residual chlorine concentration to a threshold previously determined. In this case, intervals at which the pairs of electrodes are energized may be shortened, or a time period during which the pairs of electrodes are energized once may be lengthened.

On the other hand, when the number of visitors is small, the weather is cloudy, or the temperature is low, the degree of the decrease in the residual chlorine concentration is slow. Therefore, the number of pairs of electrodes 11 to be energized may be decreased to the utmost. Further, intervals at which the pairs of electrodes are energized may be lengthened, or a time period during which the pairs of electrodes are energized once may be shortened.

When the control section 40 registers in the memory 41 the number of times of energization of each of the pairs of electrodes 11, and assigns the highest priority to the pair of electrodes 11 which is the smallest in the registered number of times of energization, it can make the deterioration of the electrodes 110 uniform between the plurality of pairs of electrodes 11. In this case, it is preferable in terms of accurately grasping the deterioration that the number of times of energization from the time when the water treatment device 1 starts to run is continuously stored.

The control section 40 may switch the priorities of the pairs of electrodes 11 to be energized for each predetermined time period. For example, four sets of pairs of electrodes 11 shown in FIG. 8 are taken as A, B, C, and D, and the basis for switching is taken as one business day. The deterioration of the electrodes 110 can be made uniform among the plurality of pairs of electrodes 11 by switching the priorities of the pairs of electrodes 11 so as to be A, B, C and D on the first business day, B, C, D, and A on the second business day, and C, D, A, and B on the third day.

The pairs of electrodes 11 are constructed by arranging a plurality of (three or more) plate-shaped electrodes 110 parallel to one another, as also shown in FIG. 8.

Figure 9A:
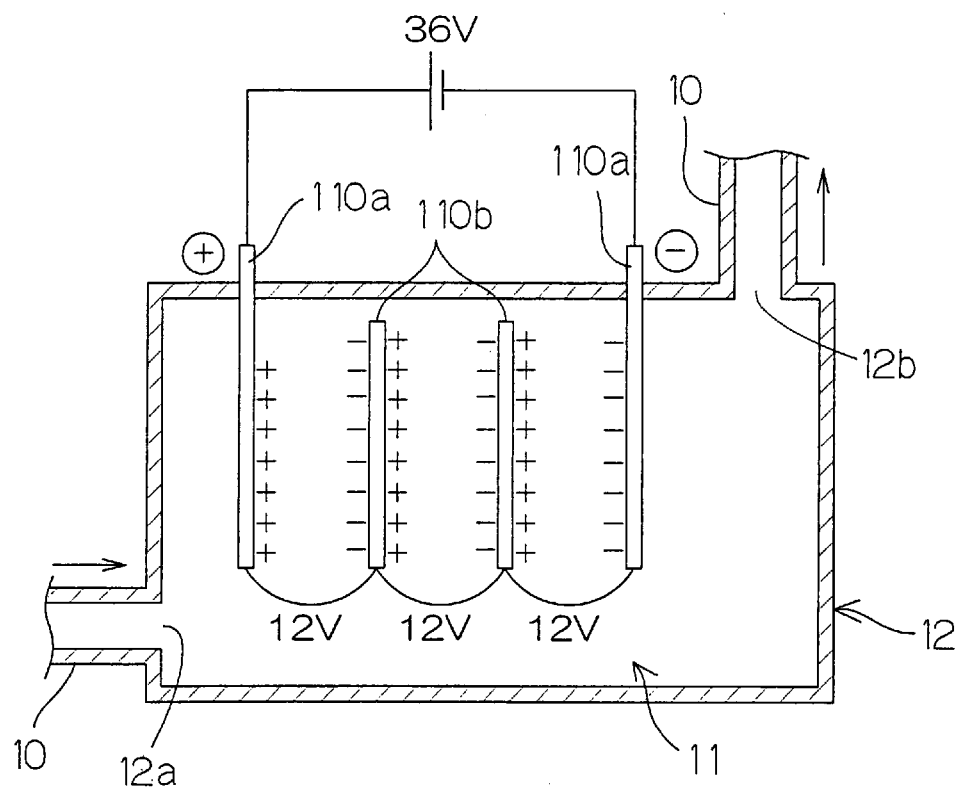
FIG. 9A is a vertical sectional view showing another example of the arrangement of electrodes in an electrolytic tank.

In the case, when wiring for energization is connected to only first and second electrodes 110a at both ends of the pair of electrodes 11, as shown in FIG. 9A, the wiring structure can be simplified. Further, the number of portions pulled out of the electrolytic tank 12 in order to do wiring can be reduced, thereby making it possible to improve the water tightness of the electrolytic tank 12 to make water leakage difficult. In FIG. 9A, two electrodes 110b of a bipolar type, that is, not wired are equally spaced between the two electrodes 110a at both ends. When a DC voltage of 36 volts is applied between the two electrodes 110a, the two electrodes 110b therebetween are polarized on both their surfaces, so that a potential difference of 12 volts occurs between the adjacent electrodes, thereby sterilizing water.

Figure 9B:
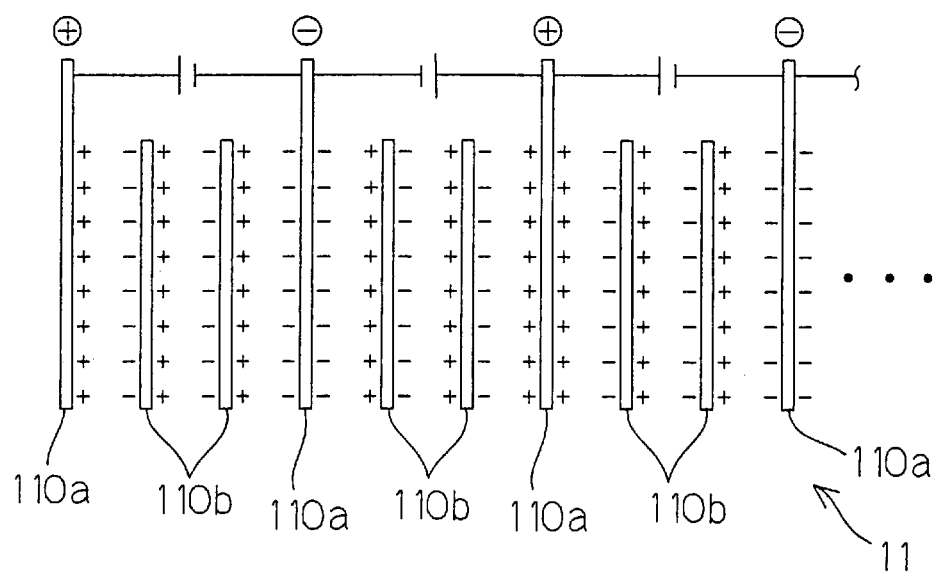
FIG. 9B is a front view showing still another example of the arrangement of the electrodes.

However, the actual pair of electrodes 11 is constituted by more electrodes 110 in order to increase the efficiency of the sterilization. In the case, if only the two electrodes at both ends are wired, an applied voltage between both the ends must be set to a significantly high voltage in order to cause a potential difference enough to sterilize water by electrolytic reaction between the adjacent electrodes. However, it is preferable that the maximum value of the voltage applied between the electrodes constituting the pair of electrodes is not more than 45 volts. Therefore, it is preferable that the electrodes 110a to be wired are arranged regularly (every three electrodes in the figure) not only at both ends but also halfway therebetween, as shown in FIG. 9B, to apply a predetermined voltage of not more than 45 volts between the closest electrodes 110a. The arrangement corresponds, when the arrangement shown in FIG. 9A is taken as one unit, to a combination of a plurality of units while reversing the polarity thereof.

Figure 10A:
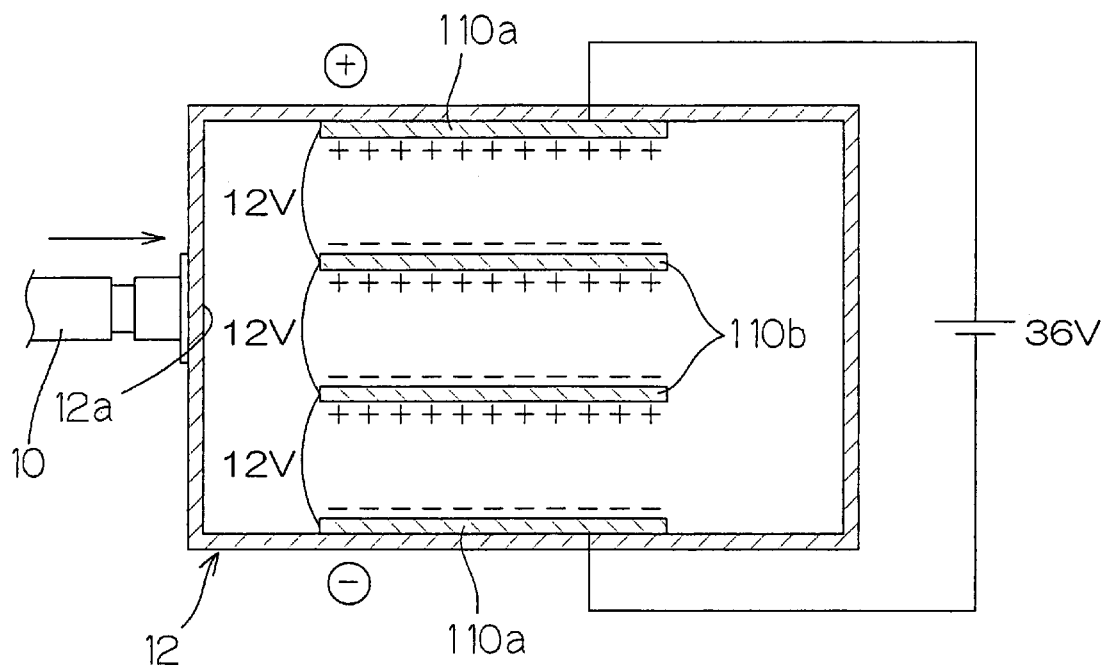
FIG. 10A is a cross-sectional view, taken along a line IV—IV shown in FIG. 10B, showing still another example of the arrangement of electrodes in an electrolytic tank.
Figure 10B:
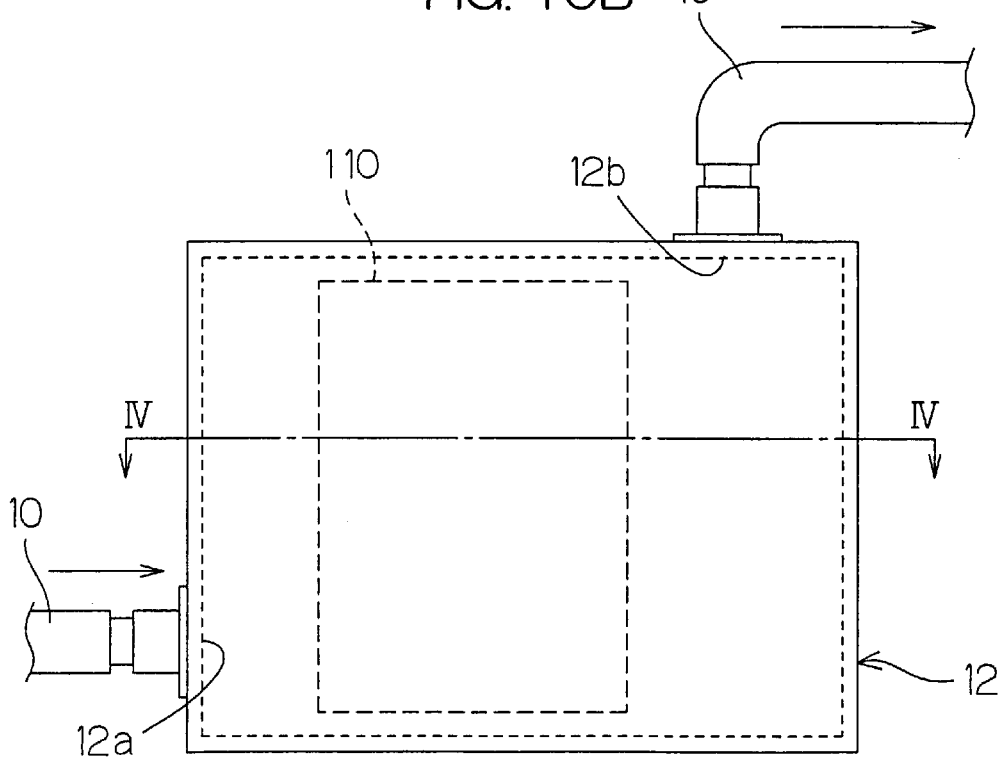
FIG. 10B is a front view of the electrolytic tank containing the electrodes.

When as shown in FIGS. 10A and 10B, the two electrodes 110a at both ends are arranged with the electrodes contact to an inner wall surface of the electrolytic tank 12, the scales are more reliably prevented from being deposited, thereby making it possible to lengthen the life of the system.

All the electrodes 110 are arranged parallel to one another in an approximately vertical direction in the electrolytic tank 12. The water inlet 12a arranged in the lower part of the electrolytic tank 12. And the water outlet 12b arranged in the upper part of the electrolytic tank 12. As shown in FIGS. 9A and 9B and FIGS. 10A and 10B. Consequently, bubbles of oxygen gas and hydrogen gas which are generated on surfaces of the electrodes 110 by electrolytic reaction are allowed to escape toward the downstream side of the water treating path without staying in the electrolytic tank 12, thereby improving safety.

The construction shown in the figures is also applicable to a case where a plurality of pairs of electrodes 11 are provided, as previously described, in addition to a case where only one pair of electrodes 11 is arranged in the electrolytic tank 12.

It is preferable that spacing between the adjacent electrodes 110 is not less than 1 mm, and not more than 5 mm. According to the construction, the spacing between the adjacent electrodes is set to not less than 1 mm. It is possible to prevent each of the spaces from being clogged with the deposited scale, to prevent the efficiency of the sterilization from being reduced in a short time. Further, the bubbles of oxygen gas and hydrogen gas which are generated by the electrolytic reaction are quickly allowed to escape without staying between the electrodes. Since the spacing is set to not more than 5 mm to prevent an amount of current flowing between the electrodes from being reduced. Accordingly, it is also possible to maintain the efficiency of the sterilization by the electrolytic reaction at a high level.

It is preferable that the control section 40 reverses the polarity of the voltage applied to each of the electrodes 110 for each predetermined time period, and a time period elapsed until the polarity is reversed is changed depending on the hardness of water. That is, the time period elapsed until the polarity is reversed may be set to a short time period because the speed of adhesion of the scale is high when the hardness of water is high, while being set to a long time period when the hardness is low.

Figure 11:
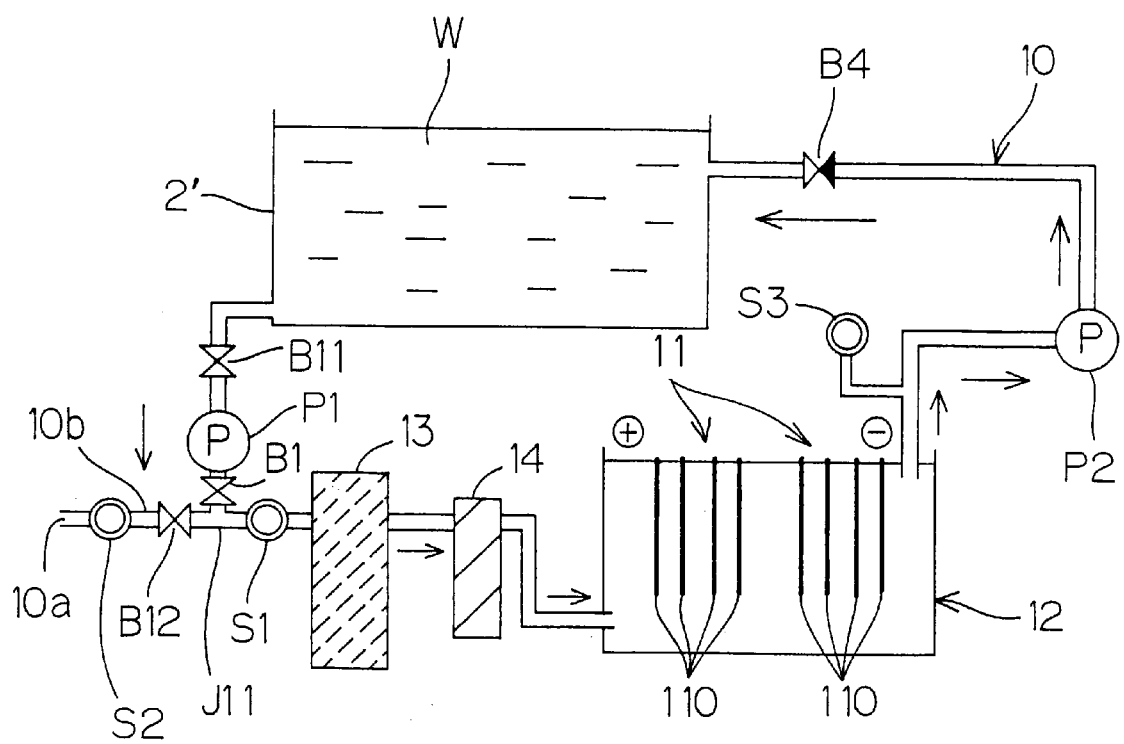
FIG. 11 is a diagram schematically showing a structure in which a water treatment device according to another embodiment of the present invention is incorporated into a small-sized pool such as a water supply tank disposed on the roof of a building, or a home bathtub.

FIG. 11 is a diagram schematically showing a structure in which a water treatment device 1 according to another embodiment of the present invention is incorporated into a small-sized pool 2' such as a water supply tank arranged on the roof of a building or a home bathtub. In this example, the above-mentioned main circulating path is not inherently provided. Accordingly, a water treating path in the water treatment device 1 is directly connected to the pool 2', to simplify the entire construction thereof.

Respective members arranged on the water treating path are basically the same as those in the previous embodiments and particularly, the embodiment shown in FIG. 7. Since high pressure as in a case where the water treating path is connected to the large-sized pool 2 is not applied to the water treating path 10. Because, the pressure reducing valve B2 is omitted. Further, the valves B3 and B13 are also omitted. The same reference characters are assigned the same members as those shown in FIG. 7.

The construction and the arrangement of a pair of electrodes 11 in an electrolytic tank 12 can be the same as those in the previous embodiments. Although in the embodiment as shown, two pairs of electrodes 11 are described, the number of pairs of electrodes 11 may be one or not less than three. It is preferable that each of electrodes 110 constituting each of the pairs of electrodes 11 is in a bipolar type arrangement. It is preferable that the two electrodes 110a at both ends to be wired in the case are made to contact an inner wall surface of the electrolytic tank 12.

A check valve B4 is provided at this position shown in FIG. 11 because a final end of the water treating path 10 is connected to a portion, below a normal water surface of water W, of the pool 2', and the water W must be prevented from flowing back into the water treating path 10. When the final end of the water treating path 10 is connected to a portion, above the normal water surface of the water W, of the pool 2' and is opened to the air, the check valve B4 can be omitted.

Figure 12:
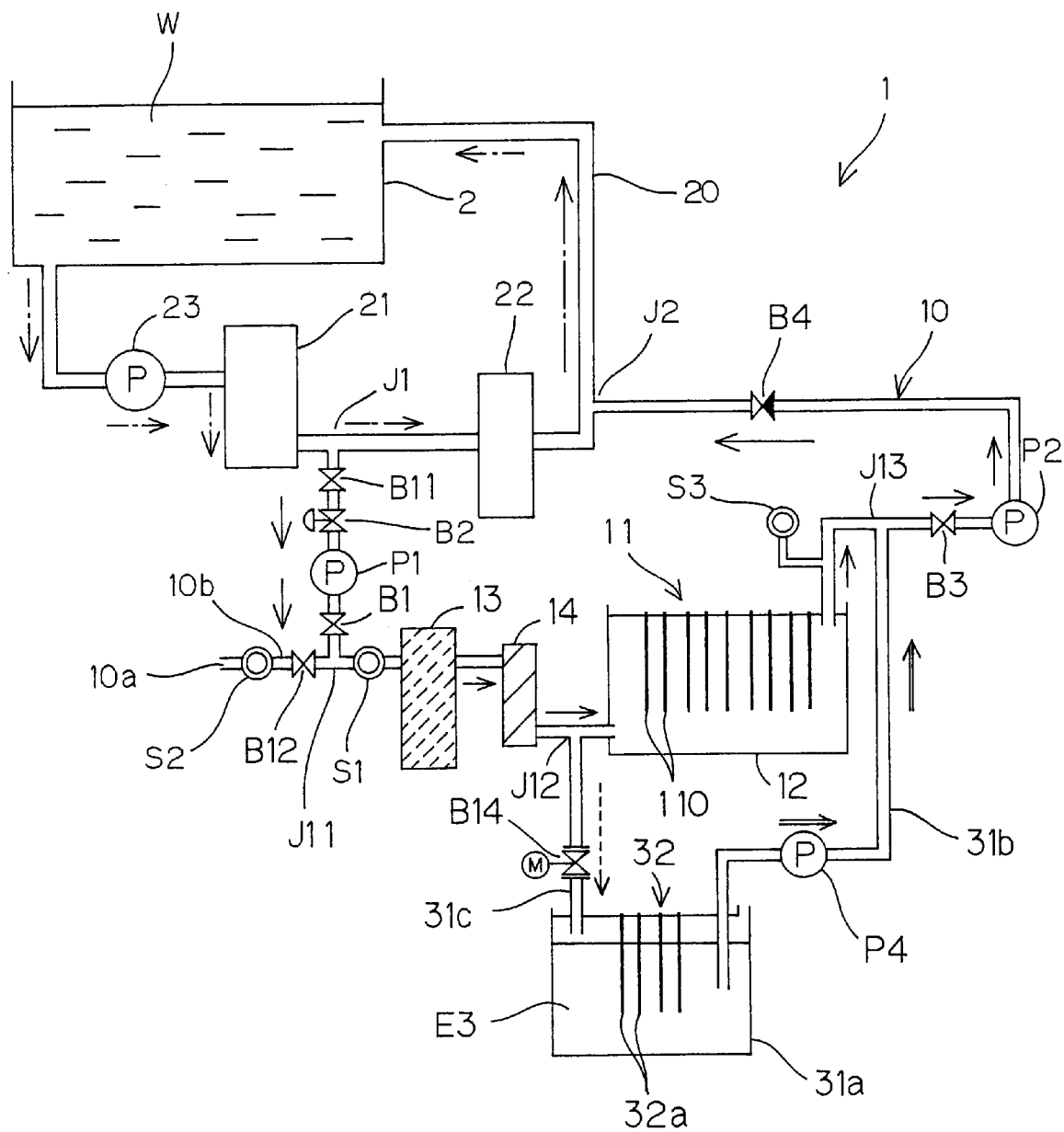
FIG. 12 is a diagram showing the construction of a water treatment device for a large-sized pool according to another embodiment of the present invention.

FIG. 12 is a diagram showing the construction of a water treatment device 1 for a large-sized pool 2 according to another embodiment of the present invention. The construction shown in FIG. 12 differs from the construction shown in FIG. 7 in that it comprises sterilizing solution producing means for producing a sterilizing solution E3 having a sterilizing function containing a chlorine compound such as a hypochlorous acid (HClO), its ion (ClO⁻), or chlorine gas ($Cl_2$) by electrolyzing an electrolytic solution containing a chorine ion. The sterilizing solution producing means comprises a second electrolytic tank 31a to put in an electrolytic solution and a second pair of electrodes 32 provided in the second electrolytic tank 31a for electrolyzing the electrolytic solution.

More specifically, an introducing path 31c is branched from a branching point J12 between an ion exchange resin 14 and an electrolytic tank 12 on a water treating path 10. A valve B14 is interposed halfway on the introducing path 31c. Water is poured into the second electrolytic tank 31a through the introducing path 31c by opening the valve B14. An electrolyte such as sodium chloride is contained in the electrolytic tank 31a. When the water is poured, an electrolytic solution having a saturation concentration is produced in the electrolytic tank 31a. The principle of producing an electrolytic solution having a saturation concentration when water is poured is as previously above. The second pair of electrodes 32 is then energized to perform electrolytic processing for a predetermined time period in a state where the electrolytic tank 31a is filled with the electrolytic solution, thereby producing the sterilizing solution E3. The sterilizing solution E3 is sucked up through a supplying path 31b by a fixed delivery pump P4, is merged at a branching point J13, and is supplied to the water treating path 10.

As the electrolytic solution poured into the second electrolytic tank 31a, a solution of sodium chloride is suitable, as in the previous embodiments. In addition thereto, it may be a solution of calcium chloride or hydrochloric acid, provided that it can produce a sterilizing solution by electrolytic reaction.

The second pair of electrodes 32 has a plurality of plate-shaped electrodes 32a. It is referable that each of the electrodes 32a is the same as the electrode 110 in electrolyzing and sterilizing means.

The same members as those shown in FIG. 7 are assigned the same reference characters. A pair of electrodes 11 in the electrolyzing and sterilizing means is called a first pair of electrodes 11 in order to be distinguished from the second pair of electrodes 32, and the electrolytic tank 12 is called a first electrolytic tank 12 in order to be distinguished from the second electrolytic tank 31a.

Figure 13:
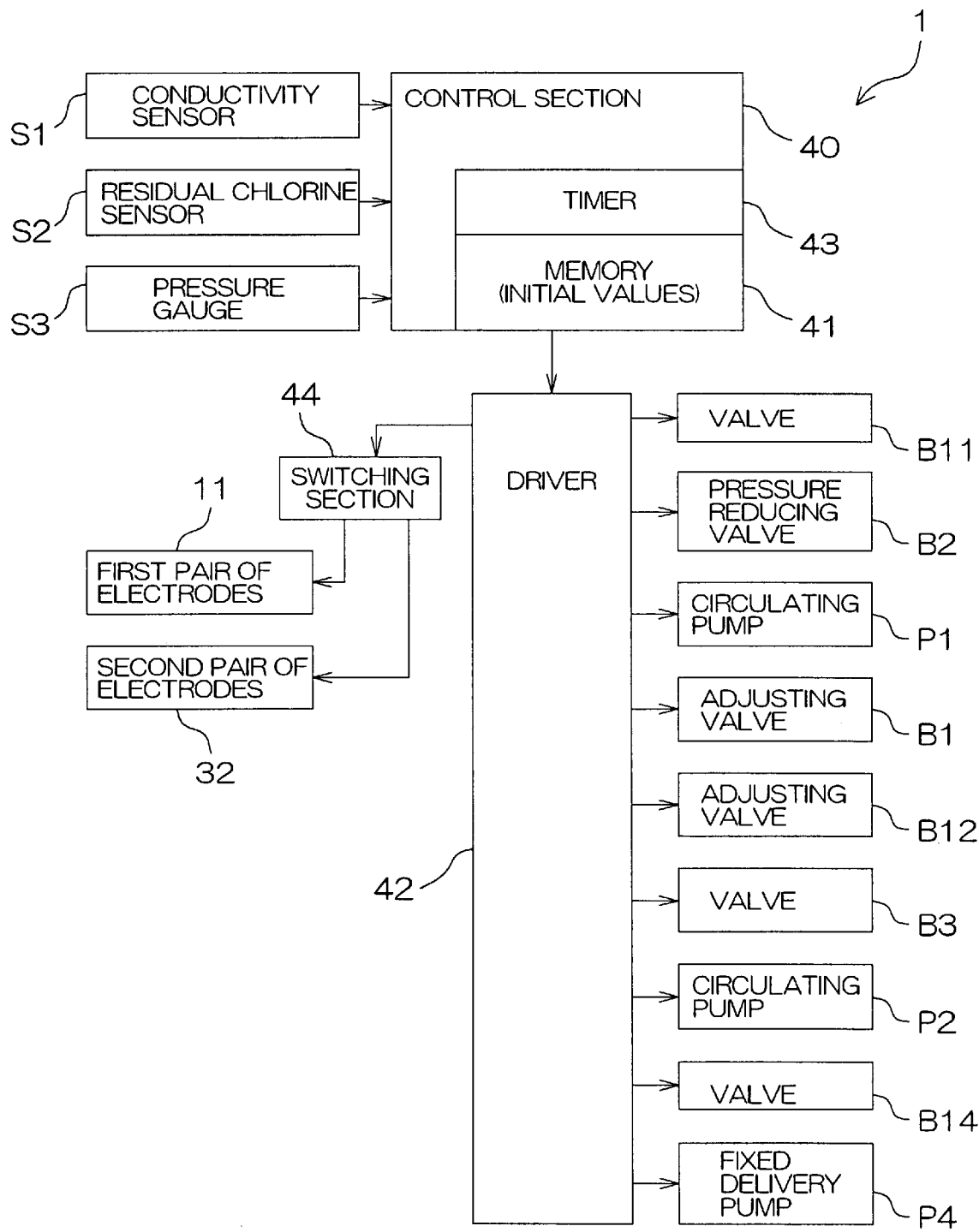
FIG. 13 is a block diagram showing the electrical configuration of the water treatment device shown in FIG. 12.

FIG. 13 is a block diagram showing the electrical configuration of the water treatment device shown in FIG. 12.

The water treatment device 1 comprises a control section 40 composed of a microcomputer or the like. Outputs of a conductivity sensor S1, a residual chlorine sensor S2 and a pressure gauge S3 are fed to the control section 40. The control section 40 comprises a memory 41 and a timer 43. The initial values of the quantity of water stored in the pool 2, the reference chlorine concentration, and so forth are registered in the memory 41. The timer 43 is for defining a time zone in which the device is running and a time zone in which the running is stopped.

The control section 40 performs an operation, described below, on the basis of the outputs of the conductivity sensor S1, the residual chlorine sensor S2, and the pressure gauge S3, the initial values registered in the memory 41, and the time zones defined by the timer 43, and feeds a control signal to a driver 42 on the basis of the operation. The driver 42 controls electric current flowing through the first and second pairs of electrodes 11 and 32 and a time period during which the pairs of electrodes are energized, and adjusting valves B1 and B12, a pressure reducing valve B2, a circulating pump P1, a valve B3, a valve B11, and a valve B14, a circulating pump P2, and the fixed delivery pump P4 on the basis of the fed control signal.

The energization of the first pair of electrodes 11 and the second pair of electrodes 32 is controlled through a switching section 44 for controlling the energization by switching both the pairs of electrodes 11 and 32 in order to energize, when the energization of one of the pairs of electrodes is stopped, the other pair of electrodes using the same power source (not shown). Consequently, the construction of the entire device can be simplified, thereby making it possible to save a space for the device as well as to reduce the cost thereof.

Figure 14:
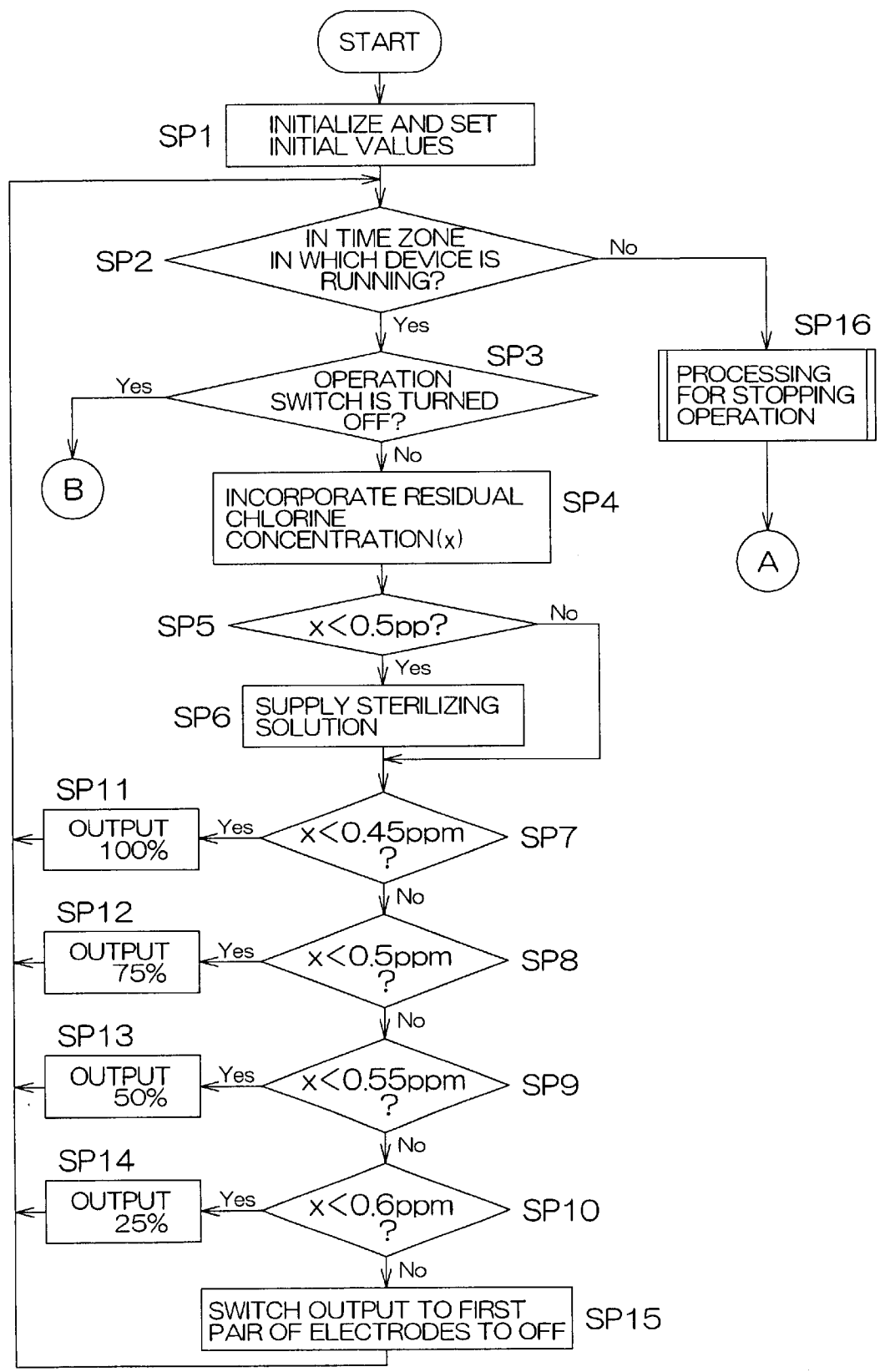
FIG. 14 is a flow chart showing a main routine in the contents of control carried out by a control section.

FIG. 14 is a flow chart showing the contents of control carried out by the control section 40. Description is made of a control operation performed by the control section 40 in accordance with the flow of the flow chart.

When a person in charge turns on the power of the water treatment device 1, the control section 40 operates the circulating pumps P1 and P2, opens the valves B3 and B11, closes the valve B14, and adjusts the other valves, to start the circulation of water W in the pool 2. Specifically, circulation for pouring the water W in the pool 2 into the water treating path from a main circulating path 20, passing the water W through the first electrolytic tank 12, and returning the water W to the pool 2 through the main circulating path is started. Correspondingly, the initial values registered in the memory 41 are read (step SP1). It is then judged in the timer 43 whether the present time is in the time zone in which the device is running or the time zone in which the running is stopped step SP2).

If the present time is in the time zone in which the device is running, it is confirmed whether or not a operation switch is not turned off (step SP3), and a residual chlorine concentration x (ppm) measured by the residual chlorine sensor S2 is then incorporated (step SP4

The incorporated residual chlorine concentration x is then compared with a reference concentration (0.5 ppm in this case) in supplying a sterilizing solution which is registered in the memory 41 (step SP5). When the residual chlorine concentration x satisfies x<0.5 ppm, to supply a predetermined amount of the sterilizing solution E3 stored in the second electrolytic tank 31a to the water treating path through the supplying path 31b upon operating the fixed delivery pump P4 (step SP6).

On the other hand, when the residual chlorine concentration x satisfies x≧0.5 ppm, the step SP6 is skipped. Thereafter, the residual chlorine concentration x is compared with the other reference concentration for output adjustment (0.45 ppm, 0.5 ppm, 0.55 ppm, and 0.6 ppm in this case) also registered in the memory 41 at the steps SP7 to SP10. At the steps S11 to SP15, the water W supplied to the first electrolytic tank 12 through the water treating path is sterilized by the electrolytic reaction while switching an output to the first pair of electrodes 11 to 100%, 75%, 50%, 25%, and OFF (0%) in accordance with the results of the comparison. Thereafter, the water W is supplied to the main circulating path 20 through the water treating path 10, and is returned to the pool 2 through the main circulating path 20.

The above-mentioned operations are repeated in the set time zone in which the device is running, for example, the business hours of a swimming pool or a public bath.

Figure 15A:
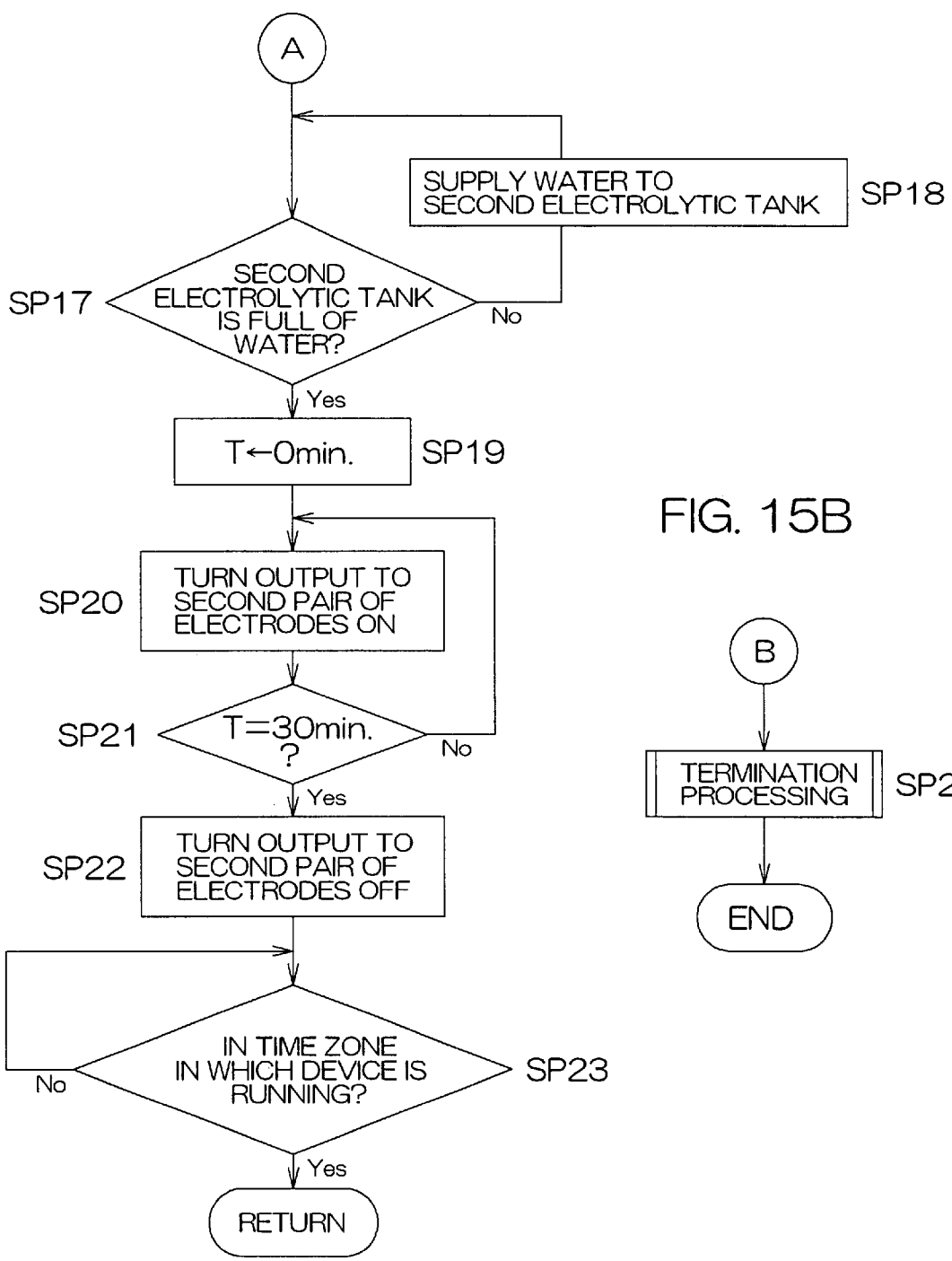
FIGS. 15A and 15B are flow charts showing a sub-routine in the contents of control carried out by a control section.

When the control section 40 judges at the step SP2 that the current time is in the time zone in which the running is stopped, processing for stopping the normal operation of each of the sections is performed (step SP16). Thereafter, the program proceeds to a sub-routine A shown in FIG. 15A.

In the sub-routine A, the control section 40 judges whether or not the second electrolytic tank 31a is full of water, that is, an electrolytic solution (step SP17). When it is not full of water, the valve B14 is opened at the step SP18, to supply a predetermined quantity of water W to the second electrolytic tank 31a. In this case, when a solid electrolyte in an amount corresponding to several times to dozens of times of supply is supplied to the second electrolytic tank 31a, an electrolytic solution having a saturation concentration is almost automatically produced only by supplying the water W. If it is full of water, the step SP18 is skipped.

After the time period T during which the second pair of electrodes 32 is energized is then reset to zero (step SP19), the energization of the second pair of electrodes 32 is started (step SP20). The electrolyte continues to be electrolyzed until the above-mentioned time period T reaches a predetermined time period (30 minutes in this case) (step SP21), and the energization is then stopped (step SP22). Consequently, a sterilizing solution E3 of which the second electrolytic tank 31a is full is produced.

Thereafter, the control section 40 judges at the step SP23 whether or not the present time is in the time zone in which the device is running or the time zone in which the running is stopped. When the present time is in the time zone in which the running is stopped, the control section 40 continues to wait in this state. When the present time is in the time zone in which the device is running, the program is returned to the step SP1 shown in FIG. 14. At the step SP1, the normal driving control is carried out again.

Figure 15B:
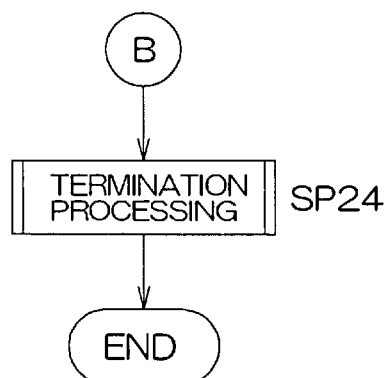

When it is confirmed at the step SP3 shown in FIG. 14 that the operation switch is turned off, the program proceeds to a sub-routine B shown in FIG. 15B. In the sub-routine B, the control section 40 performs termination processing for stopping the driving of all the members (step SP24), thereby terminating a series of water treatment operations.

Figure 16:
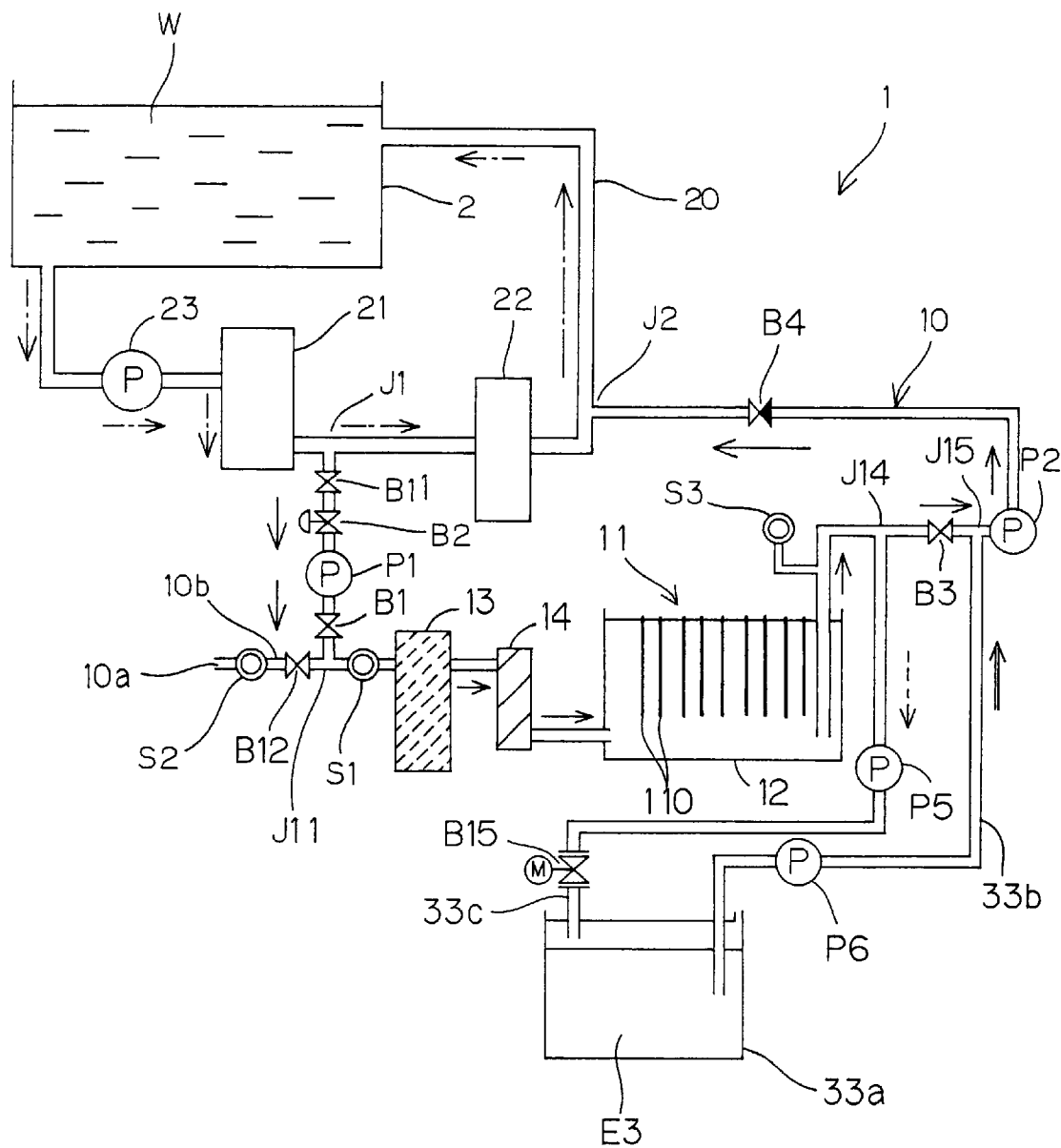
FIG. 16 is a diagram showing the construction of a water treatment device for a large-sized pool according to another embodiment of the present invention.

FIG. 16 is a diagram showing the construction of a water treatment device 1 for a large-sized pool 2 according to another embodiment of the present invention. The construction shown in FIG. 16 differs from the construction shown in FIG. 12 in that a sterilizing solution tank 33a to put in and store a sterilizing solution E3 is connected to a portion on the downstream side of the electrolytic tank 12 in place of the second electrolytic tank 31a and the second pair of electrodes 32.

The sterilizing solution E3 is produced by filling an electrolytic tank 12 with an electrolytic solution containing a chlorine ion in a time zone in which the running of the device is stopped, for example, and energize a pair of electrodes 11 to electrolyze the electrolytic solution. The same members as those shown in FIG. 12 are assigned the same reference characters.

Specifically, an introducing path 33c is branched from a branching point J14 between an electrolytic tank 12 and a valve B3 on a water treating path 10. A fixed delivery pump P5 and a valve Bare interposed halfway in an introducing path 33c. A sterilizing solution E3 produced in the electrolytic tank 12 is sucked up by the fixed delivery pump P5 in a state where the valve B15 opened and the valve B3 is closed, so that it is poured into the sterilizing solution tank 33a through the introducing path 33c, and is stored therein. The sterilizing solution E3 is sucked up through a supplying path 33b by a fixed delivery pump P6 in a time zone in which the device is running, for example, is merged at a branching point J15, and is supplied to the water treating path 10.

Figure 17:
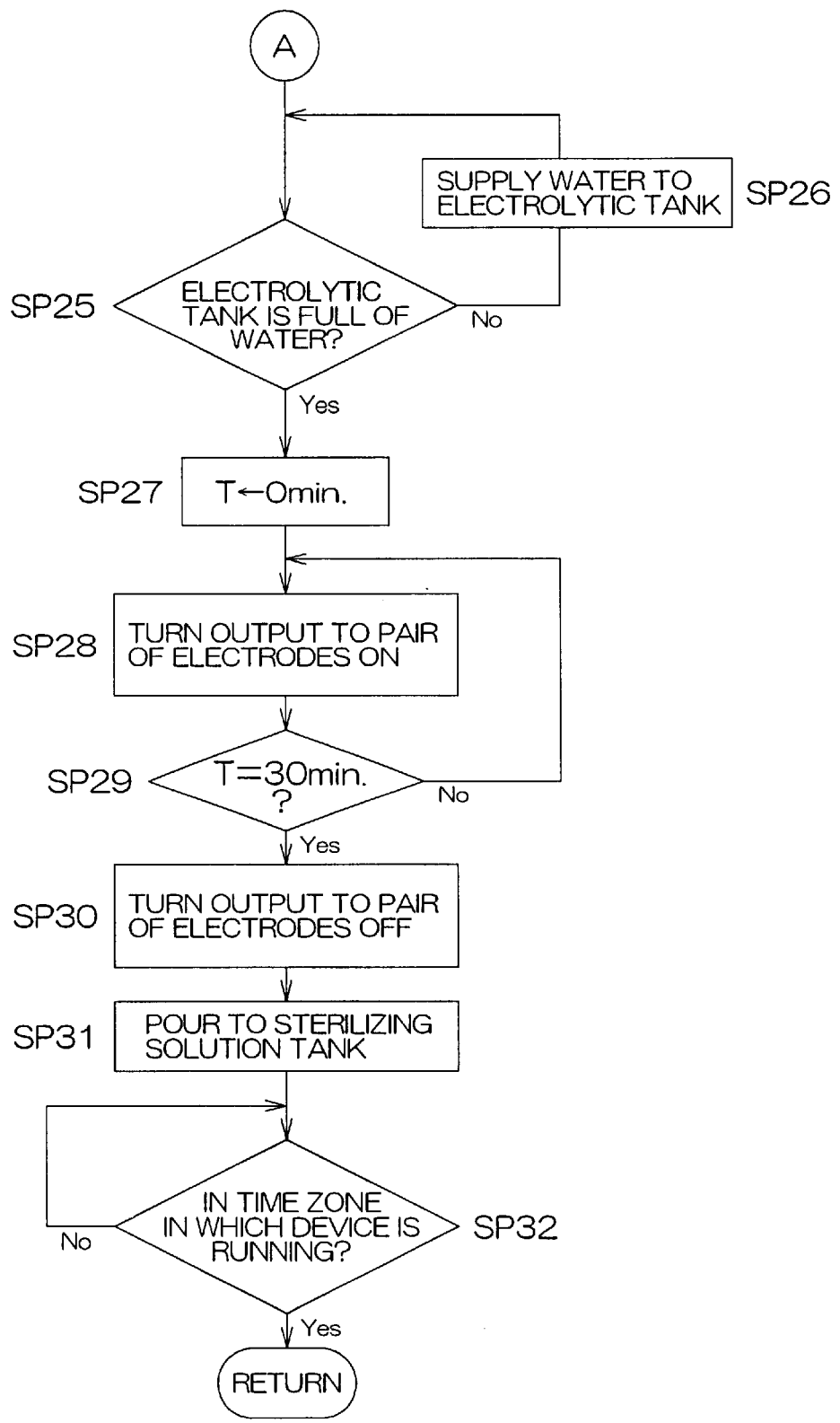
FIG. 17 is a flow chart showing a sub-routine in the contents of control carried out by a control section in the water treatment device shown in FIG. 16.

The electrical configuration of the water treatment device 1 shown in FIG. 16 is basically the same as that shown in FIG. 13. Out of the contents of control by a control section 40, the main routine shown in FIG. 14 and the sub-routine B for termination shown in FIG. 15B are the same. Only a sub-routine A for producing the sterilizing solution E3 and storing the sterilizing solution E3 in the sterilizing solution tank 33a is set as shown in FIG. 17.

Specifically, when the control section 40 judges at the step SP2 in the main routine shown in FIG. 14 that the present time is in the time zone in which the running is stopped, the processing for stopping the normal operation of each of the sections is performed (step SP16). Thereafter, the program proceeds to a sub-routine A shown in FIG. 17.

In the sub-routine A, the control section 40 then judges whether or not the electrolytic tank 12 is full of water (step SP25). When it is not full of water, circulating pumps P1 and P2 are operated to supply a predetermined quantity of water W to the electrolytic tank 12 at the step SP26. Correspondingly, a person in charge introduces an electrolyte in an amount corresponding to one time of supply into the electrolytic tank 12, to produce an electrolytic solution having a predetermined concentration (a saturation concentration, if possible). When it is full of water, the step SP26 is skipped. The person in charge supplies the electrolyte.

After a time period T during which the pair of electrodes 11 is energized is reset to zero (step SP27), the energization of the pair of electrodes 11 is started (step SP28), the electrolyte continues to be electrolyzed until the time period T reaches a predetermined time period (30 minutes in this case) (step SP29), and the energization of the pair of electrodes 11 is then stopped (step SP30). Consequently, a sterilizing solution E3 of which the electrolytic tank 12 is full is produced.

Thereafter, the control section 40 closes the valve B3 and opens the valve B15, and operates the fixed delivery pump P5, to pour the produced sterilizing solution E3 to the sterilizing solution tank 33a from the electrolytic tank 12 (step SP31), and judge at the step SP32 whether the present time is in the time zone in which the device is running or the time zone in which the running is stopped. When the present time is in the time zone in which the running is stopped, the control section 40 continues to wait in this state. When the present time is in the time zone in which the device is running, the program is returned to the step SP1 shown in FIG. 14. At the step SP1, the control section 40 controls the normal running again.

Figure 18:
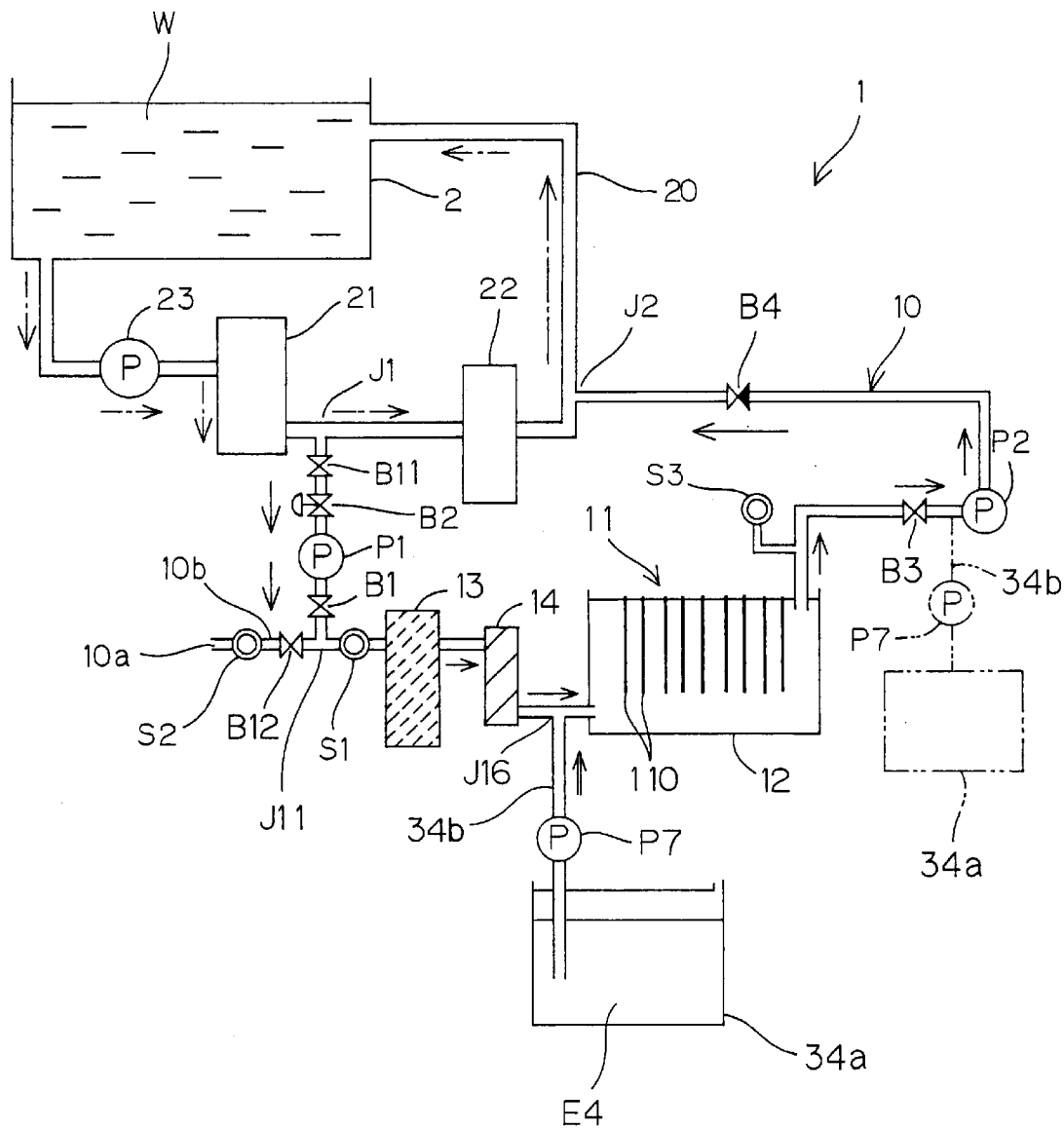
FIG. 18 is a diagram showing the construction of a water treatment device for a large-sized pool according to another embodiment of the present invention.

FIG. 18 is a diagram showing the construction of a water treatment device 1 for a large-sized pool 2 according to another embodiment of the present invention. The construction shown in FIG. 18 differs from the construction shown in FIG. 12 in that a solution tank 34a to put in and store an electrolytic solution E4 containing a chlorine ion having a sterilization function, for example, a solution of sodium hypochlorite, is connected on the upstream side of an electrolytic tank 12 in place of the second electrolytic tank 31a and the second pair of electrodes 32. Specifically, a supplying path 34b is branched from a branching point J16 between an ion exchange resin 14 and the electrolytic tank 12 on a water treating path 10, to reach the solution tank 34a. A fixed delivery pump P7 is interposed halfway on the supplying path 34b. The electrolytic solution E4 stored in the solution tank 34a is sucked up through the supplying path 34b by the fixed delivery pump P7, and is merged at the branching point J16, and is supplied to the water treating path 10. In addition thereto, the same members as those shown in FIG. 12 are assigned the same reference characters. The electrical configuration of the water treatment device 1 shown in FIG. 18 is basically the same as those shown in FIG. 13.

Figure 19A:
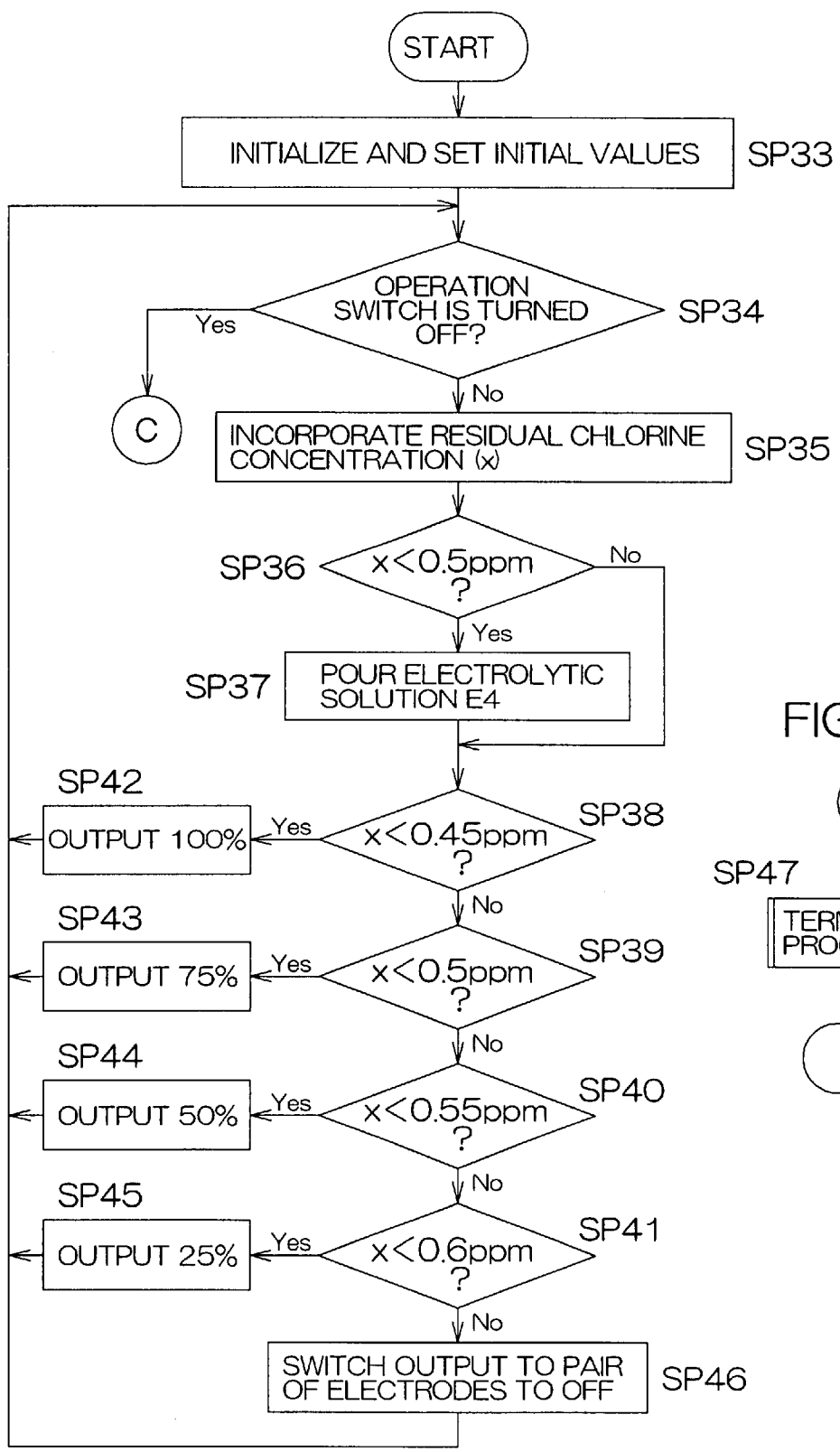
FIG. 19A is a flow chart showing a main routine in the contents of control carried out by a control section in the water treatment device shown in FIG. 18.
Figure 19B:
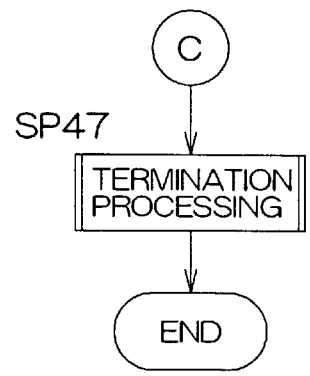
FIG. 19B is a flow chart showing a sub-routine.

FIGS. 19A and 19B are flow charts showing the contents of control carried out by a control section 40. Description is made of a control operation performed by the control section 40 in accordance with the flow of the flow chart.

When a person in charge turns on the power of the water treatment device 1, the control section 40 operates circulating pumps P1 and P2, opens a valve B3 and a valve B11, and adjusts the other valves, to start the circulation of water W in the pool 2. Specifically, circulation for pouring the water W in the pool 2 into the water treating path 10 from a main circulating path 20, passing the water W through the first electrolytic tank 12, and returning the water W to the pool 2 through the main circulating path 20 is started. Correspondingly, initial values registered in a memory 41 are read (step SP33), it is then confirmed whether or not a operation switch is not turned off (step SP34), and a residual chlorine concentration x (ppm) measured by a residual chlorine sensor S2 is then incorporated (step SP35).

The incorporated residual chlorine concentration x is then compared with a reference concentration in supplying a sterilizing solution which is registered in the memory 41 (step SP36). When the residual chlorine concentration x satisfies x<0.5 ppm, a predetermined amount of an electrolytic solution E4 having a sterilization function is supplied to the water treating path 10 through the supplying path 34b upon operating the fixed delivery pump P7 (step SP37). On the other hand, when the residual chlorine concentration x satisfies x≧0.5 ppm, the step SP37 is skipped. At the steps SP38 to SP41, the residual chlorine concentration x is also compared with the other reference concentration for output adjustment which is also registered in the memory 41 (0.45 ppm, 0.5 ppm, 0.55 ppm, and 0.6 ppm in this case). At the steps SP42 to SP46, the water W supplied to the electrolytic tank 12 through the water treating path 10 is sterilized by electrolytic reaction while switching an output to a pair of electrodes 11 to 100%, 75%, 50%, 25%, and OFF (0%) in accordance with the results of the comparison.

Thereafter, the water W is supplied to the main circulating path 20 through the water treating path 10, and is returned to the pool 2 through the main circulating path 20.

The above-mentioned operations are repeated in the time zone in which the device is running, for example, the business hours of a swimming pool or a public bath. When it is confirmed at the step SP34 that the operation switch is turned off, the program proceeds to a sub-routine C shown in FIG. 19B. In the sub-routine C, the control section 40 performs termination processing for stopping the driving of all the members (step SP47), thereby terminating a series of operations.

As indicated by a two-dot and dash line in FIG. 18, a set of the solution tank 34a, the supplying path 34b, and the fixed delivery pump P7 may be also connected to a portion, on the downstream side of an electrolytic tank 12, of the water treating path 10, to directly supply the electrolytic solution stored in the solution tank 34a to the water treating path as a sterilizing solution.

Figure 20:
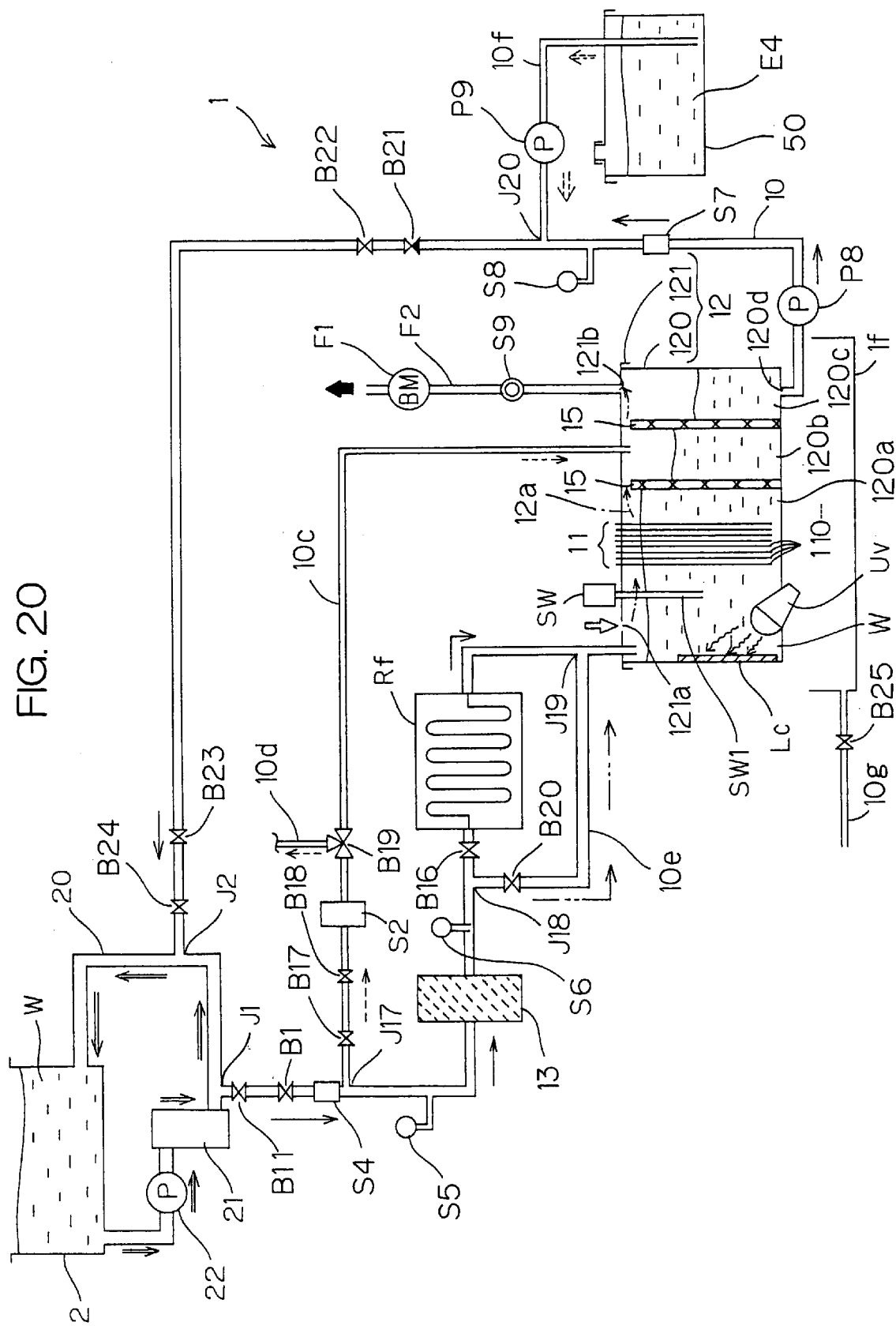
FIG. 20 is a diagram showing the construction of a water treatment device for a large-sized pool according to another embodiment of the present invention.

FIG. 20 is a diagram showing the construction of a water treatment device 1 for a large-sized pool 2 according to another embodiment of the present invention.

The water treatment device 1 in this example comprises a water treating path 10 connected to a main circulating path 20. A valve B11, an adjusting valve B1, a flow meter S4, a filter 13 for filtration, a valve B16, and a cooler Rf for cooling water are arranged halfway from a branching point J1 to an electrolytic tank 12 also used as gas/liquid separating means. A pair of electrodes 11 comprising a plurality of plate-shaped electrodes 110 is arranged in the electrolytic tank 12.

A branching path 10c branched at a branching point J17 and leading to the electrolytic tank 12 is connected between the flow meter S4 and the filter 13 on the water treating path 10. A pressure reducing valve B17 for reducing pressure, an adjusting valve B18 for flow rate adjustment, a residual chlorine sensor S2, and a three way valve B19 are arranged on a branching path 10c. A branching path 10d further branched from the branching path 10c and leading to a drain port for draining water (not shown) is connected to the three way valve B19. The residual chlorine sensor S2 must always continue to cause a very small quantity of water to flow, as described above, so that it is arranged as described above. That is, when the water treatment device 1 is running, a small quantity of water is caused to flow through the branching path 10c. When the water treatment device 1 is stopped, the valve B16 and a valve B20, described later, are closed, and the three way valve B19 is switched, to cause the small quantity of water to flow into the drain port through the branching path 10d. Consequently, the residual chlorine sensor S2 is maintained in a normal state.

A pressure gauge S5 for measuring the water pressure is connected between a branching point J17 and the filter 13 on the water treating path 10. A bypass path 10e branched at a branching point J18 to pass through the valve B20, and then merged into the water treating path 10 at a branching point J19. A temperature sensor S6 for measuring the water temperature of water flowing through the water treating path 10 is connected between the filter 13 and the branching point J18 on the water treating path 10. The valves B16 and B20 are opened or closed on the basis of the water temperature measured by the temperature sensor S6, to circulate the water through either one or both of the cooler Rf and the bypass path 10e, thereby adjusting the water temperature of the water supplied to the electrolytic tank 12.

A circulating pump P8, a flow meter S7, a check valve B21 for preventing back flow, and adjusting valves B22, B23, and B24 for flow rate adjustment are arranged halfway from the electrolytic tank 12 to a branching point J2 on the water treating path 10, and a pressure gauge S8 for measuring the water pressure is connected between the flow meter S7 and the check valve B21.

A solution tank 50 to put in and store a sterilizing solution E4 such as a solution of sodium hypochlorite is connected between the pressure gauge S8 and the check valve B21 on the water supplying path 10. Specifically, a supplying path 10f is branched from a branching point J20 between the pressure gauge S8 and the check valve B21 on the water treating path 10, to reach the solution tank 50. A fixed delivery pump P9 is interposed halfway on the supplying path 10f. The electrolytic solution E4 stored in the solution tank 50 is sucked up through the supplying path 10f by the fixed delivery pump P9, is merged at the branching point J20, and is supplied to the water treating path 10. When the sterilizing solution E4 supplied from the solution tank 50 is used simultaneously for electrolytic reaction by the pair of electrodes 11 and sterilization of water, a time period during which the electrode 110 are energized is reduced, thereby making it possible to prevent rapid deterioration and degradation of the electrode 110. Further, it is possible to sufficiently cope with a case where the sterilization must be performed rapidly and in large amounts due to a rapid drop in the residual chlorine concentration of water, for example, when the business hours of a swimming pool or a public bath are started.

The electrolytic tank 12 is constituted by a box-shaped body 120 and a cover 121 for closing an upper opening of the body 120. The body 120 is divided into three gas/liquid separation areas 120a to 120c by two gas separating filters 15. The pair of electrodes 11 comprising the plurality of electrode plates 110 is arranged in the gas/liquid separation area 120a on the uppermost stream side out of the three gas/liquid separation areas 120a to 120c. A water outlet 120d is formed at the bottom of the gas/liquid separation area 120c on the downstream side, and a latter half part of the water treating path 10, described above, is connected to the outlet 120d.

The gas separating filter 15 has the function of passing water but capturing included fine bubbles without passing them. By the function, many of the fine bubbles stored in the gas/liquid separation areas 120a to 120c, each of which cannot be so far separated from the water because the diameter thereof is too small, are coupled to one another by storage to increase the diameter of the coupled fine bubbles, thereby producing a buoyant force. Accordingly, the coupled fine bubbles rise to the surface of the water W. They are moved toward a gas phase on the water surface, and are separated and removed from the water W. Therefore, it is possible to prevent the water from being muddy by the fine bubbles and to always return to the pool 2 water which is clear and is clean to look at.

Above the upper side of a water surface in each of the gas/liquid separation area 120a to 120c and above the upper side of each of the filters in the electrolytic tank 12, a clearance is formed between the upper side and the cover 121, so that a gas circulating path 12a leading to each of the gas/liquid separation areas 120a to 120c is formed in the electrolytic tank 12.

An exhaust pipe F2 having a blower F1 of a suction type for forcedly exhausting gas originated from the fine bubbles outward from the tank and a hydrogen concentration sensor S9 for sensing the concentration of hydrogen in the gas arranged halfway thereon is connected to a position, just above the gas/liquid separation area 120c on the lowermost stream side, of the cover 121. The water level of water is the highest in the gas/liquid separation area 120a on the uppermost stream side, while being the lowest in the gas/liquid separation area 120c on the lowermost stream side because of the effect of the resistances of the filter 15s on the flow of water. The exhaust pipe F2 is connected to the position, just above the gas/liquid separation area 120c where there is a sufficient space on the water surface, of the cover 121.

At a position, just above the gas/liquid separation area 120a on the uppermost stream side, of the cover 121, an air introducing port 121a for introducing air into the tank along the air circulating path 12a in place of gas exhausted outward from the tank by the blower F1 is formed. Further, a first half part of the water treating path 10 is connected to the position. Further, a float switch SW for measuring the water level in the gas/liquid separation area 120a is arranged such that a water level sensing portion SW1 is inserted into the gas/liquid separation area 120a.

The branching path 10c, described above, is connected to a position, just above the gas/liquid separation area 120b, of the cover 121.

A photocatalyst member Lc composed of titanium dioxide ($TiO_2$) or the like having the function of sterilizing water by photocatalytic reaction is arranged on an inner wall surface of the gas/liquid separation area 120a, and a ultraviolet lamp Uv is provided thereon in order to irradiate the photocatalyst member Lc with ultraviolet rays. In cases such as a case where the residual chlorine concentration of water is rapidly lowered, the ultraviolet lamp Uv is turned on in addition to the energization of the pair of electrodes 11, thereby making it possible to perform auxiliary sterilization by the ultraviolet rays and the photocatalyst member Lc. Alternatively, in cases such as a case where the pair of electrodes 11 develops a fault or a case where the pair of electrodes 11 is maintained, the ultraviolet lamp Uv is turned on, thereby making it possible to perform alternative sterilization by the ultraviolet rays and the photocatalyst member Lc.

A pan If for water which has leaked is arranged below the electrolytic tank 12. Even if water leaks in the electrolytic tank 12, it is possible to minimize the danger of short, leakage, or the like due to the water which has leaked. Reference character 10g denotes a draining path for feeding water received by the pan if to a total discharge port (not shown), and reference character B25 denotes an adjusting valve for adjusting the flow rate of water passing through the draining path 10g.

An example of the gas separating filter 15 is a non woven fabric made of a natural fiber or a chemical fiber. Particularly, the filter 15 is arranged immediately after electrolytic reaction by the pair of electrodes 11. Accordingly, suitably used as the filter 12 is a non woven fabric composed of a fiber such as a polypropylene fiber having sufficient resistance to a chlorine compound, active oxygen, or the like, and being fine in order not to easily pass fine bubbles. Although the size of a through hole is not particularly limited, the average diameter of the through hole is preferably approximately 1 to 100 $\mu$m, and more preferably approximately 10 to 50 $\mu$m. When the average diameter of the through hole is less than the range, the resistance of the filter 15 to the flow of water is too high. Accordingly, the efficiency of sterilizing water may be decreased. conversely, when the average diameter exceeds the range, the effect of storing the fine bubbles without passing the fine bubbles is insufficient. Accordingly, the efficiency of separating gas and a liquid may be reduced.

Figure 21:
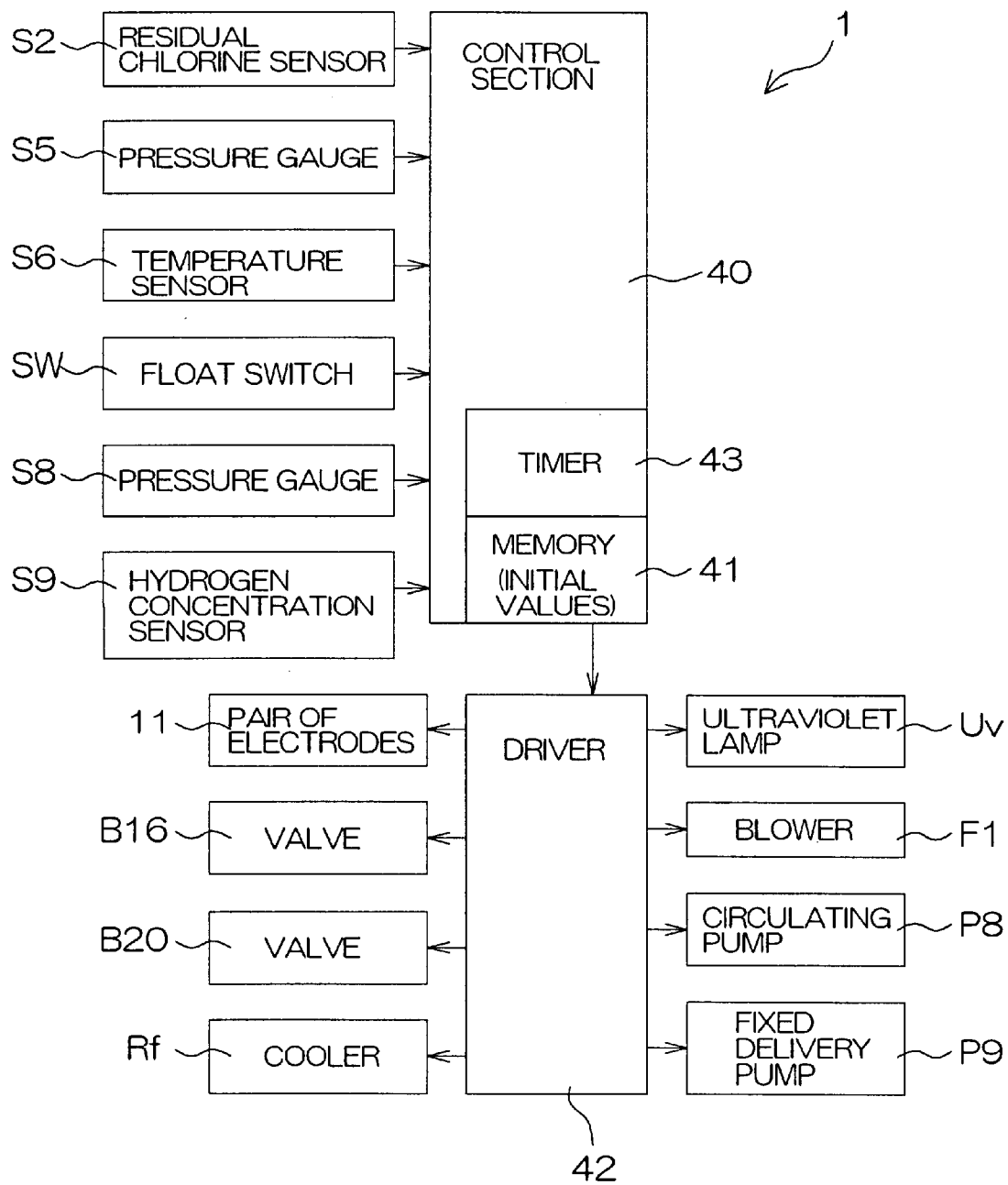
FIG. 21 is a block diagram showing the electrical configuration of the water treatment device shown in FIG. 20.

FIG. 21 is a block diagram showing the electrical configuration of the water treatment device 1 shown in FIG. 20. The water treatment device 1 comprises a control section 40 for operating each of sections constituting the water treating path 10, the bypass path 10e, the supplying path 10f, and so forth while controlling the energization of the pair of electrodes 11. Outputs of the residual chlorine sensor S2, the pressure gauges S5 and S8, the temperature sensor S6, the float switch SW, and the hydrogen concentration sensor S9 are fed to the control section 40. The control section 40 comprises a memory 41 for registering initial values and a timer 43 for defining the timing of each type of operation.

The control section 40 performs various types of operations on the basis of the outputs of the sensors S2, S5, S6, S8, and S9 and the float switch SW, the timing defined by the timer 43, and the initial values registered in the memory 41, and feeds a control signal to a driver 42 on the basis of the operations. The driver 42 controls energization, for example, electrical current flowing through the pair of electrodes 11 and a time period during which the pair of electrodes 11 is energized on the basis of the fed signal, and controls the opening or closing of the valves B16 and Band the driving of the cooler Rf, the ultraviolet lamp Uv, the blower F1, and the pumps P8 and P9.

Figure 22:
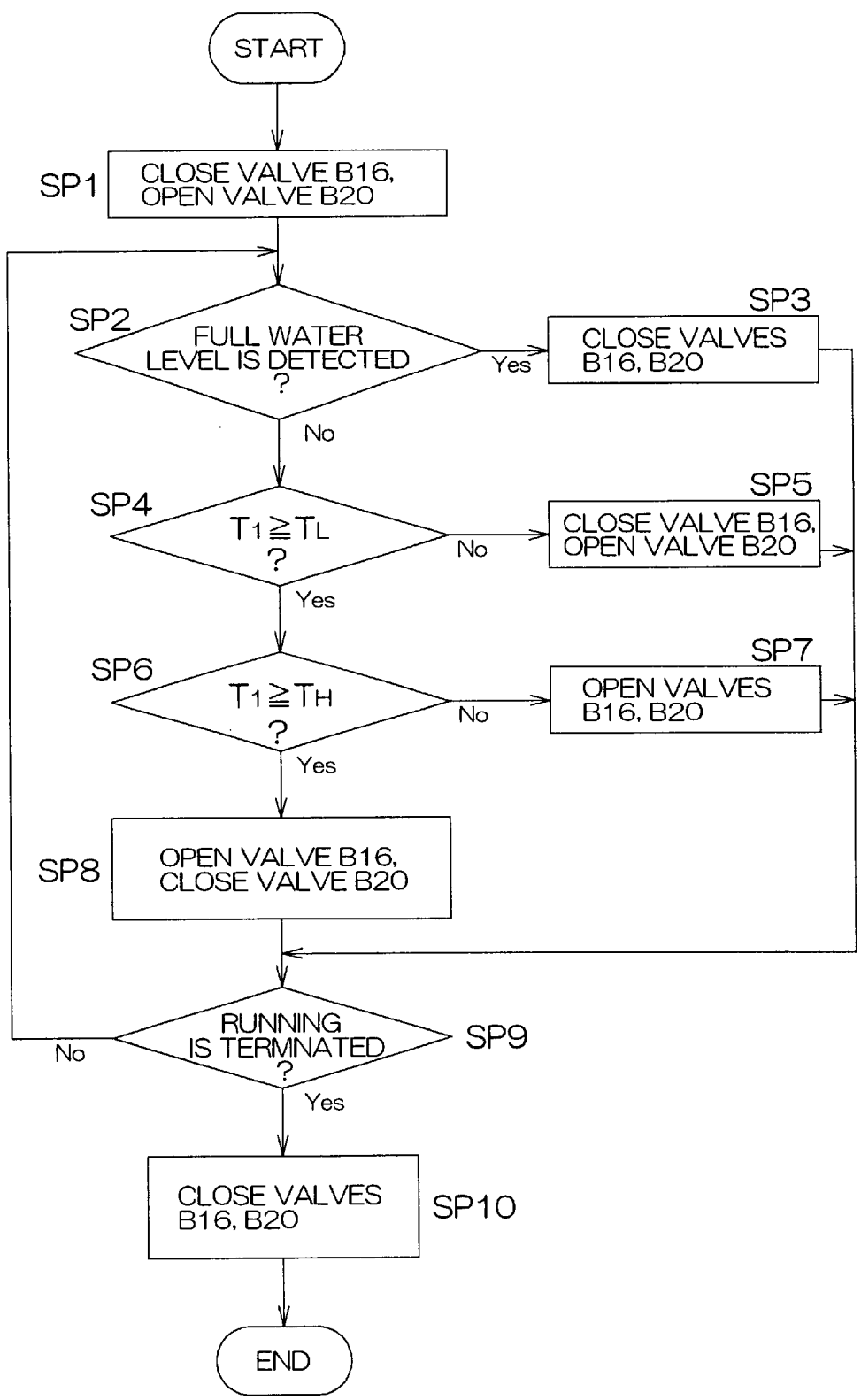
FIG. 22 is a flow chart showing the flow of water temperature control in the contents of control carried out by a control section.

FIG. 22 is a flow chart showing the flow of water temperature control of water supplied to the electrolytic tank 12 using the temperature sensor S6, the cooler Rf, and the bypass path 10e in the control carried out by the control section 40.

When the running of the water treatment device 1 is started, to operate each of the sections constituting the water treating path 10, the control section 40 closes the valve B16 on the side of the cooler Rf, while opening the valve B20 on the side of the bypass path 10e, to supply the water to the electrolytic tank 12 through the bypass path 10e, thereby starting to sterilize the water (step SP1).

When the water level in the gas/liquid separation area 120a on the uppermost stream side in the electrolytic tank 12 is sensed by the float switch SW in the electrolytic tank 12 (step SP2), to judge that the water level is a full water level, both the valves B16 and B20 are closed, to bring the water treatment device 1 into a stand-by condition (step SP3→step SP9→step SP2).

Since the circulating pump P8 continues to be operated during this time, the water level in the gas/liquid separation area 120a is soon decreased. When the water level is decreased, to enter a state where water can be supplied, the water temperature $T_1$ of the water is sensed by the temperature sensor S6, and is compared with the lower threshold $T_L$ registered in the memory 41 (step SP4).

When the water temperature $T_1$ is less than the threshold $T_L$ ($T_1<T_L$) it is judged that the water need not be cooled because the water temperature thereof is sufficiently low. Accordingly, only the valve B20 is opened with the valve B16 remaining closed, to supply the water to the electrolytic tank 12 through the bypass path 10e to sterilize the water (step SP5).

On the other hand, when the water temperature $T_1$ is not less than the threshold $T_L$ ($T_1 \geq T_L$), it is compared with the higher threshold $T_H$ registered in the memory 41 (step SP6).

As a result, when the water temperature $T_1$ is less than the threshold $T_H$ ($T_1<T_H$), it is judged that the water must be gradually cooled because the water temperature thereof is high. Accordingly, both the valves B16 and B20 are opened, to sterilize the water while supplying the water to the electrolytic tank 12 through both the cooler Rf and the bypass path 10e (step SP7).

On the other hand, when the water temperature $T_1$ is not less than the threshold $T_H$ ($T_1>T_H$), it is judged that the water must be rapidly cooled because the water temperature thereof is significantly high. Accordingly, the valve B20 is closed and the valve B16 is opened, to sterilize the water by supplying the water to the electrolytic tank 12 while cooling the water through only the cooler Rf (step SP8).

The above-mentioned series of operations is repeated until the running of the device 1 is terminated (step SP9). When the running is terminated, both the valves B16 and B20 are closed, to terminate the water temperature control (step SP10).

The specific values of the thresholds $T_L$ and $T_H$ of the water temperature which are previously set in the water temperature control are not particularly limited. If consideration is given to the effect of restraining such a phenomenon that hypochlorous acid or its ion is decomposed to generate chlorine gas, and the chlorine gas escapes from water upon being vaporized, it is preferable that in the case of a swimming pool, for example, the lower threshold $T_L$ is approximately 29.5° C., and the higher threshold $T_H$ is approximately 30.0° C.

Figure 23:
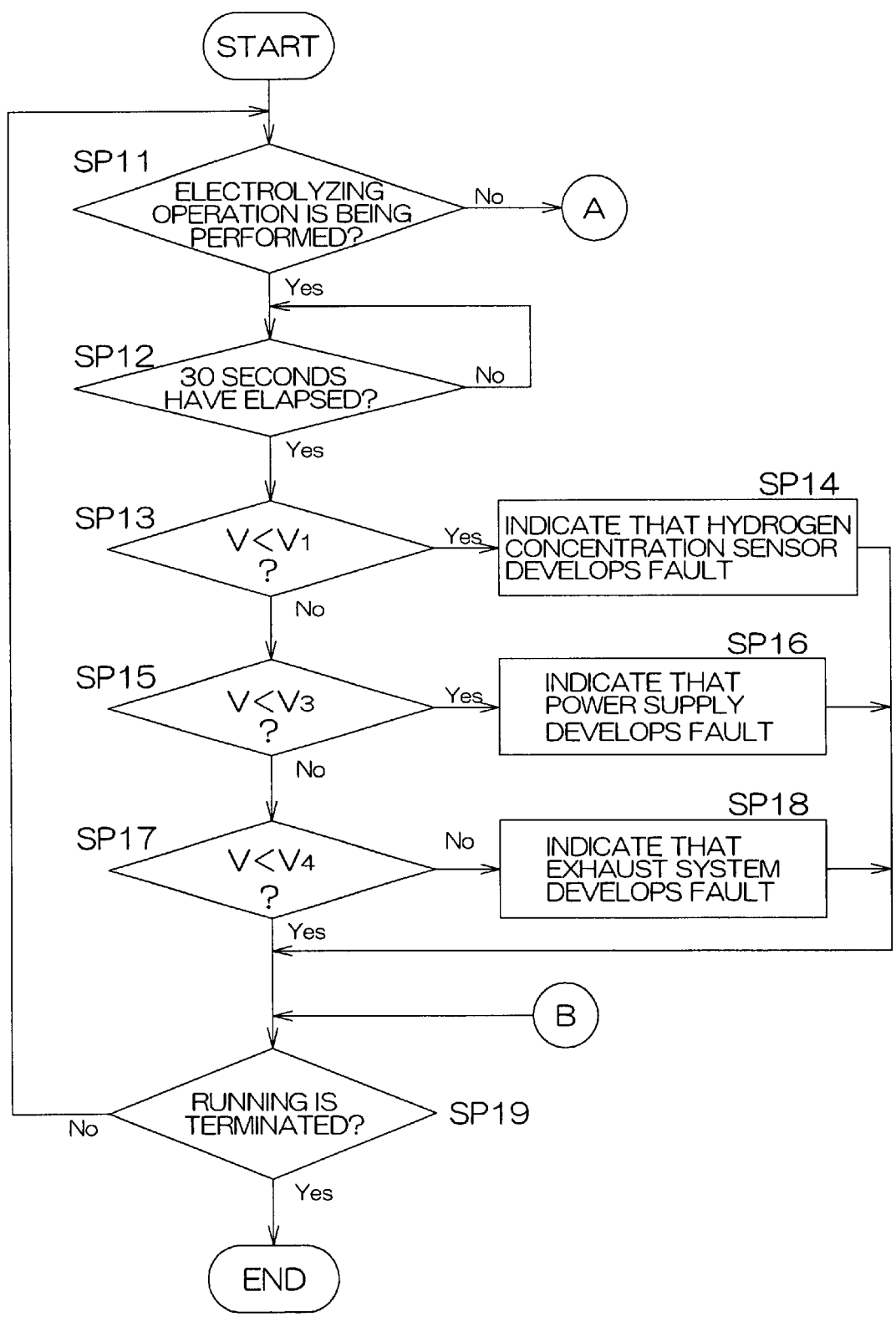
FIG. 23 is a flow chart showing the flow of a fault diagnose made using a hydrogen concentration sensor in the contents of control carried out by a control section.
Figure 24:
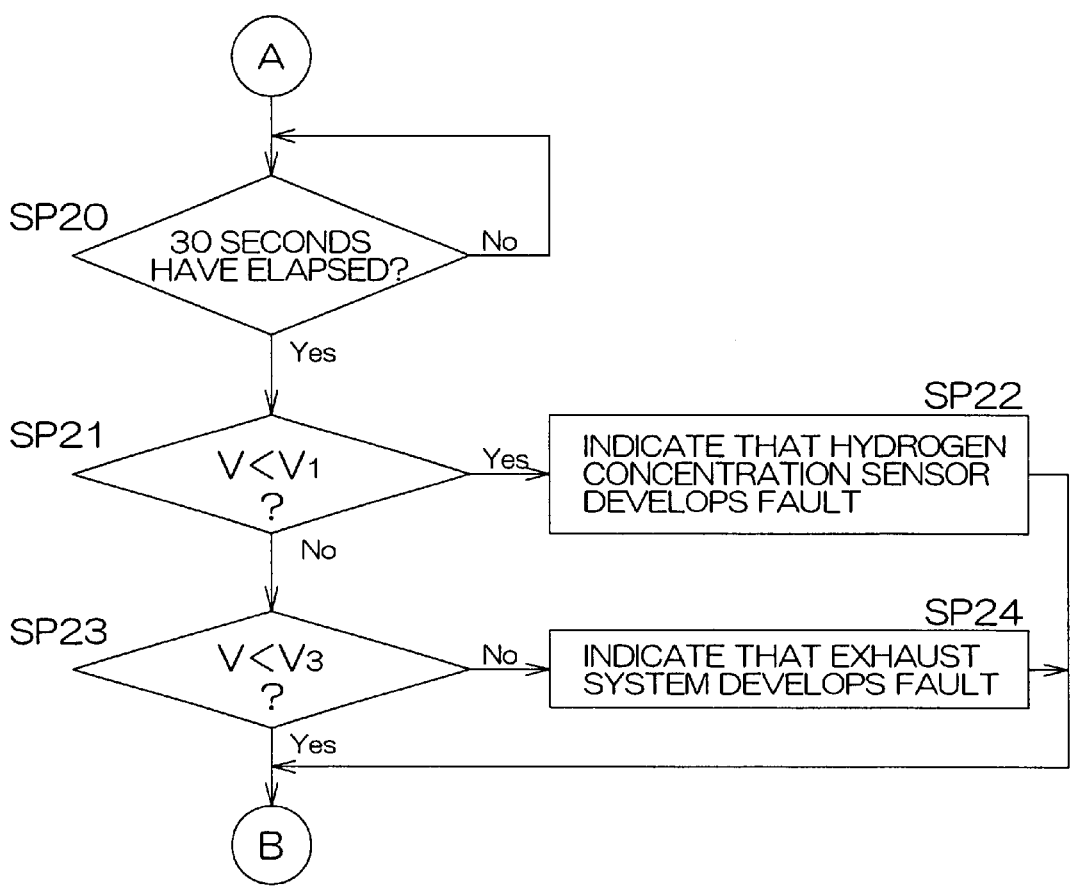
FIG. 24 is a flow chart showing a sub-routine of the flow chart shown in FIG. 23.

FIGS. 23 and 24 are flow charts showing the flow of a fault diagnosis using the hydrogen concentration sensor S9 in the control carried out by the control section 40.

Figure 25:
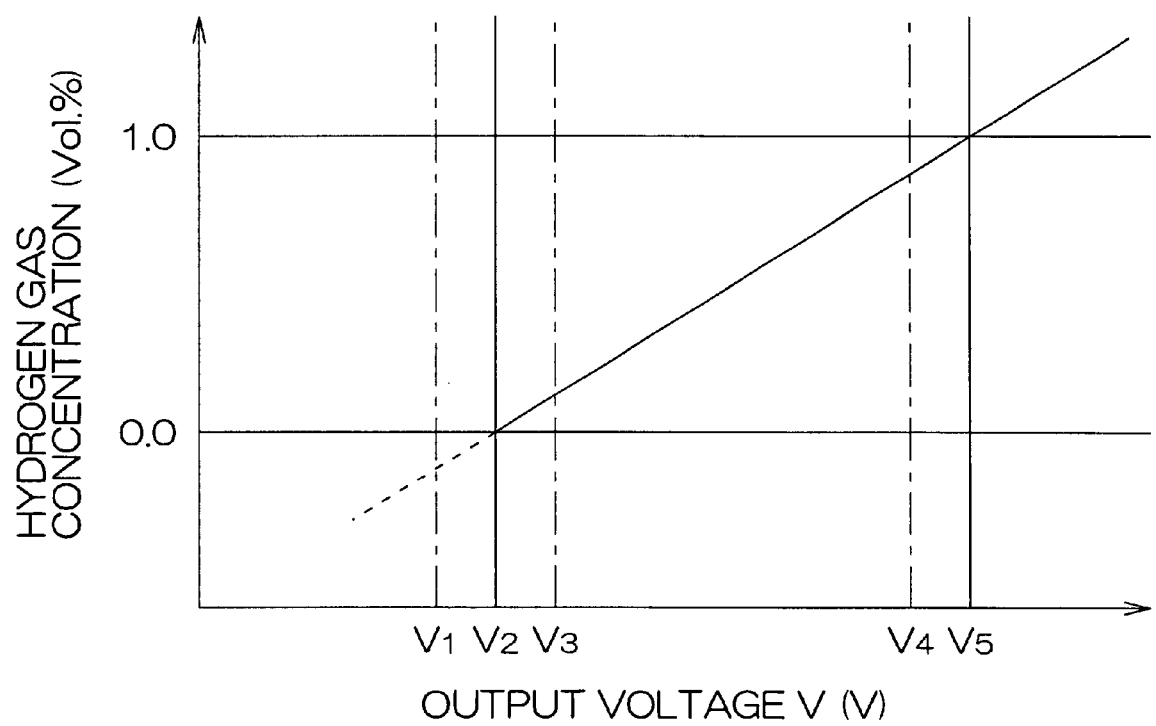
FIG. 25 is a graph showing an example of output characteristics of a hydrogen concentration sensor.

In the hydrogen concentration sensor S9, it is assumed that a normal output voltage is $V_2$ (V) in a case where the hydrogen gas concentration is 0.0% by volume, while being $V_5$ (V) in a case where the hydrogen gas concentration is 1.0% by volume, as shown in FIG. 25. An output voltage $V_1$ lower than the output voltage $V_2$ by a predetermined voltage, an output voltage $V_3$ higher than the output voltage $V_2$ by a predetermined voltage, an output voltage $V_4$ lower than the output voltage $V_5$ by a predetermined voltage are previously registered as thresholds in the memory 41.

When the running of the water treatment device 1 is started, the control section 40 first energizes the pair of electrodes 11, to judge whether or not an electrolyzing operation for sterilizing water by electrolytic reaction is being performed (step SP11).

When the electrolyzing operation is being performed, the water treatment device 1 is brought into a stand-by condition until a predetermined time period (30 seconds in FIG. 23) has elapsed since the running was started, that is, hydrogen generated by the electrolytic reaction after energizing the pair of electrodes 11 is separated from the water by the filters 15 in the electrolytic tank 12 and is sucked up by the blower F1, to reach the hydrogen concentration sensor S9 (step SP12). At the time point where the predetermined time period has elapsed, an output voltage V of the hydrogen concentration sensor S9 is compared with the threshold $V_1$ (step SP13).

When the output voltage V is less than the threshold $V_1$ ($V<V_1$), an output voltage from the hydrogen concentration sensor S9 is not sufficient. Accordingly, it is judged that the hydrogen concentration sensor S9 itself develops a fault, to indicate that a fault is developed (step SP14).

On the other hand, when the output voltage V is not less than the threshold $V_1$ ($V \geq V_1$), it is judged that the hydrogen concentration sensor S9 does not develop a fault and is normally operated, to then compare the output voltage V with a threshold $V_3$ (step SP15). As a result, when the output voltage V is less than the threshold $V_3$ ($V<V_3$), no hydrogen gas is generated irrespective of the fact that the electrolyzing operation is being performed. Accordingly, it is judged that the pair of electrodes 11 itself or a power source, wiring, or the like serving as a driving system for energizing the pair of electrodes 11 develops a fault, to indicate that a fault is developed (step SP16).

On the other hand, when the output voltage V is not less than the threshold $V_3$ ($V \geq V_3$), it is judged that the pair of electrodes 11 or its driving system does not develop a fault and is normally operated, to compare the output voltage V with a threshold $V_4$ (step SP17).

When the output voltage V is not less than the threshold $V_4$ ($V \geq V_4$), hydrogen gas is not sufficiently exhausted, and the concentration thereof is increased. Accordingly, it is judged that the blower F1 develops a fault, to indicate that a fault is developed (step SP18).

On the other hand, when the output voltage V is less than the threshold $V_4$ ($V<V_4$), it is judged that the blower F1 does not develop a fault, to indicate nothing. The above-mentioned series of operations is repeated until the running of the device 1 is terminated (step SP19).

On the other hand, when it is judged at the step SP11 that the device 1 is not performing an electrolyzing operation, the program proceeds to a sub-routine shown in FIG. 24. In the sub-routine, the device 1 is brought into a stand-by condition for a predetermined time period (30 seconds in the case as shown), as in the foregoing (step SP20).

At the time point where a predetermined time period has elapsed, the output voltage V of the hydrogen concentration sensor S9 is compared with the threshold $V_1$ (step SP21). As a result, when $V<V_1$, the output voltage from the hydrogen concentration sensor S9 is not sufficient. Accordingly, it is judged that the hydrogen concentration sensor S9 itself develops a fault, to indicate that a fault is developed (step SP22).

On the other hand, when $V \geq V_1$, it is judged that the hydrogen concentration sensor S9 does not develop a fault and is normally operated, to then compare the output voltage V with the threshold $V_3$ (step SP23).

When $V \geq V_3$, the hydrogen concentration is high irrespective of the fact that the electrolyzing operation is not being performed. Accordingly, it is found that the hydrogen gas generated at the time of the previous electrolyzing operation remains without being exhausted. Accordingly, it is judged that the blower F1 of an exhaust system develops a fault, to indicate that a fault is developed (step SP24).

On the other hand, when $V<V_3$, it is judged that the blower F1 does not develop a fault, to indicate nothing. Thereafter, the program is returned to the main routine shown in FIG. 23.

The specific values of the thresholds $V_1$, $V_3$, and $V_4$ previously set in the fault sensing control are not particularly limited. When used as the hydrogen concentration sensor S9 is one in which the output voltage $V_2$ is set to 0.8 V and the output voltage $V_5$ is set to 1.6 V, it is preferable that the thresholds $V_1$, $V_3$, and $V_4$ are respectively set to approximately 0.7 V, 0.9 V, and 1.5 V in order to make precise and accurate judgment.

Figure 26:
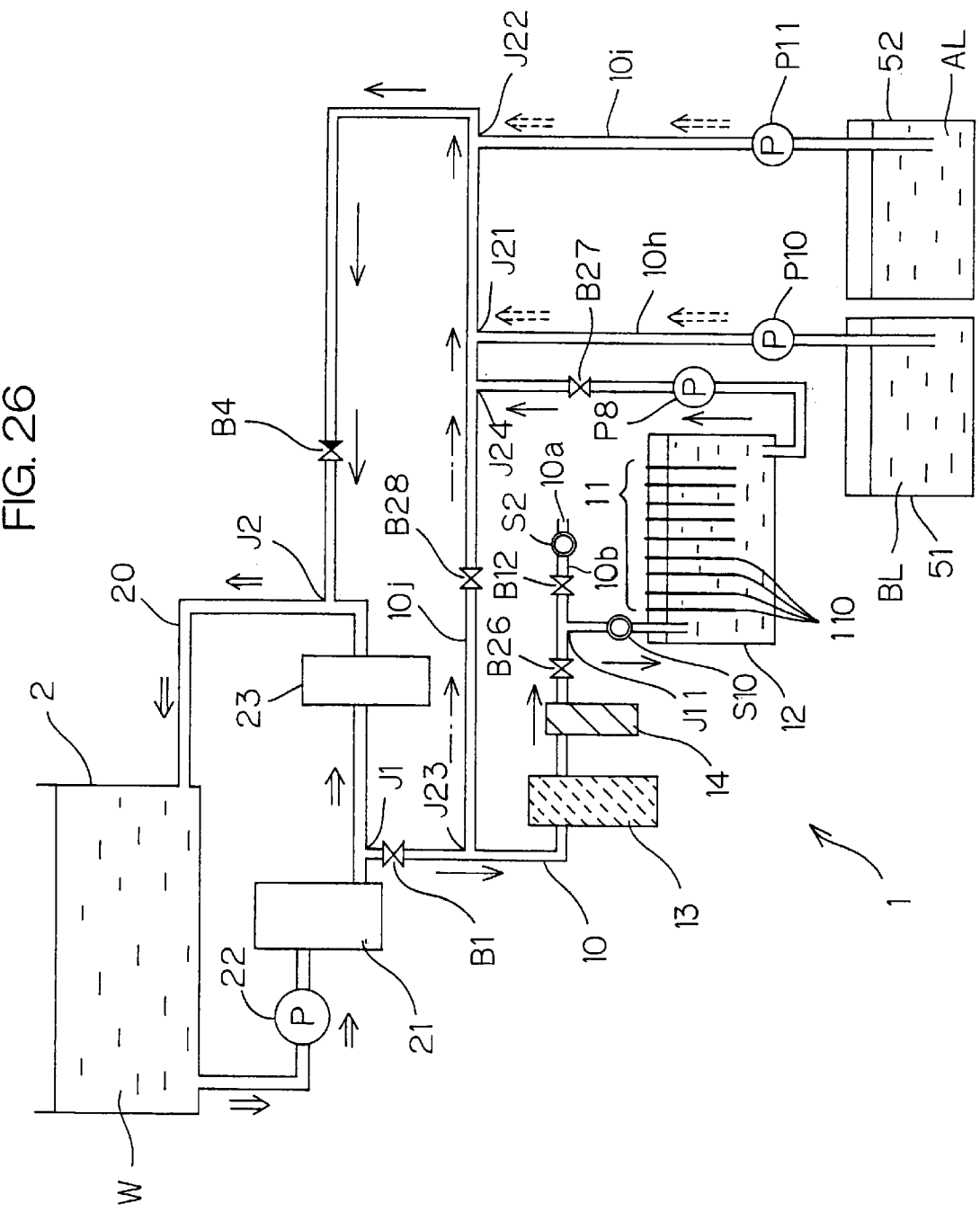
FIG. 26 is a diagram showing the construction of a water treatment device for a large-sized pool according to another embodiment of the present invention.

FIG. 26 is a diagram showing the construction of a water treatment device 1 for a large-sized pool 2 according to another embodiment of the present invention.

The water treatment device 1 in the present embodiment comprises a water treating path connected to a main circulating path 20. An adjusting valve B1, a filter 13 for filtration, an ion exchange resin 14, a valve B26, and a pH sensor S10 are arranged halfway from a branching point J1 to an electrolytic tank 12 on the water treating path 10. A circulating pump P8, an adjusting valve B27 for flow rate adjustment, and a check valve B4 are arranged in this order halfway from the electrolytic tank 12 to a branching point J2 on the water treating path 10. A pair of electrodes 11 comprising a plurality of plate-shaped electrodes 110 is arranged in the electrolytic tank 12.

A branching path 10b branched at a branching point J11, connected to a residual chlorine sensor S2 through an adjusting valve B12, and leading to a drain port 10a therefrom is connected between the valve B26 and the pH sensor Son the water treating path 10.

A first adjusting solution tank 51 to put in and store an alkaline pH adjusting solution BL such as a solution of sodium hydroxide (NaOH) and a second adjusting solution tank 52 to put in and store an acid pH adjusting solution AL such as a solution of hydrochloric acid (HCl) are connected between the adjusting valve B27 and the check valve B4 on the water treating path 10. Specifically, a first supplying path 10h is branched from a branching point J21 between the adjusting valve B27 and the check valve B4 on the water treating path 10, to reach the first adjusting solution tank 51. A fixed delivery pump P10 is interposed halfway on the first supplying path 10h. The alkaline pH adjusting solution BL stored in the first adjusting solution tank 51 is sucked up through the supplying path 10h by the fixed delivery pump P10, is merged at the branching point J21, and is supplied to the water treating path 10.

Furthermore, a second supplying path 10i is branched from a branching point J22 on the downstream side of the branching point J21 on the water treating path 10, to reach the second adjusting solution tank 52. A fixed delivery pump P11 is interposed halfway on the second supplying path 10i. The acid pH adjusting solution AL stored in the second adjusting solution tank 52 is sucked up through the supplying path 10i by the fixed delivery pump P11, is merged at the branching point J22, and is supplied to the water treating path 10.

A bypass path 10j branched at a branching point J23, and leading to a branching point J24 between the adjusting valve B27 and the branching point J21 through a valve B28 is connected between the adjusting valve B1 and the filter 13 on the water treating path 10. When the pH of water varies, the valve B26 is closed, and the valve B28 is opened, to supply the alkaline pH adjusting solution BL stored in the first adjusting solution tank 51 and/or the acid pH adjusting solution AL stored in the second adjusting solution tank 52 to adjust the pH of the water while circulating the water through the bypass path 10j having a low pressure loss.

Figure 27:
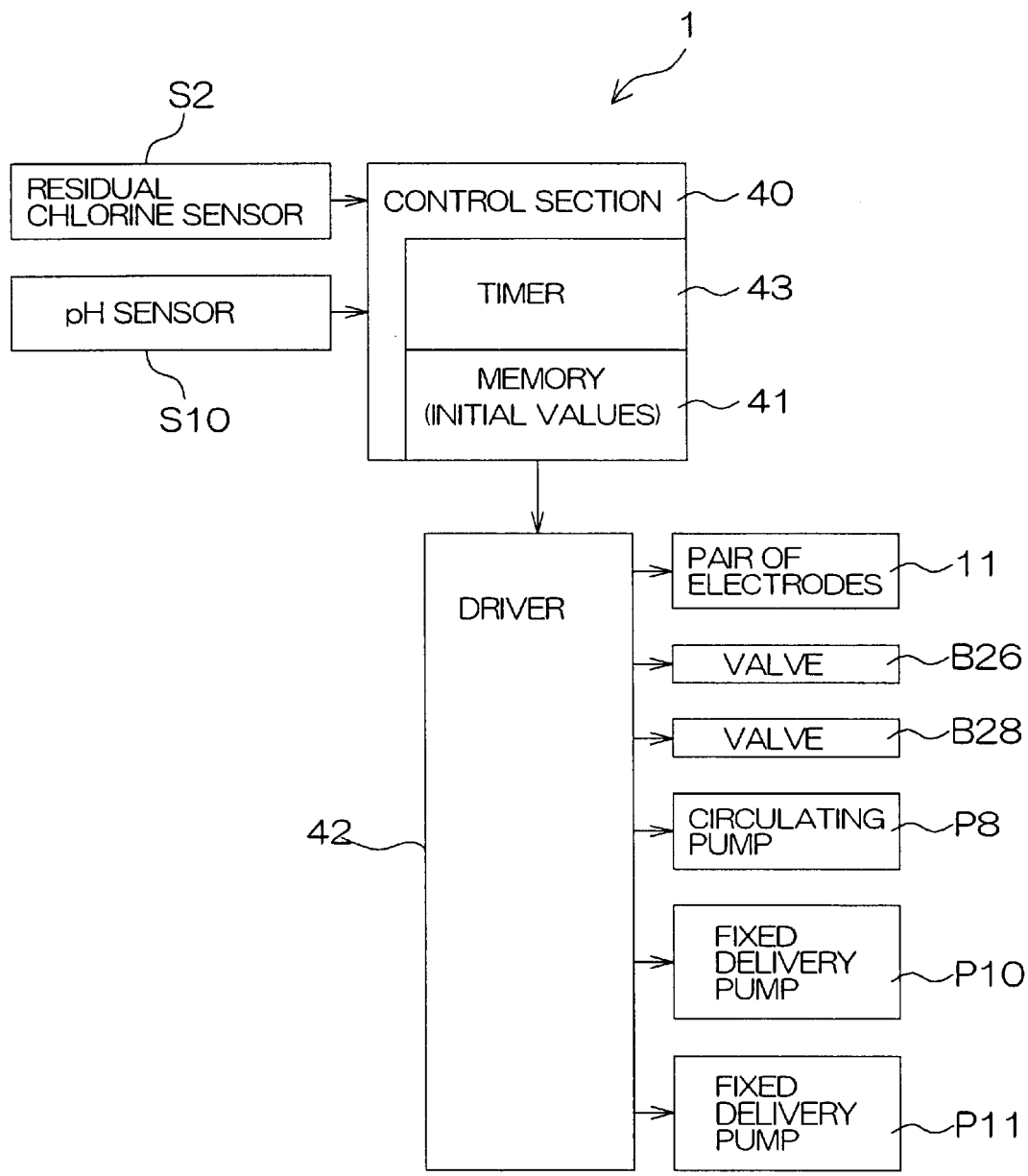
FIG. 27 is a block diagram showing the electrical configuration of the water treatment device shown in FIG. 26.

FIG. 27 is a block diagram showing the electrical configuration of the water treatment device 1 shown in FIG. 26.

The water treatment device 1 comprises a control section 40 serving as control means for operating each of sections constituting the water treating path 10, the supplying paths 10h and 10i, and the bypass path 10j while controlling the energization of the pair of electrodes 11. Outputs of the residual chlorine sensor S2 and the pH sensor S10 are fed to the control section 40. The control section 40 comprises a memory 41 registering initial values and a timer 43 for defining the timing of each type of operation.

The control section 40 performs various types of operations on the basis of the outputs of the sensors S2 and S10, the timing defined by the timer 43, and the initial values registered in the memory 41, and feeds a control signal to a driver 42 on the basis of the operations. The driver 42 controls energization, electrical current flowing through the pair of electrodes 11 and a time period during which the pair of electrodes 11 is energized on the basis of the fed signal, and controls the opening or closing of the valves B26 and B28 and the driving of the pumps P8, P10, and P11.

Figure 28:
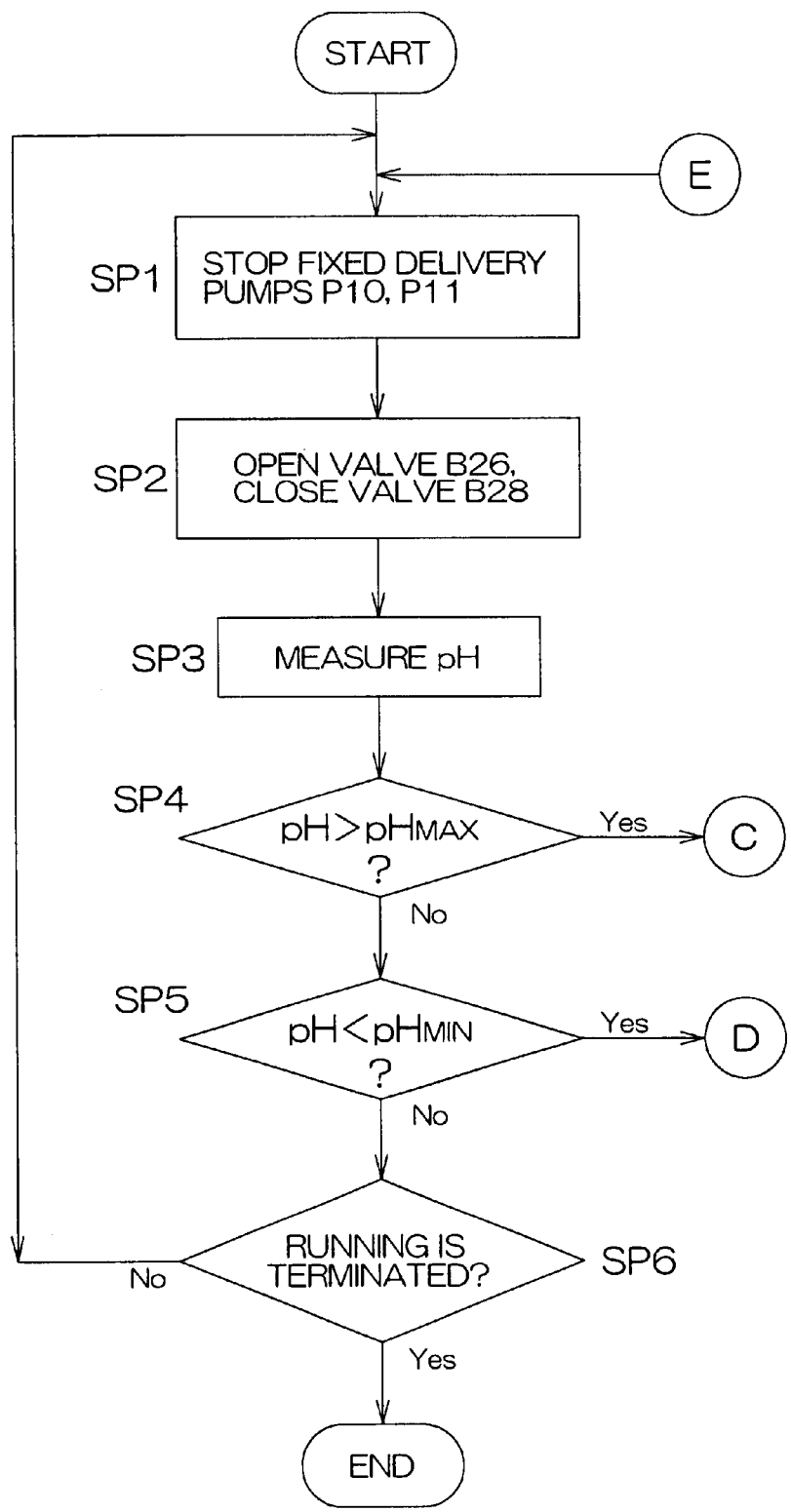
FIG. 28 is a flow chart showing the flow of pH adjustment in the contents of control carried out by a control section.

FIG. 28 is a flow chart showing the flow of pH adjustment of water using the pH sensor S10 in the control carried out by the control section 40.

When the water treatment device 1 starts to run, the control section 40 first confirms the stop of the respective fixed delivery pumps P and P11 on the supplying paths 10h and 10i, opens the valve B26 on the side of the electrolytic tank 12 and closes the valve B28 on the side of the bypass path 10j to supply the water to the electrolytic tank 12, and energizes the pair of electrodes 11 to perform normal sterilization (steps SP1 to SP2).

The pH of the water flowing through the water treating path 10 is then measured using the pH sensor S10 (step SP3), and the measured value is compared with a threshold $pH_{MAX}$ on the upper limit side of the pH registered in the memory 41 (step SP4).

When the measured value of the pH is not more than the threshold $pH_{MAX}$ ($pH \leq pH_{MAX}$), the measured value is then compared with the threshold $pH_{MIN}$ on the lower limit side of the pH registered in the memory 41 (step SP5).

As a result, when the measured value of the pH is not less than the threshold $pH_{MIN}$ ($pH \geq pH_{MIN}$), it is judged that the pH does not vary, to perform the above-mentioned series of operations until the running of the device 1 is terminated (step SP6→step SP1).

Figure 29A:
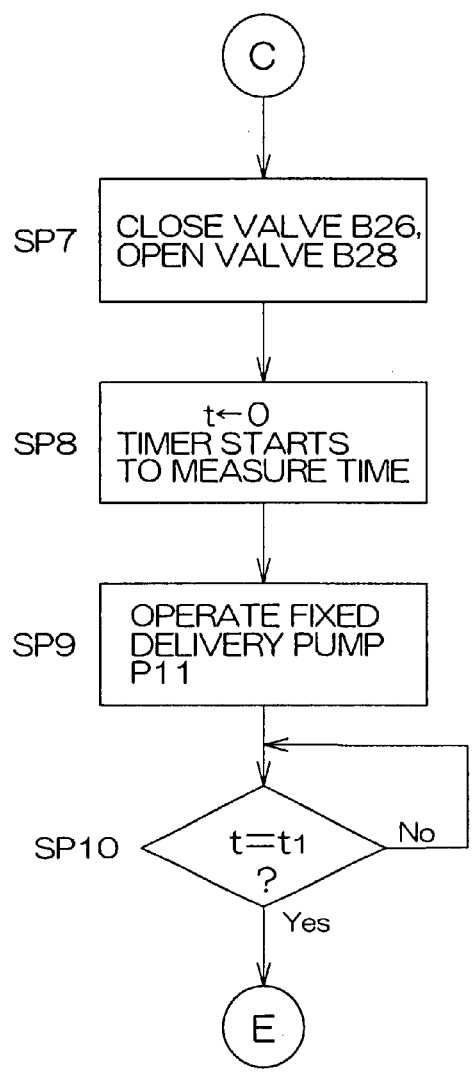
FIGS. 29A and 29B are flow charts showing a sub-routine of the flow chart shown in FIG. 28.

On the other hand, when the measured value of the pH exceeds the threshold $pH_{MAX}$ on the upper limit side (pH $>pH_{MAX}$) at the step SP4, it is judged that the pH of the water is shifted toward the alkaline side. Accordingly, the program proceeds to a sub-routine shown in FIG. 29A. First in the sub-routine, the valve B26 is closed, and the valve B28 is opened, thereby circulating the water through the bypass path 10*j* (step SP7).

The timer 43 is then reset to start to measure time, and the fixed delivery pump P11 is operated for a predetermined time period $t_1$ previously registered in the memory 41, to supply the acid pH adjusting solution AL in a predetermined amount from the second adjusting solution tank 52 to adjust the pH. Thereafter, the program is returned to the main routine shown in FIG. 28 (steps SP8 to SP 10).

Figure 29B:
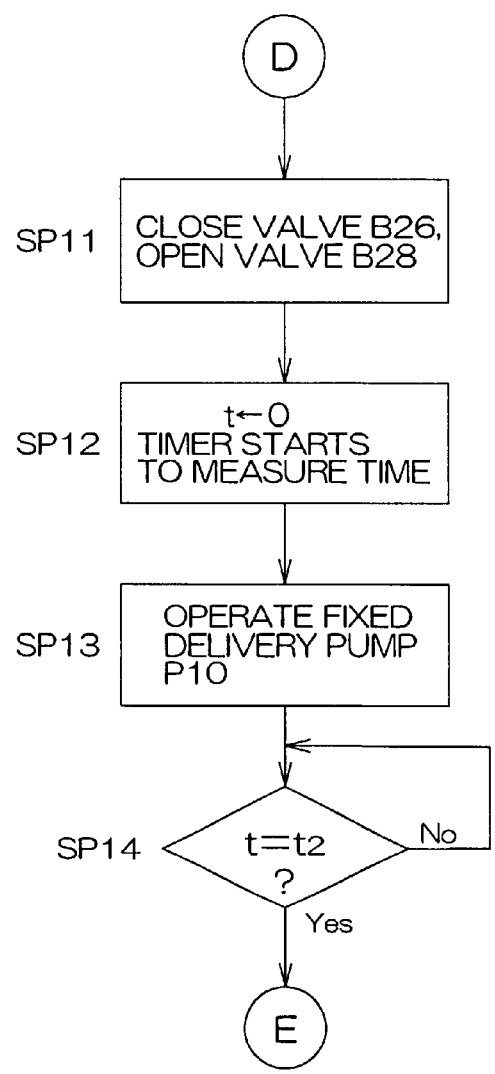

When the measured value of the pH is less than the threshold $pH_{MIN}$ on the lower limit side ($pH<PH_{MIN}$) at the step SP5, it is judged that the pH of the water is shifted toward the acid side. Accordingly, the program proceeds to a sub-routine shown in FIG. 29B. First in the sub-routine, the valve B26 is closed, and the valve B28 is opened, thereby circulating the water through the bypass path 10*j* (step SP1).

The timer 43 is then reset to start to measure time, and the fixed delivery pump P10 is operated for a predetermined time period $t_2$ previously registered in the memory 41, to supply the alkaline pH adjusting solution BL in a redetermined amount from the first adjusting solution tank 51 to adjust the pH. Thereafter, the program is returned to the main routine shown in FIG. 28 (steps SP12 to SP14).

The specific values of the thresholds $pH_{MIN}$ and $pH_{MAX}$ of the pH previously set in the pH adjustment are not particularly limited. However, a range of approximately ±0.5 of a target value of the pH is preferable.

In order to adjust the pH of the water is approximately 4.5 which is suitable for sterilization by electrolytic reaction, that is, at which electrolysis easily proceeds, it is preferable that the threshold $pH_{MIN}$ on the lower limit side is approximately 4.0, and the threshold $pH_{MAX}$ on the upper limit side is approximately 5.0.

The pH of the water is also similarly set in a case where it is adjusted to a range of the pH having characteristics, for example, an acid bath or an alkaline bath. The alkaline bath has the effect of promoting metabolism of the skin to clean the body by making it easy for components such as potassium, sodium, and a fat to melt from the body. Since the pH of the alkaline bath is approximately 10.0, the threshold $pH_{MIN}$ is set to approximately 9.5, and the threshold $pH_{MAX}$ is set to approximately 10.5. In the alkaline bath, valuable components of the body are lost. For old persons, babies and infants, or weak persons on which a heavier burden is imposed because the pH balance is upset, a weak acid bath is preferable. Since the pH of the acid bath is approximately 5.0, the threshold $pH_{MIN}$ is set to approximately 4.5, and the threshold $pH_{MAX}$ is set to approximately 5.5. A stronger acid bath is effective for skin disease such as athlete's foot because it has antimicrobial activity. Since the pH of the strong acid bath is approximately 3.0, the threshold $pH_{MIN}$ is set to approximately 2.5, and the threshold $pH_{MAX}$ is set to approximately 3.5.

Figure 30:
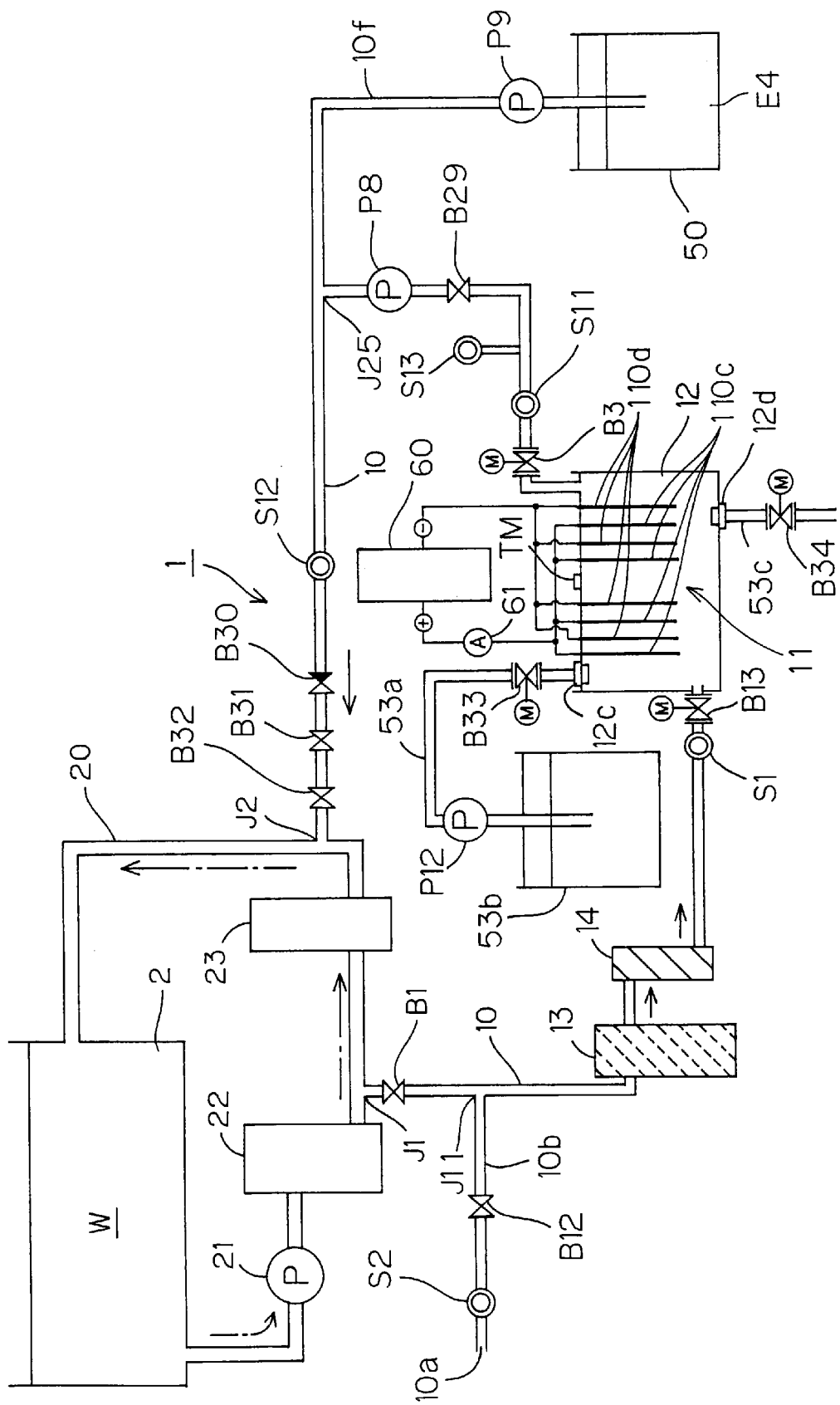
FIG. 30 is a diagram showing the construction of a water treatment device for a large-sized pool according to another embodiment of the present invention.

FIG. 30 is a diagram showing the construction of a water treatment device 1 for a large-sized pool 2 according to another embodiment of the present invention.

The water treatment device 1 in the present embodiment comprises a water treating path 10 connected to a main circulating path 20. An adjusting valve B1, a filter 13 for filtration, an ion exchange resin 14, a conductivity sensor S1, a valve B13, an electrolytic tank 12, a valve B3, a flow meter S11, an adjusting valve B29 for flow rate adjustment, a circulating pump P8, a flow meter S12, a check valve B30, and adjusting valves B31 and B32 are interposed on the water treating path branched from a branching point J1, and the water treating path 10 is merged into a branching point J2.

A branching path 10*b* branched at a branching point J11, connected to a residual chlorine sensor S2 through an adjusting valve B12, and leading to a drain port 10*a* is connected between the adjusting valve B1 and the filter 13 on the water treating path 10.

The electrolytic tank 12 comprises pairs of electrodes 11 respectively comprising a plurality of plate-shaped plus-side electrodes 110*c* and minus-side electrodes 110*d*. The plus-side electrode 110*c* is connected to a plus-side potential of a power source 60, and the minus-side electrode 110*d* is connected to a minus-side potential of the power source 60. An ammeter 61 is inserted into a path connecting the power source 60 and the plus-side electrode 110*c*. Accordingly, current flowing from the power source 60 to the pair of electrodes 11 can be measured by the ammeter 61.

The electrolytic tank 12 comprises an inlet 12*c* for introducing a cleaning solution or the like and an outlet 12*d* for discharging a solution in the electrolytic tank 12. One end of a supplying path 53*a* is connected to the inlet 12*c*, and the other end of the supplying path 53*a* is immersed in a cleaning solution tank 53*b*. Further, a fixed delivery pump P12 and a valve B33 are interposed on the supplying path 53*a*. On the other hand, a drain tube 53*c* comprising a valve B34 is connected to the outlet 12*d*.

The electrolytic tank 12 further comprises a thermistor TM serving as temperature sensing means for sensing the temperature of the tank.

A pressure gauge S13 for measuring the pressure of water flowing out of the electrolytic tank 12 is provided between the flow meter S11 and the adjusting valve B29 on the water treating path 10.

Furthermore, a solution tank 50 to put in and store a sterilizing solution E4 such as a solution of sodium hypochlorite is connected between the circulating pump P8 and the flow meter S12 on the water treating path 10. Specifically, a supplying path 10*f* is branched from a branching point J25 between the circulating pump P8 and the flow meter S12 on the water treating path 10, to reach the solution tank 50. A fixed delivery pump P9 is interposed halfway on the supplying path 10*f*. The electrolytic solution E4 stored in the solution tank 50 is sucked up through the supplying path 10*f* by the fixed delivery pump P9, is merged at the branching point J25, and is supplied to the water treating path 10.

Figure 31:
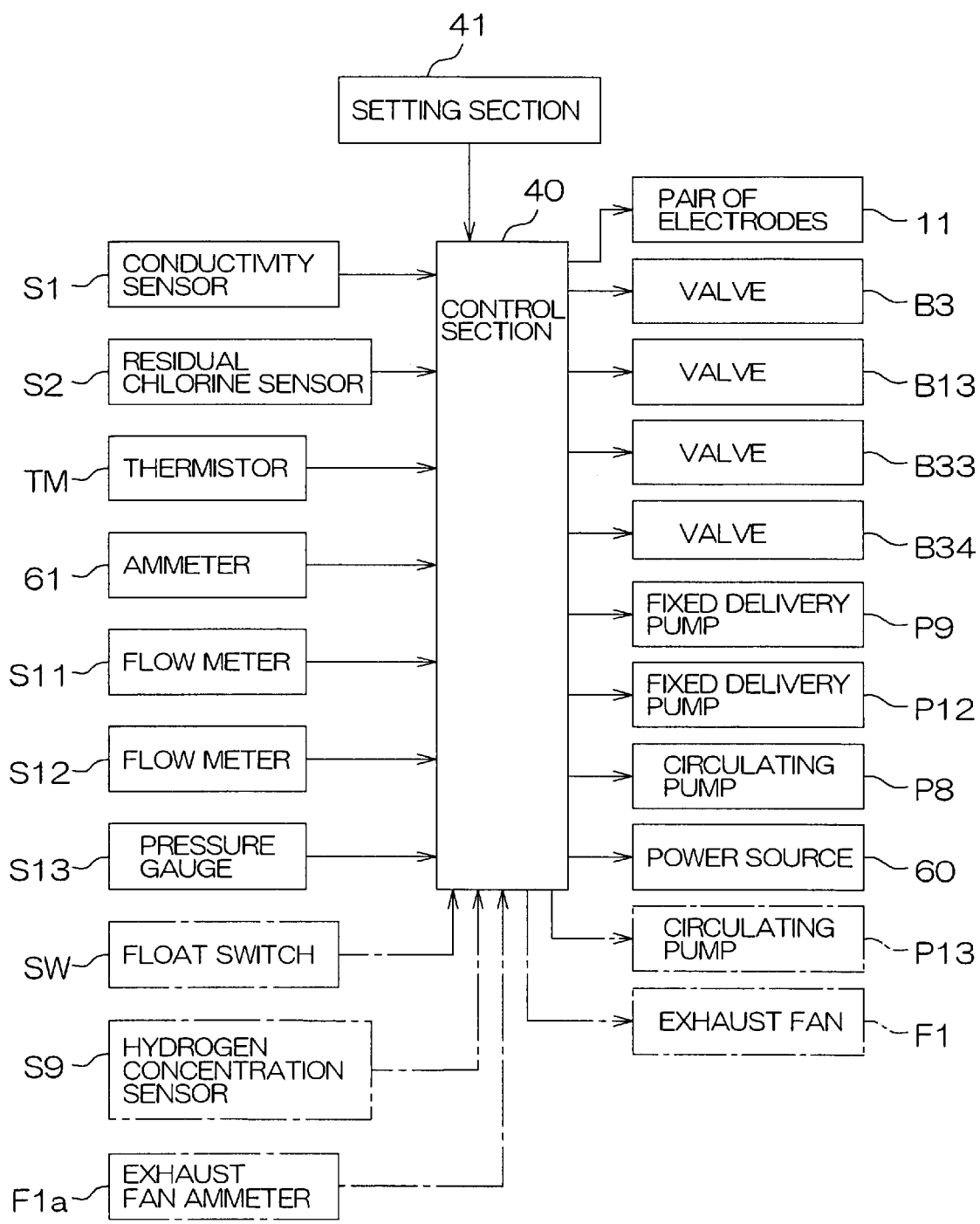
FIG. 31 is a block diagram showing the electrical configuration of the water treatment device shown in FIG. 30.

FIG. 31 is a block diagram showing the electrical configuration of the water treatment device 1 shown in FIG. 30.

The water treatment device 1 comprises a control section 40 composed of a microcomputer or the like.

Sensing signals from various types of sensors provided in the water treatment device 1 described in FIG. 30 are fed to the control section 40. Specifically, sensing signals from the conductivity sensor S1, the residual chlorine sensor S2, the thermistor TM, the ammeter 61, the flow meters S11 and S12, and the pressure gauge S13 are fed to the control section 40. The control section 40 controls the operation of the water treatment device 1 in accordance with a predetermined operation program in response to the fed sensing signals. Specifically, the control section 40 controls the pair of electrodes 11, the valves B3, B13, B33 and B34, the fixed delivery pumps P9 and P12, the circulating pump P8, and the power source 60.

Furthermore, a signal from a setting section 41 is fed to the control section 40. The setting section 41 has an operation panel which can be operated by a manager of the water treatment device 1, for example, and a desired operational state can be set by the operation panel. For example, it is possible to set a target value of the residual chlorine concentration in the pool 2.

Figure 35:
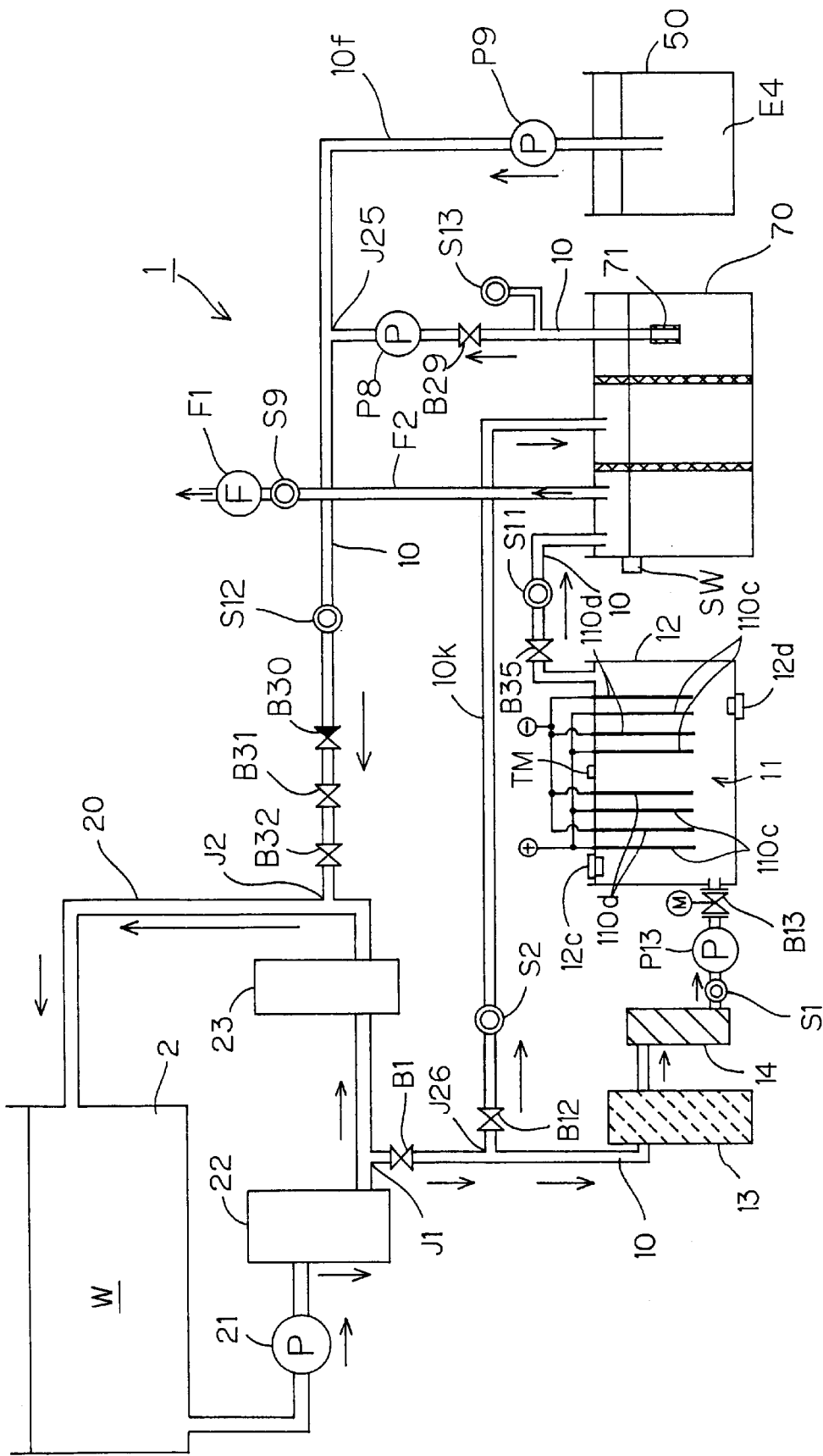
FIG. 35 is a diagram showing the construction of a water treatment device for a large-sized pool according to another embodiment of the present invention.

In the case of the water treatment device 1 having the electrolytic tank 12 also used as gas/liquid separating means as shown in FIG. 35, described later, sensing signals of a float switch SW, a hydrogen concentration sensor S9, and an exhaust fan ammeter F1a are fed to the control section 40, as indicated by a one-dot and dash line. Further, the control section 40 controls the operations of a circulating pump P13 and an exhaust fan F1.

Figure 32:
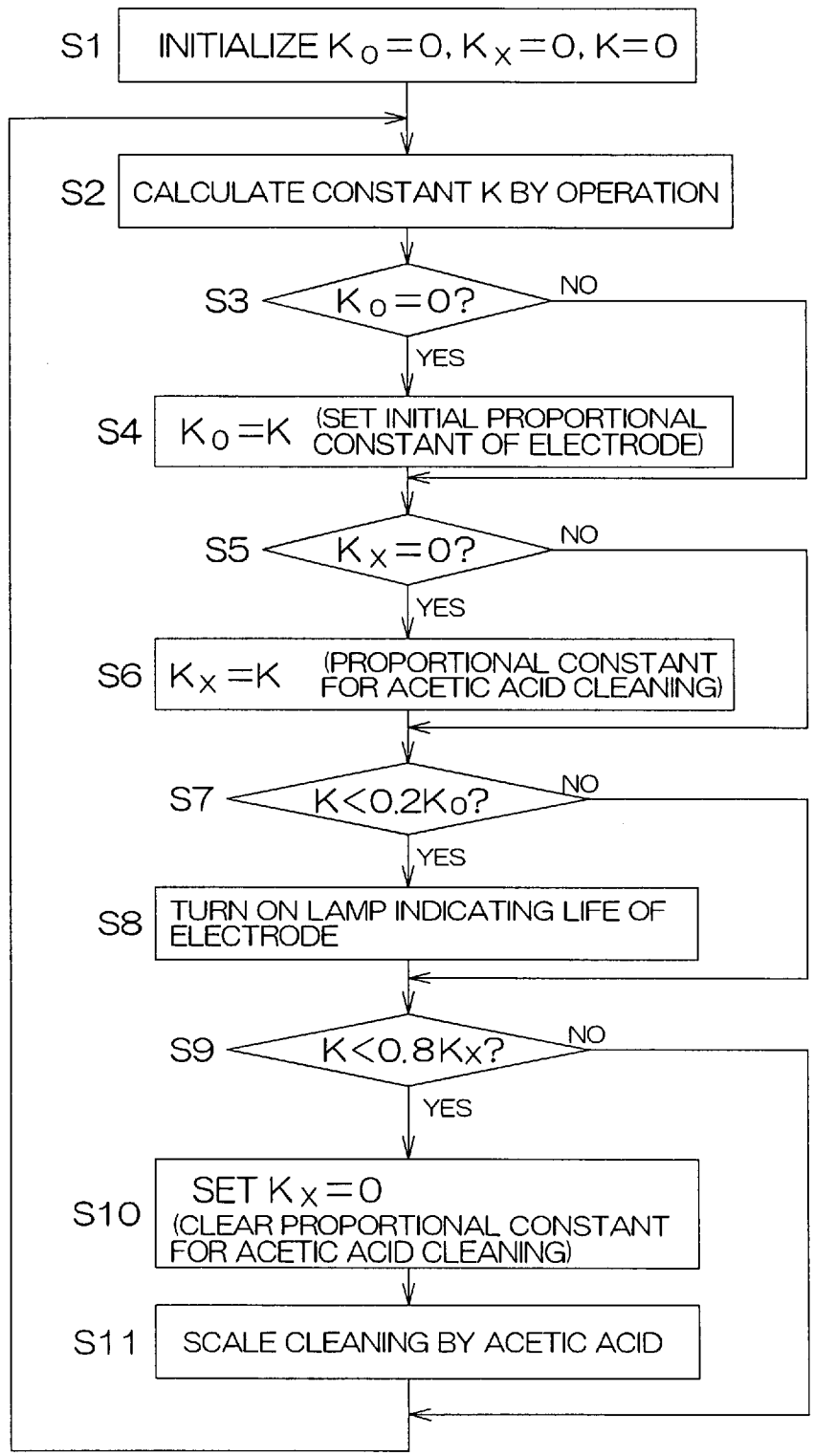
FIG. 32 is a flow chart showing the maintenance control of an electrolytic tank in the contents of control carried out by a control section.

FIG. 32 is a flow chart showing maintenance control of the electrolytic tank 12 out of control operations performed by the control section 40. By the control shown in FIG. 32, it is judged how a scale adheres to the pair of electrodes 11 provided in the electrolytic tank 12, and the life of the pair of electrodes 11 is judged, so that the scale which has adhered is automatically cleaned.

Specific description is made in accordance with the flow chart shown in FIG. 32. The control section 40 comprises a memory area, and three proportional constants $K_0$, $K_x$ and K can be previously set therein. $K_0$ is an initial proportional constant of the pair of electrodes 11, which is a value indicative of the maximum capability of the pair of electrodes 11. Kx is a proportional constant utilized for judging whether or not the pair of electrodes 11 is cleaned by acetic acid serving as a cleaning solution. K is a proportional constant calculated by the value of current flowing through the pair of electrodes 11 and the conductivity thereof.

In the control operation, all the three proportional constants $K_0$, Kx and K are initialized to "0" (step S1). The proportional constant K is then calculated by an operation (step S2). When a predetermined DC voltage is applied between the electrodes, it is known that the value of current flowing between the electrodes is generally proportional to the conductivity $\sigma$ of a solution existing therebetween. Consequently, I=K $\sigma$ holds between conductivity $\sigma$ and current I flowing between the electrodes. Therefore, the control section 40 calculates the proportional constant K on the basis of the current value I obtained from the ammeter 61 and the conductivity $\sigma$ obtained from the conductivity sensor S1.

It is then judged whether or not $K_0$ is "0" (step S3). Immediately after the control is started, $K_0$ is initialized to "0". Accordingly, the program proceeds to the step S4. At the step S4, K calculated at the step S2 is set as the proportional constant $K_0$.

It is then judged whether or not the proportional constant Kx is "0" (step S5). Immediately after the control is started, Kx is initialized to "0". Accordingly, the program proceeds to the step S6. At the step S6, Kx=K is set.

At the step S7, K and $0.2K_0$ are then compared with each other. Immediately after the control is started, $K_0$=K, as set at the step S4. Accordingly, the judgment at the step S7 is denied, so that processing at the step S8 is skipped. Thereafter, the program proceeds to the step S9.

At the step S9, K and 0.8Kx are compared with each other. Kx=K, as set at the step S6, immediately after the control is started. Accordingly, the judgment at the step S9 is denied, so that processing at the steps S10 and S11 is skipped. Thereafter, the processing at the step S2 and the subsequent steps is repeated.

As a time period during which electrolysis is performed in the electrolytic tank 12 has elapsed, the scale or the like gradually adheres to the negative-side electrodes 110d. Therefore, the value of current flowing through the pair of electrodes 11 is gradually changed. At the step S2, the current proportional constant K is calculated by an operation from the relationship of I=K $\sigma$ on the basis of the change in the current value. The calculated K is gradually decreased. Just after the processing is started, both the judgments at the steps S3 and S5 are denied. Accordingly, the processing at the steps S4 and S6 is skipped, and the judgments at the steps S7 and S9 are made. The proportional constant K is gradually decreased. In time, the judgment of K <0.8 Kx at the step S9 is affirmed. That is, the current proportional constant K is less than 80% of the value of Kx=K set at the step S6. In this case, it is judged that the amount of adhesion of the scale to the electrode is increased. Therefore, the program proceeds to scale cleaning control at the steps S10 and S11.

In the control, the proportional constant for cleaning Kx is first cleared to "0" (step S10), thereby making it possible to update Kx after the cleaning. The energization of the pair of electrodes 11 from the power source 60 is temporarily stopped, and the valves B3 and B13 are closed. The valve B34 is opened, to discharge the water in the electrolytic tank 12 from the outlet 12d. Thereafter, the valve B34 is closed, and the valve B33 is opened, to operate the fixed delivery pump P12. Consequently, acetic acid stored in the cleaning solution tank 53b is supplied to the electrolytic tank 12 through the supplying path 53a. When the electrolytic tank 12 is filled with the acetic acid, the fixed delivery pump P12 is stopped, to close the valve B33. The electrolytic tank 12 is filled with the acetic acid for approximately ten minutes, so that the scale adhering to the pair of electrodes 11 is cleaned. Thereafter, the valve B34 is opened, so that the acetic acid used for cleaning is discharged. The valve B34 is closed, and the valves B3 and B13 are opened, to terminate the scale cleaning control (step S11). The program is returned to the step S2.

When the scale cleaning processing is performed once, the proportional constant Kx is cleared to "0". Accordingly, the proportional constant K calculated at the step S2 after the scale cleaning is set again as a proportional constant for cleaning acetic acid (steps S5 and S6). That is, every time the acetic acid has been cleaned, the proportional constant Kx is updated and set. Immediately after Kx is updated and set, therefore, the judgment at the step S9 is denied. Accordingly, the steps S10 and S11 are skipped, so that the processing at the step S2 and the subsequent steps is repeated. When the electrolysis in the electrolytic tank 12 is further continued, the judgment at the step S9 is in time affirmed. At that time, the acetic acid is cleaned again.

As described in the foregoing, the acetic acid is cleaned for each predetermined period. Accordingly, the scale adhering to the pair of electrodes is automatically cleaned, so that the electrolysis in the electrolytic tank 12 can be satisfactorily performed for a long time.

In time, the initial proportional constant $K_0$ set at the step S4 is lowered to not more than 20% of the current proportional constant K. In this case, it is judged that a surface catalyst of the electrode is exhausted, so that it is judged that the electrode corrodes, to turn on a lamp indicating that the life of the electrode is completed (step S8). The manager of the water treatment device 1 exchanges the pair of electrodes 11 in the electrolytic tank 12 on the basis of the turn-on of the lamp.

Figure 33:
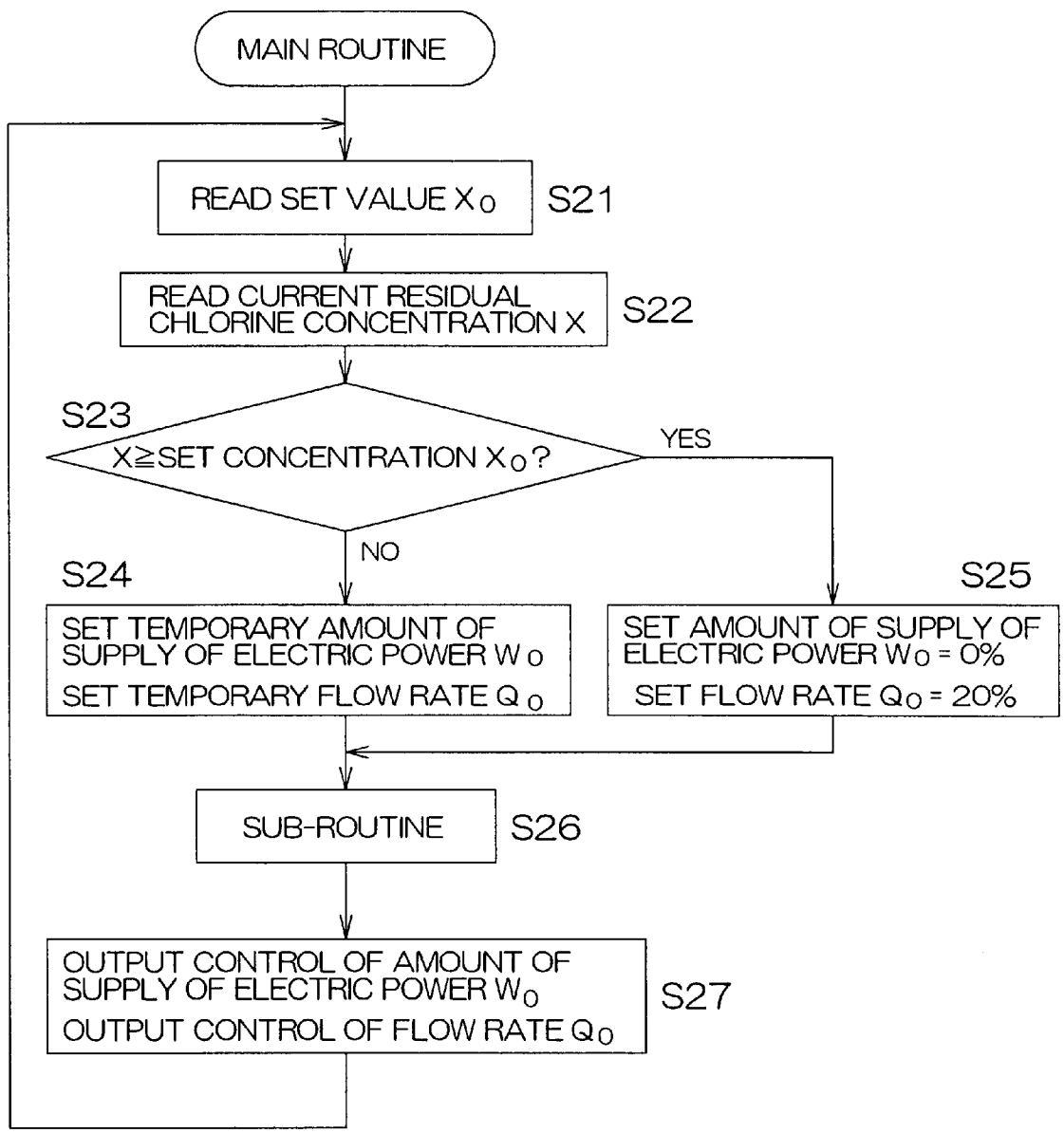
FIG. 33 is a flow chart showing an example of electrolysis control in an electrolytic tank.

FIG. 33 is a flow chart showing an example of electrolysis control in the electrolytic tank 12 in the water treatment device 1. The flow chart of FIG. 33 shows such control that the residual chlorine concentration of water is the concentration set in the setting section 41 (see FIG. 2).

Referring now to FIGS. 31 and 33, a residual chlorine concentration $X_0$ set by the setting section 41 is read in the control section 40 (step S21). A sensing signal X sensed by the residual chlorine sensor S2, that is, the current residual chlorine concentration X is read (step S22). X and $X_0$ are compared with each other (step S23)

If the sensed current residual chlorine concentration X is not more than the set residual chlorine concentration $X_0$, an amount of electrolysis required to set the residual chlorine concentration of water to the set residual chlorine concentration is found by calculation, to set a temporary amount of supply of electric power $W_0$ to be supplied to the pair of electrodes 11 in order to obtain the amount of electrolysis and a temporary flow rate $Q_0$ of water to be caused to flow into the electrolytic tank 12 (step S24). Thereafter, the temporary supply of electric power $W_0$ and the temporary flow rate $Q_0$ are adjusted at the safe sub-routine step S26, and the amount of electric power to be actually supplied to the pair of electrodes 11 and the flow rate of water to be caused to flow into the electrolytic tank 12 are determined and are subjected to output control (step S27). The output control is control of the power source 60, the valves B4 and B13, the circulating pump P8, and so forth.

When the sensed residual chlorine concentration X is higher than the set residual chlorine concentration $X_0$ at the step S23, the electrolysis in the electrolytic tank 12 is not required. Accordingly, the amount of supply of electric power $W_0$ from the power source 60 to the pair of electrodes 11 is taken as "0%". At this time, in order to ensure stable pressure and a stable flow rate of water to the residual chlorine sensor S2, the quantity of water poured into the water treating path from the branching point J1 is set to approximately 20% of the maximum flow rate of water which can flow into the water treating path 1, for example, 10 liters per minute in the present embodiment (step S25).

By the above-mentioned control, the residual chlorine concentration in the pool 2 can be set to the desired concentration set by the setting section 41, and the electrolysis in the electrolytic tank 12 required therefor can be safely performed.

Description is now made of the specific contents of the safe sub-routine at the step S26.

Figure 34:
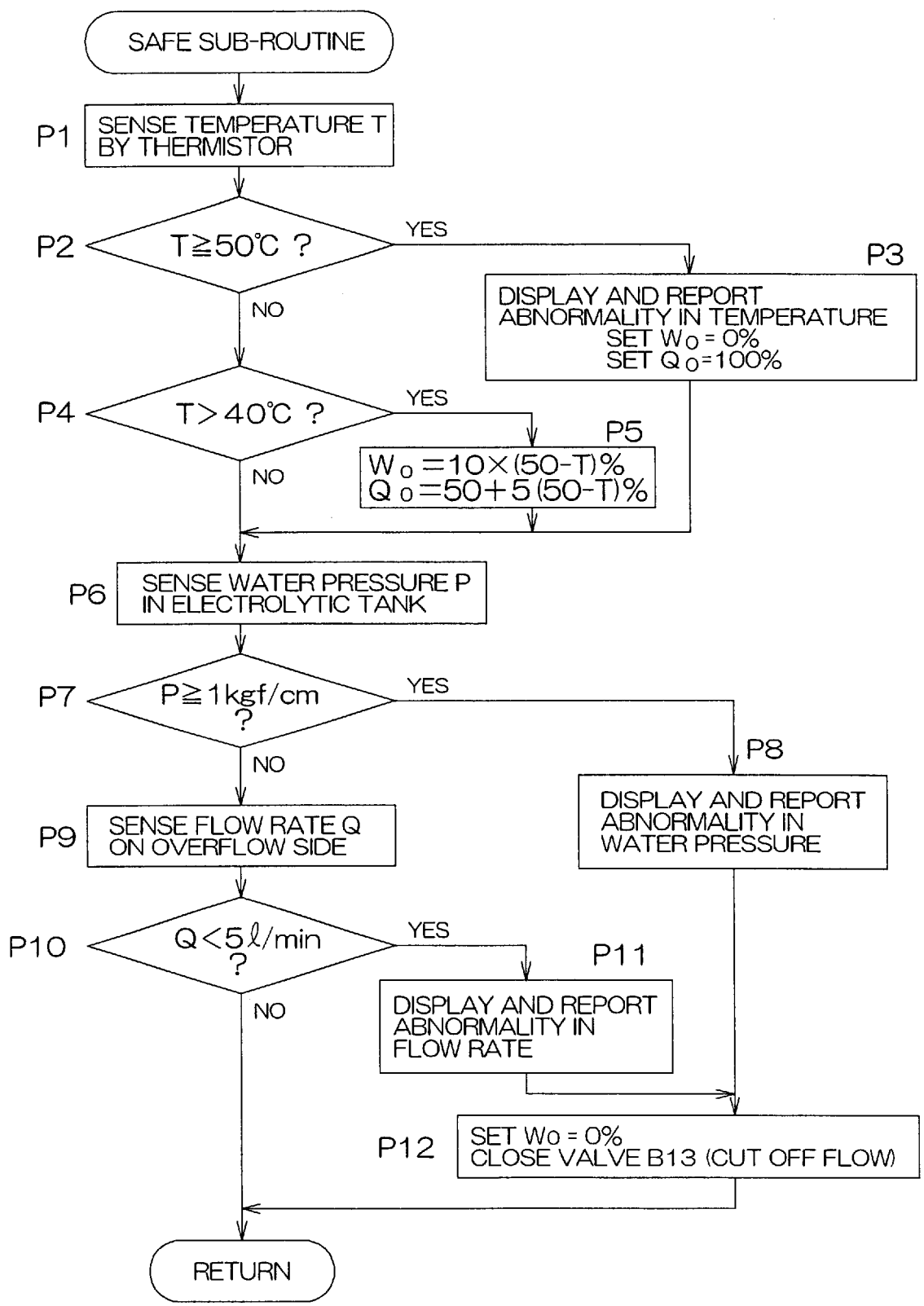
FIG. 34 is a flow chart showing the specific contents of a safe sub-routine using a closed-type electrolytic tank.

FIG. 34 is a flow chart showing the specific contents of the safe sub-routine. In the safe sub-routine, a temperature T sensed by the thermistor TM provided in the electrolytic tank 12 is first read by the control section 40 (step P1). It is judged whether or not the temperature T is not less than 50° C. (step P2). When the electrolysis is performed by the electrolytic tank 12, the temperature of a solution in the electrolytic tank 12 is raised. When the temperature is increased to not less than 50° C., an abnormality in temperature is displayed and reported (step P3). The temporary amount of supply of electric power $W_0$ set at the step S24 shown in FIG. 33 is changed to 0%. Further, the flow rate $Q_0$ of water to the electrolytic tank 12 which is temporarily set is set to the maximum flow rate of water to be introduced into the water treating path 10, for example, 50 liters per minute in the present embodiment (step P3).

On the other hand, when the temperature T sensed by the thermistor TM is in the range of 40° C. <T<50° C. (in a case where the judgment at the step P2 is denied, and the judgment at the step P4 is affirmed), the amount of supply of electric power temporarily set is decreased and the flow rate temporarily set is increased depending on the temperature T. Specifically, the amount of supply of electric power $W_0$ is set to $W_0=10\times(50-T)\%$, and the flow rate $Q_0$ is set to $Q_0=50+5(50-T)\%$ (step P5).

The above-mentioned equation for changing the amount of supply of electric power $W_0$ and the flow rate $Q_0$ depending on the sensed temperature T is only an example. The amount of supply of electric power $W_0$ and the flow rate $Q_0$ may be adjusted on the basis of the other equation.

The water pressure in the electrolytic tank 12 is then sensed by the pressure gauge S13 (see FIG. 30) connected to the water path on the side of overflow of the electrolytic tank 12 (step P6). As a result, it is judged whether or not the water pressure P is $P \geq 1$ $kgf/cm^2$ (step 7). If the judgment is affirmed, an abnormality in water pressure is displayed and reported (step 8). That is, it is considered that there occurs a problem such as an abnormal rise in the water pressure of water flowing into the electrolytic tank 12 or the clogging of the water treating path 10. Accordingly, the manager of the water treatment device 1, for example, is informed of the program. In this case, the amount of supply of electric power $W_0$ to the pair of electrodes 11 is set to 0% for safety, and the flow of water into the electrolytic tank 12 is cut off by closing the valve B13. In this case, the valve B3 may be closed, to stop the circulating pump P8, and the valve B34 may be opened, to drain the water in the electrolytic tank 12, if required (step P12).

When the judgment of the water pressure P at the step P7 is denied so that the water pressure P is in a normal range, the flow rate Q on the side of overflow of the electrolytic tank 12 is sensed by the flow meter S11, to judge whether or not the flow rate Q is less than a predetermined flow rate, that is, less than 5 liters per minute (step P10). When the flow rate Q on the side of overflow is less than the set flow rate, it can be presumed that there is an abnormality, for example, the electrolytic tank 12 is clogged on the side of its outlet. Accordingly, an abnormality in flow rate is displayed and reported (step P11). Also in this case, the program proceeds to the step P12. At the step P12, the electrolysis in the electrolytic tank 12 is stopped, and the valve B13 is closed, so that the flow of the water into the electrolytic tank 12 is cut off.

Even if a problem such as a disturbance or a fault occurs in the water treatment device 1 and particularly the electrolytic tank 12 by the above-mentioned control, the optimum running can be safely performed.

FIG. 35 is a diagram showing the construction of a water treatment device 1 for a large-sized pool 2 according to another embodiment of the present invention. The construction shown in FIG. 35 differs from the construction shown in FIG. 30 in that it comprises, in addition to an electrolytic tank 12, a gas removal tank 70 serving as gas/liquid separating means for separating gas generated at the time of electrolysis in the electrolytic tank 12 from water. A portion, on the side of overflow, of the electrolytic tank 12 is connected to the gas removal tank 70 by a water treating path with an adjusting valve B35 and a flow meter S11 interposed therebetween.

The gas removal tank 70 comprises a float switch SW, to separate, while storing a predetermined quantity of water, gas contained in the water. The separated gas is exhausted to the outer air via an exhaust pipe F2. The exhaust pipe F2 is provided with a hydrogen concentration sensor S9, and an exhaust fan F1 for exhausting hydrogen gas, oxygen gas, and so forth to be generated via the exhaust pipe F2 is located therein.

Water in the gas removal tank 70 is sucked up by the water treating path having a filter 71 provided at its front end.

Furthermore, in the present embodiment, a branching path 10k branched from a branching point J26 is connected to the gas removal tank 70, so that the water passing through a residual chlorine sensor S2 is returned to not a draining trench but the gas removal tank 70.

Furthermore, a circulating pump P13 is inserted into the water treating path on the side of inflow of the electrolytic tank 12. Current flowing through the exhaust fan F1 is monitored by a control section 40, which is not illustrated. In a normal state, the range of the current flowing through the exhaust fan F1 is 0.1 to 1 [A].

In the water treatment device 1 in the present embodiment, the flow meter S11 and a flow meter S12 are respectively provided on the water treating path 10 ahead of and behind the gas removal tank 70, so that the flow rate of the water flowing through the gas removal tank 70 can be sensed. The flow rate of the water flowing through the gas removal tank 70 is controlled by a circulating pump P8 and the circulating pump P13. It is preferable that the water supplying capabilities of the two circulating pumps P8 and P13 can be continuously adjusted by inverter control. Control is carried out such that the flow rate of the circulating pump P13 is larger by approximately 1 [litre per minute] than the flow rate of the circulating pump P8. When the float switch SW is operated, however, the circulating pump P13 is stopped. Accordingly, the water does not overflow from the gas removal tank 70. An example of the float switch SW in the gas removal tank 70 is one of a hysteresis type.

The other construction is entirely the same as that of the water treatment device 1 shown in FIG. 30. The same and corresponding sections are assigned the same reference characters and hence, the description thereof is not repeated.

The basic operation of the water treatment device 1 shown in FIG. 35 is the same as the control in the flow chart shown in FIG. 33. A control operation which characterizes the water treatment device 1 shown in FIG. 35 is contents in a safe sub-routine. The contents of control in the safe sub-routine which characterizes the water treatment device 1 will be described with reference to FIG. 36.

Figure 36:
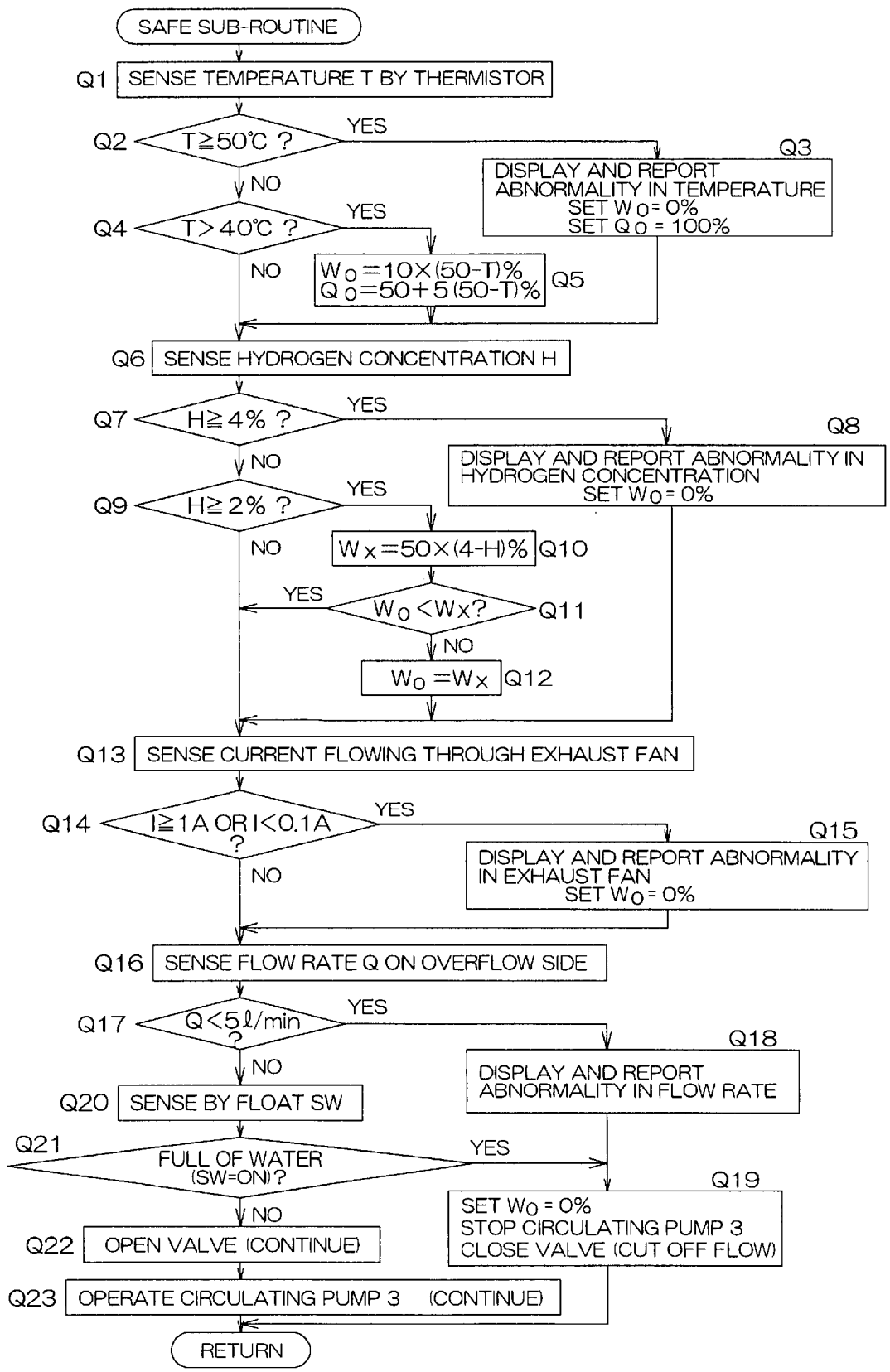
FIG. 36 is a flow chart showing the specific contents of a safe sub-routine in a case where an electrolytic tank also used as gas/liquid separating means is used.

In the safe sub-routine shown in FIG. 36, a temporary amount of supply of electric power $W_0$ and a temporary flow rate $Q_0$ which are set at the step S24 shown in FIG. 33 are adjusted in order to ensure safety.

That is, a temperature sensed by the thermistor TM is read (step Q1), so that the temporarily set values of the amount of supply of electric power $W_o$ and the flow rate $Q_0$ are adjusted depending on the temperature. Specifically, when the temperature T of the electrolytic tank 12 sensed by the thermistor TM is not less than 50° C., an abnormality in temperature is displayed and reported (step Q3). The temporary amount of supply of electric power $W_0$ is set to 0% to stop the energization. On the other hand, in order to cool the electrolytic tank 12, the flow rate $Q_0$ of water flowing into the electrolytic tank 12 is set to the maximum flow rate (50 liters per minute in the present embodiment) of water which can be introduced into the water treating path 10. An operation for causing the water with the set flow rate is realized by a circulating pump P8 and a circulating pump P13. However, the flow rate of the circulating pump P13 on the side of inflow is taken as $Q_0+\alpha$, and the flow rate of the circulating pump P8 is taken as $Q_0$, thereby making it possible to satisfactorily cool the water in a state where the electrolytic tank 12 is filled with the water.

When the temperature T is in the range of 40° C. <T<50° C., the set value of the temporary amount of supply of electric power $W_0$ is decreased and the set value of the temporary flow rate $Q_0$ is increased depending on the temperature. Specifically, the values of $W_0$ and $Q_0$ are respectively set by $W_0 \times (50-T)\%$ and $Q_0=50+5(50-T)\%$.

The above-mentioned control operations are substantially the same as the operations described in FIG. 34.

The concentration H of hydrogen gas generated from the gas removal tank 70 is then sensed by the hydrogen concentration sensor S9 (step Q6). When the sensed concentration H exceeds 4% which is a lower limit value in burning, an abnormality in hydrogen concentration is displayed and reported (step Q8). In this case, the temporary amount of supply of electric power $W_0$ is set to 0%.

When the sensed hydrogen concentration is in the range of $2\% \leq H \leq 4\%$, the amount of supply of electric power Wx is calculated depending on the concentration (step Q10). The calculation is done by Wx=50×(4−H)%, for example. The calculated amount of supply of electric power Wx is compared with the temporary amount of supply of electric power $W_0$ (step Q11). When Wx is smaller, it is taken as the amount of supply of electric power (step Q12).

The amount of current flowing through the exhaust fan F1 provided in the same exhausting path as that in the hydrogen concentration sensor S9 is then monitored by the exhaust fan ammeter F1a (step Q13). As a result, when the amount of current I flowing through the exhaust fan F1 is not less than 1A or less than 0.1A, it is considered that a problem such as locking or disconnection of the exhaust fan F1 occurs. Accordingly, an abnormality in the exhaust fan is displayed and reported (step Q15). In the case, the temporary amount of supply of electric power $W_0$ is set to 0%.

Furthermore, the flow rate Q is sensed by the flow meter S12 on the side of overflow (step Q16) When the flow rate Q is less than 5 liters per minute, air suction by the circulating pump P8, and a fault developed by the circulating pump P8, or the like is considered as a cause. Accordingly, an abnormality in flow rate is displayed and reported (step Q18). The temporary amount of supply of electric power $W_0$ is set to 0%, the circulating pump P13 is stopped, and the valve B13 is closed, so that the flow of water into the electrolytic tank is cut off (step Q19).

Finally when the float switch SW is turned on to sense that the gas removal tank 70 is full of water (steps Q20 and Q21), the temporary amount of supply of electric power $W_0$ is set to 0%, and the circulating pump P13 is stopped, to close the valve B13. Accordingly, the flow of water into the electrolytic tank 12 is cut off.

The program is returned to the main routine shown in FIG. 33 after passing through such a safe sub-routine. In the main routine, the control in the main routine is carried out on the basis of a new amount of supply of electric power $W_0$ and a new flow rate $Q_0$ after adjustment.

The amount of ventilation may be adjusted by locating an inverter in the exhaust fan F1, to control the number of revolutions of the exhaust fan F1 depending on the hydrogen gas concentration sensed by the hydrogen concentration sensor S9, which is not described in the above-mentioned embodiment.

The control including the safe sub-routine is carried out in the above-mentioned manner, thereby making it possible to safely and suitably control the water treatment device.

Although the present invention has been described and illustrated in detail, it is clearly understood that the same is by way of illustration and example only and is not to be taken by way of limitation, the spirit and scope of the present invention being limited only by the terms of the appended claims.

The disclosure of Japanese patent application Nos. 11-354875, 11-359356, 2000-30902, 2000-43437 and 2000-115332, filed Dec. 14, 1999, Dec. 17, 1999, Feb. 8, 2000, Feb. 21, 2000 and Apr. 17, 2000, respectively, is incorporated herewith by reference.

What is claimed is:

1. A water treatment device comprising:
  electrolyzing and sterilizing means, comprising an electrolytic tank to put water in and an electrode provided in the electrolytic tank in order to electrolyze the water, for pouring water into the electrolytic tank, energizing the electrode, and electrolyzing the water, to sterilize the water;

a water treating path connected to a pool storing water for pouring the water in the pool into the electrolytic tank and returning to the pool the water in the electrolytic tank;

a residual chlorine sensor for measuring the residual chlorine concentration of water; and control means for finding a difference between the residual chlorine concentration measured by the residual chlorine sensor and the required residual chlorine concentration previously determined, finding an insufficient amount of residual chlorine from the difference and the quantity of water stored in the pool, and supplying current to the electrode in an amount required to produce the insufficient amount of chlorine by the electrolysis.

2. The water treatment device according to claim 1, further comprising setting means for setting the residual chlorine concentration of the water, the control means controlling the energization of the electrode such that the measured value by the residual chlorine sensor is equal to the residual chlorine concentration set by the setting means.

3. The water treatment device according to claim 1, further comprising temperature sensing means for measuring the temperature of the water in the electrolytic tank, the control means controlling the energization of the electrode on the basis of an output of the temperature sensing means.

4. The water treatment device according to claim 3, wherein the control means controls the pouring of the water into the electrolytic tank on the basis of the output of the temperature sensing means.

5. The water treatment device according to claim 1, wherein two or more pairs of electrodes are provided in the electrolytic tank such that the energization can be performed independently for each of the pairs of electrodes, and the control means controls the energization by changing the number of pairs of electrodes to be simultaneously energized.

6. The water treatment device according to claim 1, wherein a pair of electrodes is provided in the electrolytic tank, and the control means reverses the polarity of a voltage to be supplied to the pair of electrodes for each predetermined time period.

7. The water treatment device according to claim 6, further comprising setting means for setting the hardness of the water, the control means controlling the length of a time period during which the polarity of a voltage is reversed depending on the hardness of the water set by the setting means.

8. The water treatment device according to claim 1, wherein a first plate-shaped electrode and. a second plate-shaped electrode are arranged parallel to each other in the electrolytic tank, one or more plate-shaped electrodes are arranged parallel to both the first and second electrodes between the electrodes, wiring for energization is connected to the first and second electrodes, and the electrodes arranged between the first and second electrodes are not wired, and both two surfaces of each electrode are polarized.

9. The water treatment device according to claim 8, wherein three or more plate-shaped electrodes are arranged parallel to both the first and second electrodes between electrodes, wiring for energization is connected to the first and second electrodes and the electrodes located at intervals of a predetermined number electrodes between the first and second electrodes, and the electrodes arranged between the first and second electrodes are not wired, and both two surfaces of each electrode are polarized.

10. The water treatment device according to claim 8, wherein the first and second electrodes are arranged such that they respectively contact to an inner wall surface of the electrolytic tank.

11. The water treatment device according to claim 1, further comprising pH sensing means for measuring the pH of water, an adjusting solution tank to put in a pH adjusting solution for adjusting the pH of water, and a supplying path for supplying to the water treating path the pH adjusting solution poured into the adjusting solution tank, the control means supplying the pH adjusting solution to the water treating path from the adjusting solution tank on demand through the supplying path to adjust the pH of the water on the basis of an output of the pH sensing means.

12. The water treatment device according to claim 11, comprising a first adjusting solution tank to put in an alkaline pH adjusting solution, a first supplying path for supplying to the water treating path the pH adjusting solution poured into the first adjusting solution tank, a second adjusting solution tank to put in an acid pH adjusting solution, and a second supplying path for supplying to the water treating path the pH adjusting solution poured into the second adjusting solution tank, the control means supplying the alkali and/or acid pH adjusting solution to the water treating path from the first or second adjusting solution tank on demand through the first or second supplying path on the basis of an output of the pH sensing means, to adjust the pH of the water.

13. The water treatment device according to claim 1, wherein the electrolytic tank comprises an inlet for pouring an acid serving as a cleaning solution, and an outlet for discharging a solution in the electrolytic tank.

14. A water treatment device comprising:

electrolyzing and sterilizing means, comprising an electrolytic tank to put water in and an electrode provided in the electrolytic tank in order to electrolyze the water, for pouring water into the electrolytic tank, energizing the electrode, and electrolyzing the water, to sterilize the water;

a water treating path connected to a pool storing water for pouring the water in the pool into the electrolytic tank and returning to the pool the water in the electrolytic tank;

a residual chlorine sensor for measuring the residual chlorine concentration of water;

control means for controlling the energization of the electrode on the basis of the measured value by the residual chlorine sensor;

gas/liquid separating means for separating from the water gas generated by the electrolysis in the electrolyzing and sterilizing means; and gas separation sensing means for sensing circumstances where the gas is separated in the gas/liquid separating means, the control means controlling the energization of the electrode on the basis of an output of the gas separation sensing means.

15. The water treatment device according to claim 14, wherein the gas separation sensing means senses the concentration of hydrogen contained in the separated gas.

16. The water treatment device according to claim 14, further comprising exhausting means for exhausting the gas separated from the water in the gas/liquid separating means, the gas separation sensing means being exhaust sensing means for sensing circumstances where the gas is exhausted by the exhausting means.

17. A water treatment device comprising:

electrolyzing and sterilizing means, comprising an electrolytic tank to put water in and an electrode provided in the electrolytic tank in order to electrolyze the water, for pouring water into the electrolytic tank, energizing the electrode, and electrolyzing the water, to sterilize the water;

a water treating path connected to a pool storing water for pouring the water in the pool into the electrolytic tank and returning to the pool the water in the electrolytic tank;

a residual chlorine sensor for measuring the residual chlorine concentration of water;

control means for controlling the energization of the electrode on the basis of the measured value by the residual chlorine sensor;

sterilization solution producing means, comprising a second electrolytic tank to put in an electrolytic solution containing a chlorine ion and second electrode provided in the second electrolytic tank in order to electrolyze the electrolytic solution, for pouring the electrolytic solution into the second electrolytic tank to energize the second electrode, and electrolyzing the electrolytic solution to produce a sterilizing solution; and a supplying path for supplying to a water treating path the sterilizing solution produced by the sterilizing solution producing means.

18. The water treatment device according to claim 17, wherein the control means energizes the second electrode in a time zone in which water is not sterilized by the electrolyzing and sterilizing means, to produce the sterilizing solution, stores the produced sterilizing solution in the second electrolytic tank, and supplies the sterilizing solution stored in the second electrolytic tank to the water treating path on demand through the supplying path in a time zone in which water is sterilized by the electrolyzing and sterilizing means.

19. A water treatment device comprising:

electrolyzing and sterilizing means, comprising an electrolytic tank to put water in and an electrode provided in the electrolytic tank in order to electrolyze the water, for pouring water into the electrolytic tank, energizing the electrode, and electrolyzing the water, to sterilize the water;

a water treating path connected to a pool storing water for pouring the water in the pool into the electrolytic tank and returning to the pool the water in the electrolytic tank;

a residual chlorine sensor for measuring the residual chlorine concentration of water; and control means for controlling the energization of the electrode on the basis of the measured value by the residual chlorine sensor, wherein the control means pours electrolytic solution containing a chlorine ion into the electrolytic tank in the electrolyzing and sterilizing means to energize the electrode in a time zone in which water is not sterilized by the electrolyzing and sterilizing means, and electrolyzes the electrolytic solution to produce the sterilizing solution.

20. The water treatment device according to claim 19, comprising a sterilizing solution tank to put in the sterilizing solution produced by the electrolyzing and sterilizing means, a first supplying path for supplying the sterilizing solution to the sterilizing solution tank from the electrolytic tank, and a second supplying path for supplying the sterilizing solution to the water treating path from the sterilizing solution tank, the control means pouring the sterilizing solution produced in the electrolyzing and sterilizing means into the sterilizing solution tank through the first supplying path in a time zone in which water is not sterilized by the electrolyzing and sterilizing means, and the sterilizing solution stored in the sterilizing solution tank being supplied to the water treating path on demand through the second supplying path in a time zone in which water is sterilized by the electrolyzing and sterilizing means.

21. A water treatment device comprising:

electrolyzing and sterilizing means, comprising an electrolytic tank to put water in and an electrode provided in the electrolytic tank in order to electrolyze the water, for pouring water into the electrolytic tank, energizing the electrode, and electrolyzing the water, to sterilize the water;

a water treating path connected to a pool storing water for pouring the water in the pool into the electrolytic tank and returning to the pool the water in the electrolytic tank;

a residual chlorine sensor for measuring the residual chlorine concentration of water;

control means for controlling the energization of the electrode on the basis of the measured value by the residual chlorine sensor;

a solution tank to put in an electrolytic solution containing a chlorine ion having a sterilizing function; and a supplying path for supplying the electrolytic solution poured into the solution tank to the electrolytic tank in the electrolyzing and sterilizing means, the controlling means supplying the electrolytic solution stored in the solution tank to the electrolytic tank on demand through the supplying path while sterilizing the water by the electrolyzing and sterilizing means.

22. A water treatment device comprising:

electrolyzing and sterilizing means, comprising an electrolytic tank to put water in and an electrode provided in the electrolytic tank in order to electrolyze the water, for pouring water into the electrolytic tank, energizing the electrode, and electrolyzing the water, to sterilize the water;

water treating path connected to a pool storing water for pouring the water in the pool into the electrolytic tank and returning to the pool the water in the electrolytic tank;

current sensing means for measuring the value of current flowing through the electrode;

conductivity measuring means for measuring the electrical conductivity of water; and scale adhesion judging means for judging how a scale adheres to the electrode on the basis of outputs of the current sensing means and the conductivity measuring means.

23. The water treatment device according to claim 22, further comprising life judging means for judging the life of the electrode on the basis of the outputs of the current sensing means and the conductivity measuring means.

* * * * *